(12) United States Patent
Nakao et al.

(10) Patent No.: US 11,121,587 B2
(45) Date of Patent: Sep. 14, 2021

(54) NON-CONTACT POWER SUPPLY DEVICE CAPABLE OF PERFORMING CONSTANT VOLTAGE OUTPUT OPERATION

(71) Applicant: Omron Corporation, Kyoto (JP)

(72) Inventors: Goro Nakao, Inazawa (JP); Yusuke Kawai, Ichinomiya (JP); Atsushi Nomura, Ichinomiya (JP); Toshiyuki Zaitsu, Kyotanabe (JP)

(73) Assignee: Omron Corporation, Kyoto (JP)

( * ) Notice: Subject to any disclaimer, the term of this patent is extended or adjusted under 35 U.S.C. 154(b) by 68 days.

(21) Appl. No.: 16/612,251

(22) PCT Filed: May 10, 2018

(86) PCT No.: PCT/JP2018/018198
§ 371 (c)(1),
(2) Date: Nov. 8, 2019

(87) PCT Pub. No.: WO2018/212074
PCT Pub. Date: Nov. 22, 2018

(65) Prior Publication Data
US 2021/0159731 A1 May 27, 2021

(30) Foreign Application Priority Data

May 19, 2017 (JP) .............................. JP2017-100236
Mar. 20, 2018 (JP) .............................. JP2018-052161

(51) Int. Cl.
*H02J 50/80* (2016.01)
*H02J 50/12* (2016.01)
(Continued)

(52) U.S. Cl.
CPC .............. *H02J 50/80* (2016.02); *H01F 38/14* (2013.01); *H02J 50/12* (2016.02); *H04B 5/0037* (2013.01)

(58) Field of Classification Search
CPC ............ H02J 50/00; H02J 50/12; H02J 50/80; H04B 4/00
See application file for complete search history.

(56) References Cited

U.S. PATENT DOCUMENTS 1,857,055 A * 5/1932 MacDonald ............ H01F 21/12
455/191.3
5,872,489 A * 2/1999 Chang ...................... H03F 1/26
331/179
(Continued)

FOREIGN PATENT DOCUMENTS

JP 2012/130173 A 7/2012
JP 2014-204237 A 10/2014
(Continued)

OTHER PUBLICATIONS

Watanabe et al; "Bidirectional Contactless Power Transfer System expandable from Unidirectional Systems"; The transactions of the Institute of Electrical Engineers of Japan. D, IEEJ Transactions on Industry Applications, vol. 133, No. 7, pp. 707-713, 2013 (with partial translation) (3 pages).
(Continued)

*Primary Examiner* — Adi Amrany
(74) *Attorney, Agent, or Firm* — Osha Bergman Watanabe & Burton LLP

(57) ABSTRACT

A power transmission device 2 for a non-contact power supply device 1 has: a transmission coil 14; a coil 15 connected in series to the transmission coil 14 without joining to a reception coil 21 during power transmission, said reception coil being included in a resonance circuit 20 for a power reception device 3; a power supply circuit 10 that supplies, to the transmission coil 14, AC power having a switching frequency at which the transmission coil 14 does not resonate; and a control circuit 19 that controls the switching frequency and voltage of the AC power supplied
(Continued)

to the transmission coil 14 and controls whether or not both ends of the coil 15 are short-circuited.

12 Claims, 22 Drawing Sheets

(51) Int. Cl.
  *H01F 38/14* (2006.01)
  *H04B 5/00* (2006.01)

(56) References Cited

U.S. PATENT DOCUMENTS

| | | | | |
|---|---|---|---|---|
| 9,276,553 | B2* | 3/2016 | Suzuki | H02J 5/005 |
| 9,561,730 | B2* | 2/2017 | Widmer | B60L 53/126 |
| 2006/0181363 | A1* | 8/2006 | Eo | H03B 5/1203 |
| | | | | 331/167 |
| 2011/0266882 | A1 | 11/2011 | Yamamoto et al. | |
| 2012/0262000 | A1 | 10/2012 | Urano | |
| 2014/0203774 | A1* | 7/2014 | Sawayanagi | H02J 50/10 |
| | | | | 320/108 |
| 2014/0300197 | A1 | 10/2014 | Wakabayashi | |
| 2016/0303301 | A1* | 10/2016 | Bluvshtein | A61N 1/3787 |
| 2018/0090994 | A1* | 3/2018 | Jeong | H02J 50/12 |
| 2018/0342898 | A1* | 11/2018 | Ikefuji | H02J 7/00034 |
| 2019/0148979 | A1* | 5/2019 | Goeldi | G01R 25/00 |
| | | | | 307/104 |

FOREIGN PATENT DOCUMENTS

| | | |
|---|---|---|
| JP | 2015-42051 A | 3/2015 |
| WO | 2011/138860 A1 | 11/2011 |
| WO | 2012/081424 A1 | 6/2012 |

OTHER PUBLICATIONS

International Seach Report for corresponding International Application No. PCT/JP2018/018198, dated Jun. 5, 2018 (4 pages).
Written Opinion for corresponding International Application No. PCT/JP2018/018198, dated Jun. 5, 2018 (6 pages).

* cited by examiner

FIG. 11
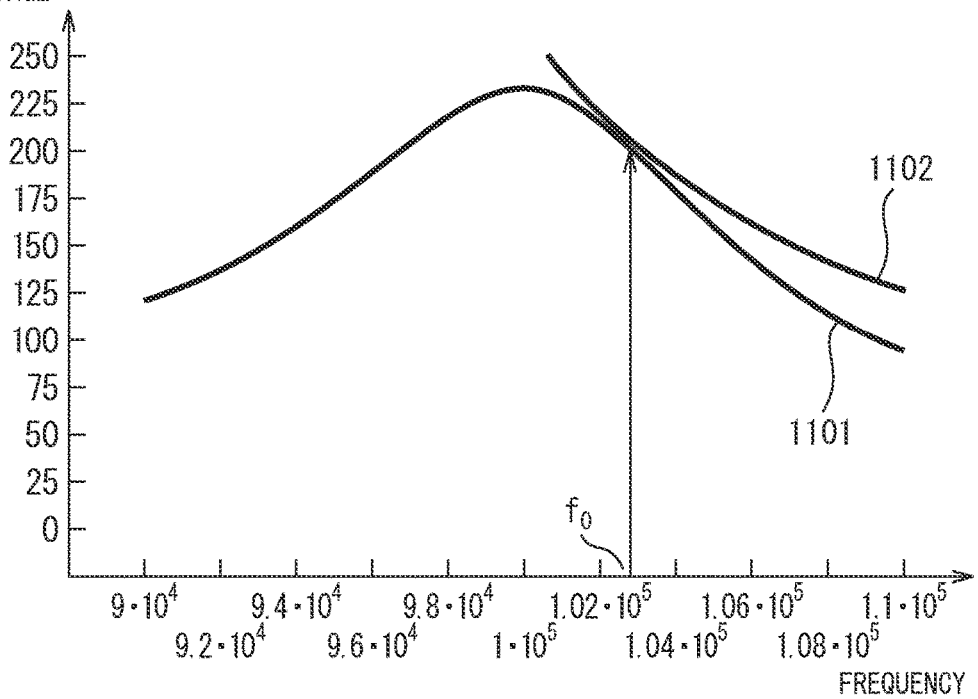
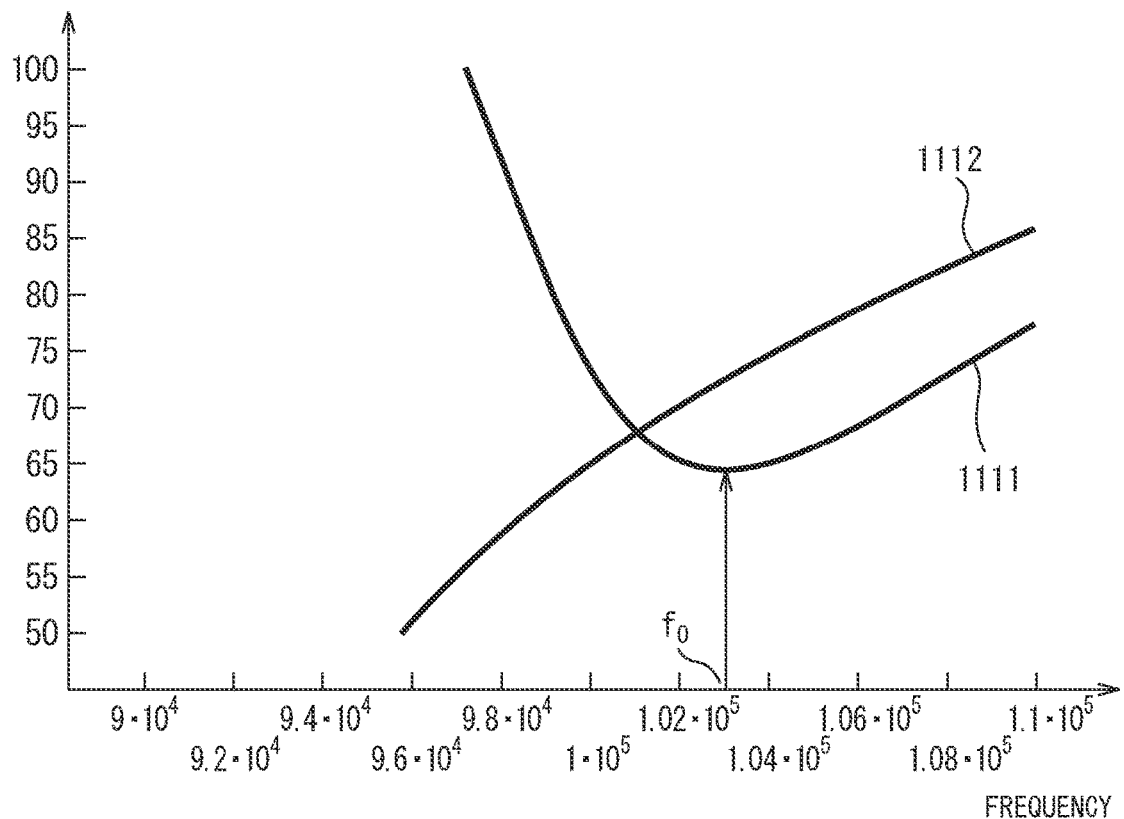

FIG. 20
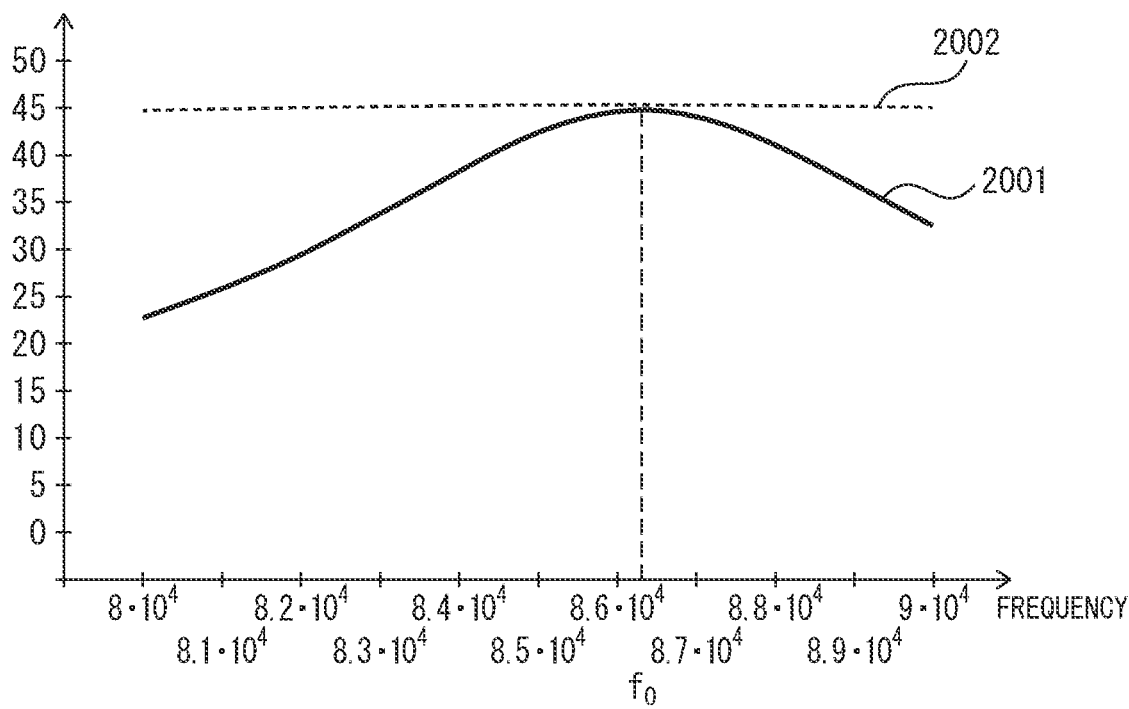
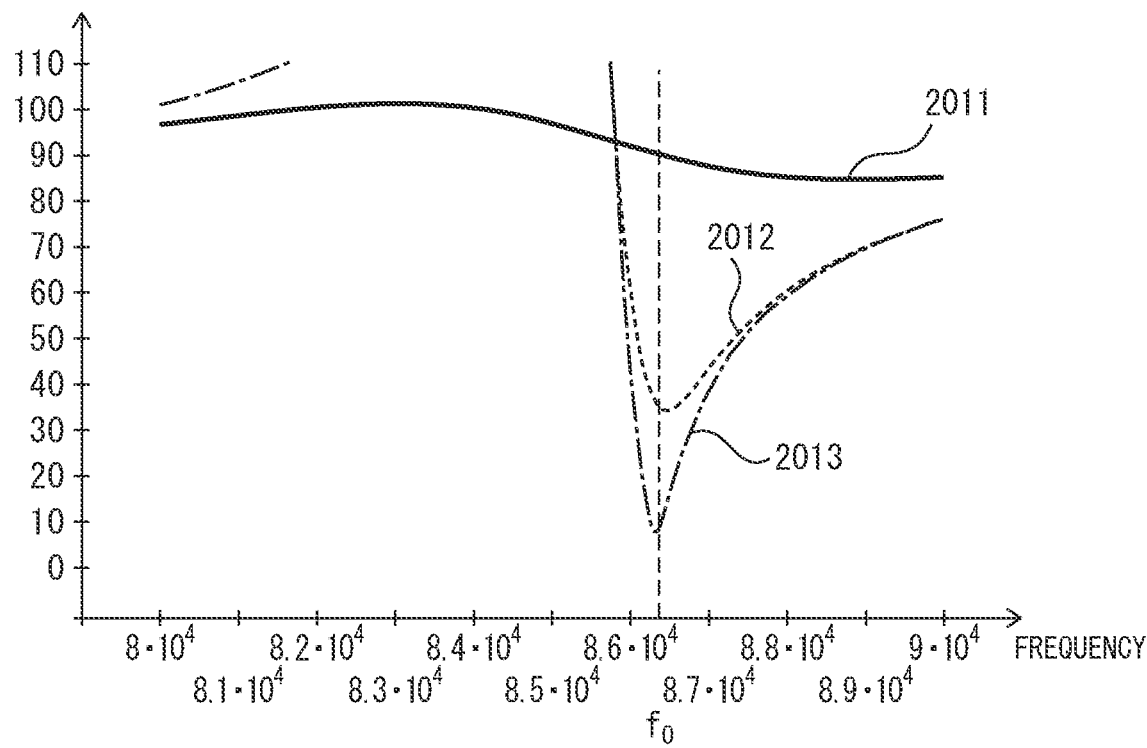

FIG. 21
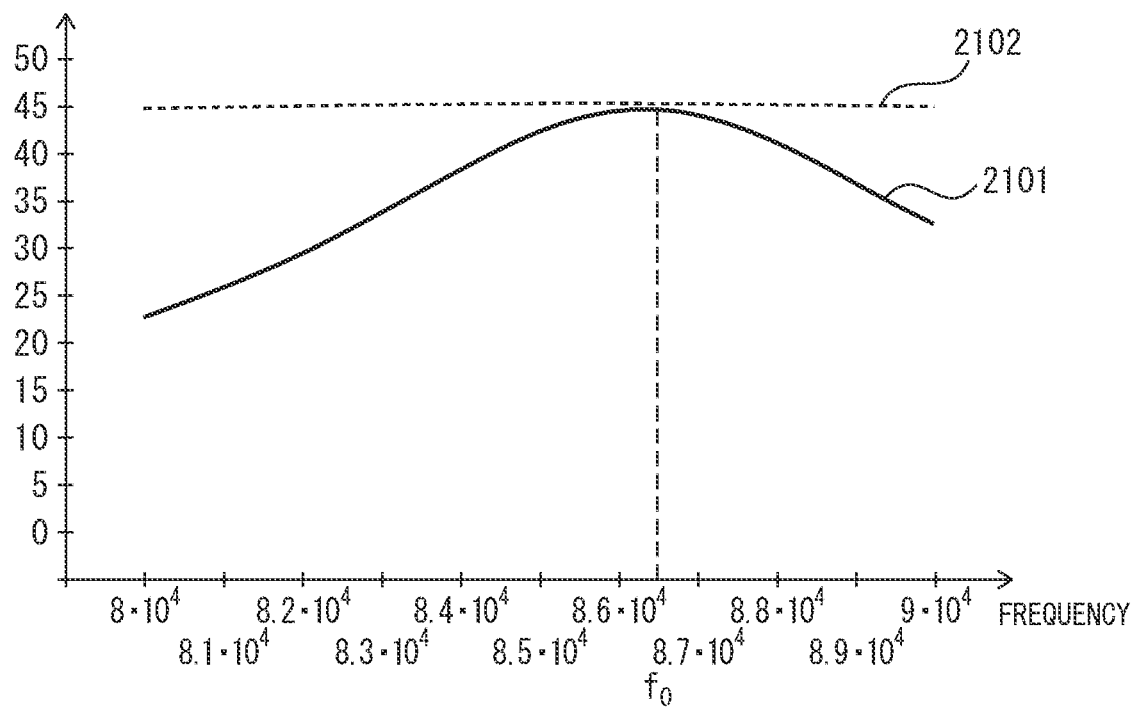
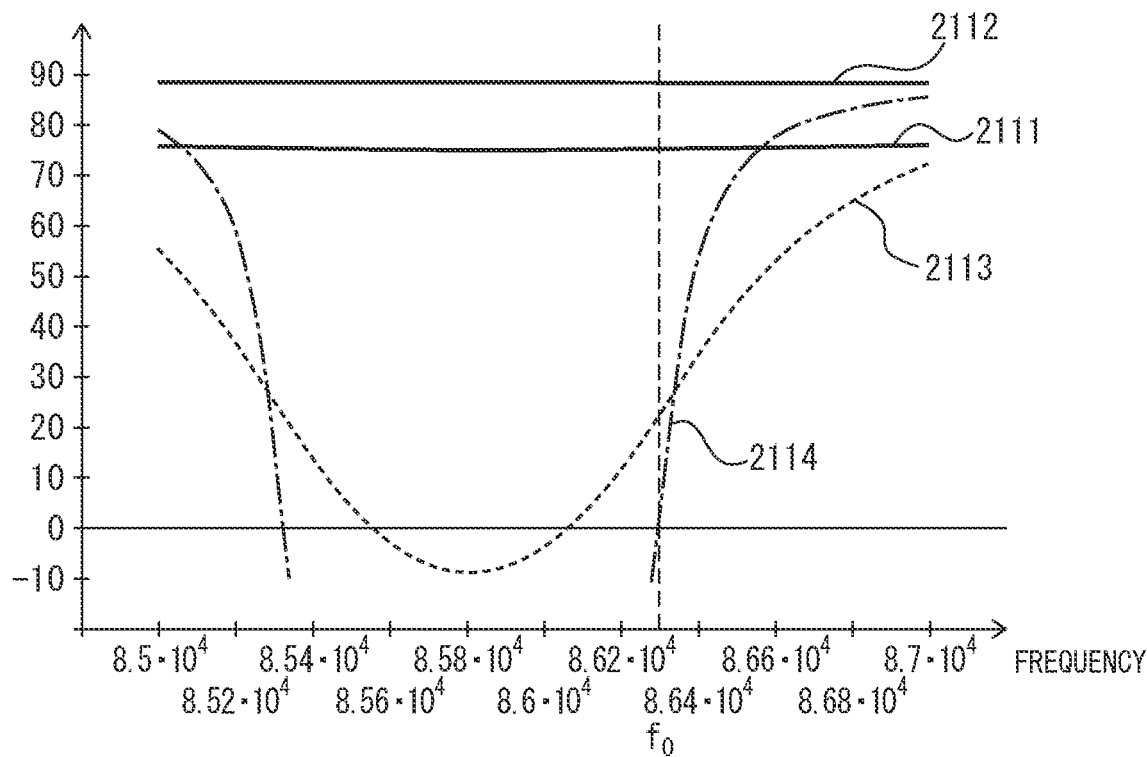

NON-CONTACT POWER SUPPLY DEVICE CAPABLE OF PERFORMING CONSTANT VOLTAGE OUTPUT OPERATION

FIELD

The present invention relates to a non-contact power supply device.

BACKGROUND

Conventionally, technologies for transmitting electric power through space without using metal contacts or the like, or so-called non-contact power supply (also called wireless power supply) technologies have been studied.

As one of non-contact power supply technologies, a method of supplying power by electromagnetic induction is known. In the method of supplying power by electromagnetic induction, a series-primary parallel-secondary capacitors method (hereinafter referred to as an SP method) is used (see, for example, NPL 1). According to the SP method, a capacitor is connected in series with a transmission coil serving as a part of a transformer on the primary side (power transmission side), and a capacitor is connected in parallel with a reception coil serving as another part of the transformer on the secondary side (power reception side).

In the SP method, since the resonance circuit constituted by the reception coil and the capacitor on the power reception side causes parallel resonance, the output from the resonance circuit is constant current output. Thus, it is generally more difficult to perform control in the SP method than in a series-primary series-secondary capacitors method (hereinafter referred to as an SS method), in which output on the power reception side is constant voltage output. This is because electronic appliances are generally controlled by constant voltage.

In addition, a technology of, in the SP method, disposing a reactor that is connected in series with the coil in the resonance circuit on the power reception side has been proposed (see, for example, NPL 1 and PTL 1). Note that the method using the technology is sometimes referred to as an SPL method. The method is also referred to as the SPL method herein.

CITATION LIST

Patent Literature

[PTL 1] Japanese Unexamined Patent Publication (Kokai) No. 2015-42051

Non-Patent Literature

[NPL 1] Watanabe et al., "Bidirectional Contactless Power Transfer System expandable from Unidirectional Systems", The transactions of the Institute of Electrical Engineers of Japan. D, IEEJ Transactions on Industry Applications, Vol. 133, No. 7, pp. 707-713, 2013

SUMMARY

Technical Problem

In a non-contact power supply device in which the SPL method is employed, since harmonic components of transmitted power are reduced and ideal transformer properties are obtained, a power factor is improved and, as a result, power transmission efficiency increases.

It is preferable that, even when the SPL method is employed, the non-contact power supply device be used in such a way as to perform a constant voltage output operation. Further, depending on a use, an adjustable range of frequency of AC power supplied to the transmission coil is sometimes restricted even when the coupling coefficient between a transmission coil and a reception coil is not constant.

Accordingly, an object of the present invention is to provide a non-contact power supply device that is capable of narrowing an adjustment range of frequency of AC power supplied to the transmission coil when the coupling coefficient between the transmission coil of the device on the power transmission side and the reception coil of the device on the power reception side is not constant.

Solution to Problem

As an embodiment of the present invention, a non-contact power supply device including a power transmission device and a power reception device to which power is transmitted from the power transmission device without contact is provided. In the non-contact power supply device, the power reception device includes a resonance circuit that includes a reception coil that receives power from the power transmission device and a resonance capacitor that, in conjunction with the reception coil, resonates with power from the power transmission device and a rectification circuit that rectifies power output from the resonance circuit. On the other hand, the power transmission device includes a transmission coil that supplies power to the power reception device, a first coil that is connected in series with the transmission coil and is not coupled with the reception coil even while power is transmitted from the power transmission device to the power reception device, a first short-circuiting circuit that switches between short-circuiting and open-circuiting both ends of the first coil, a power supply circuit that supplies AC power having an adjustable switching frequency at which the transmission coil does not resonate and having an adjustable voltage to the transmission coil, a receiver that receives a signal including determination information, and a control circuit that controls switching frequency and voltage of the AC power supplied from the power supply circuit to the transmission coil and controls whether short-circuiting or open-circuiting both ends of the first coil via the first short-circuiting circuit.

In the non-contact power supply device, the power reception device preferably further includes a second coil that is connected in series with the reception coil between the resonance circuit and the rectification circuit, and the reception coil and the resonance capacitor of the resonance circuit are preferably connected in parallel with each other.

Alternatively, in the non-contact power supply device, the reception coil and the resonance capacitor of the resonance circuit of the power reception device are preferably connected in series with each other.

In addition, in the non-contact power supply device, the power reception device preferably further includes a voltage detection circuit that measures output voltage of power output from the resonance circuit and obtains a measured value of the output voltage, a determination circuit that determines, on the basis of a measured value of the output voltage, whether or not the non-contact power supply device is performing a constant voltage output operation and whether or not the measured value of the output voltage falls within a predetermined allowance range of voltage, and a first communication device that transmits a signal including determination information indicating whether or not the non-contact power supply device is performing the constant voltage output operation and whether or not the measured value of the output voltage falls within the predetermined allowance range of voltage to the power transmission device. On the other hand, the power transmission device preferably further includes a second communication device that receives the signal including the determination information, and the control circuit, depending on the determination information, preferably controls switching frequency and voltage of the AC power supplied from the power supply circuit to the transmission coil and controls whether short-circuiting or open-circuiting both ends of the first coil via the first short-circuiting circuit.

In addition, in the non-contact power supply device, when, with both ends of the first coil short-circuited, the determination information received from the power reception device indicates that the non-contact power supply device is not performing the constant voltage output operation, the control circuit of the power transmission device preferably controls switching frequency of the AC power supplied from the power supply circuit to the transmission coil to be changed within a first frequency range in such a way that measured values of the output voltage do not change even when resistance of a load circuit connected to the rectification circuit of the power reception device changes.

In this case, when, with both ends of the first coil short-circuited, the determination information indicates that the non-contact power supply device is not performing the constant voltage output operation even when the control circuit changes switching frequency of the AC power supplied from the power supply circuit to the transmission coil over the whole first frequency range, the control circuit preferably controls the first short-circuiting circuit to open-circuit both ends of the first coil.

Further, in the non-contact power supply device, when, with both ends of the first coil open-circuited, the determination information indicates that the non-contact power supply device is not performing the constant voltage output operation, the control circuit of the power transmission device preferably controls switching frequency of the AC power supplied from the power supply circuit to the transmission coil to be changed within a second frequency range that is different from the first frequency range in such a way that measured values of the output voltage do not change even when resistance of a load circuit connected to the rectification circuit of the power reception device changes.

In this case, when, with both ends of the first coil open-circuited, the determination information indicates that the non-contact power supply device is not performing the constant voltage output operation even when the control circuit changes switching frequency of the AC power supplied from the power supply circuit to the transmission coil over the whole second frequency range, the control circuit preferably controls the first short-circuiting circuit to short-circuit both ends of the first coil.

Note that the first frequency range and the second frequency range are preferably set in such a manner as to partially overlap each other.

Further, in the non-contact power supply device, when the determination information received from the power reception device indicates that the non-contact power supply device is performing the constant voltage output operation and a measured value of the output voltage does not fall within the predetermined allowance range of voltage, the control circuit of the power transmission device preferably controls voltage of the AC power supplied from the power supply circuit to the transmission coil in such a way that measured values of the output voltage fall within the predetermined allowance range of voltage.

In addition, in the non-contact power supply device, the power transmission device preferably further includes a current detection circuit that measures current flowing through the transmission coil and obtains a measured value of the current, and the control circuit, depending on a measured value of the current, preferably controls switching frequency of the AC power supplied from the power supply circuit to the transmission coil and controls whether short-circuiting or open-circuiting both ends of the first coil via the first short-circuiting circuit.

In this case, the control circuit of the power transmission device, with both ends of the first coil short-circuited, preferably monitors measured values of the current while changing switching frequency of the AC power within a first frequency range and thereby detects a switching frequency at which measured values of the current have a local maximum and controls the power supply circuit in such a way that AC power having the detected switching frequency is supplied to the transmission coil.

Further, when no switching frequency at which measured values of the current have a local maximum is found within the first frequency range, the control circuit of the power transmission device preferably controls the first short-circuiting circuit to open-circuit both ends of the first coil and, with both ends of the first coil open-circuited, monitors measured values of the current while changing switching frequency of the AC power within a second frequency range that is different from the first frequency range and thereby detects a switching frequency at which measured values of the current have a local maximum and controls the power supply circuit in such a way that AC power having the detected switching frequency is supplied to the transmission coil.

Further, in the non-contact power supply device, the power reception device preferably further includes a voltage detection circuit that measures output voltage of power output from the resonance circuit and obtains a measured value of the output voltage and a second short-circuiting circuit that is capable of switching whether or not short-circuiting the resonance circuit, and, when the measured value of the output voltage is out of the predetermined allowance range of voltage, the determination circuit preferably makes the second short-circuiting circuit short-circuit the resonance circuit. On the other hand, the power transmission device preferably further includes a current detection circuit that measures current flowing through the transmission coil and obtains a measured value of the current, and the control circuit, depending on the measured value of the current, preferably controls switching frequency of the AC power supplied from the power supply circuit to the transmission coil and controls whether short-circuiting or open-circuiting both ends of the first coil via the first short-circuiting circuit.

In this case, the control circuit of the power transmission device, with both ends of the first coil short-circuited, preferably monitors measured values of the current while changing switching frequency of the AC power within a first frequency range and thereby detects a switching frequency at which measured values of the current have a local maximum or phase of measured values of the current and phase of voltage of the AC power supplied to the transmission coil coincide with each other and controls the power supply circuit in such a way that AC power having the detected switching frequency is supplied to the transmission coil.

Advantageous Effects of Invention

A non-contact power supply device according to the present invention has an advantageous effect of narrowing an adjustment range of frequency of AC power supplied to the transmission coil when the coupling coefficient between the transmission coil of the device on the power transmission side and the reception coil of the device on the power reception side is not constant.

BRIEF DESCRIPTION OF DRAWINGS

FIG. 11 is a diagram illustrating an example of a relationship between frequency responses of the output voltage and frequency responses of input impedance of the non-contact power supply device.

FIG. 20 is a diagram illustrating an example of a relationship between frequency responses of the output voltage and frequency responses of input impedance of the non-contact power supply device according to the variation illustrated in FIG. 14.

FIG. 21 is a diagram illustrating an example of a relationship between frequency responses of the output voltage from the non-contact power supply device according to the variation illustrated in FIG. 14 and frequency responses of delay of phase of current with respect to phase of voltage regarding AC power applied to a transmission coil 14.

DESCRIPTION OF EMBODIMENTS

A non-contact power supply device according to an embodiment of the present invention will be described below with reference to the drawings.

First, to facilitate understanding of the non-contact power supply device according to the present invention, a constant voltage output operation performed by the non-contact power supply device according to the SPL method will be described.

Figure 1:
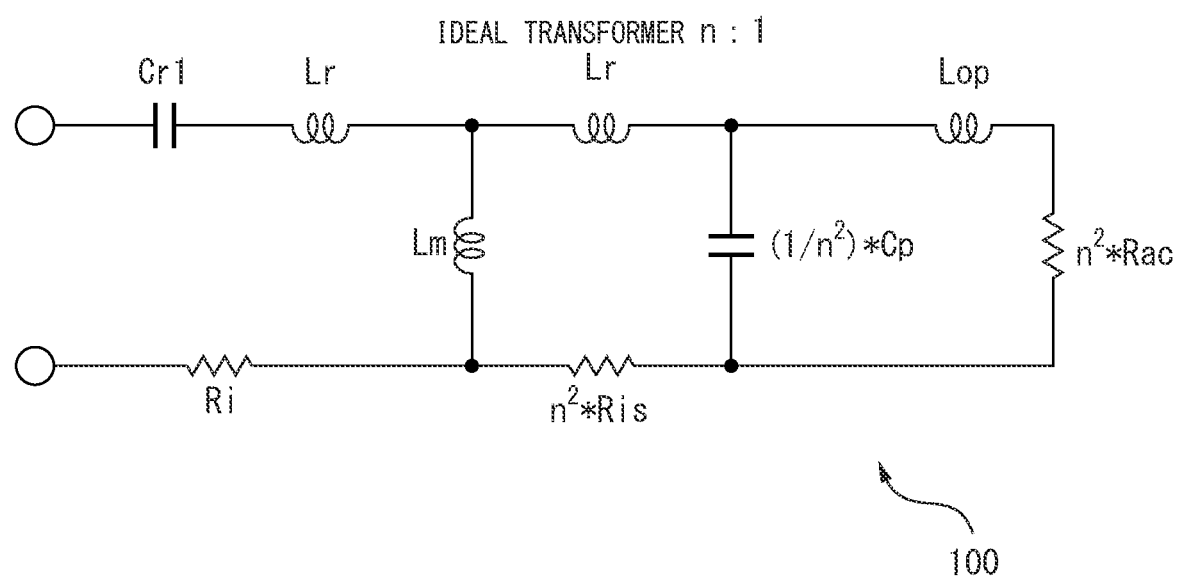
FIG. 1 is an equivalent circuit diagram of a non-contact power supply device according to an SPL method.

FIG. 1 is an equivalent circuit diagram of the non-contact power supply device according to the SPL method. It is assumed that, in an equivalent circuit 100 in the diagram, a transmission coil of a resonance circuit on the power transmission side couples with a reception coil of a resonance circuit on the power reception side to form an ideal transformer with a ratio of n:1. Cr1 is capacitance of a capacitor connected in series with the transmission coil in the resonance circuit on the power transmission side. Lr and Lm are leakage inductance and excitation inductance, respectively, of the resonance circuit on the power transmission side. Note that inductance Lp of the transmission coil of the resonance circuit on the power transmission side is equal to (Lm+Lr) and, when it is assumed that a coupling coefficient between the transmission coil and the reception coil is denoted by k, Lr=(1−k)Lp and Lm=kLp hold. In addition, Ri and Ris are a winding resistance on the power transmission side and a winding resistance on the power reception side, respectively. Cp is capacitance of a capacitor connected in parallel with the reception coil in the resonance circuit on the power reception side. Lop is inductance of a coil connected in series with the reception coil. Rac is an AC equivalent resistance of a load circuit Ro and is expressed as Rac=(8/$\pi^2$)×Ro.

From the equivalent circuit 100, an F-matrix Fspl(s, k, Rac) of the non-contact power supply device according to the SPL method is expressed by the following equation.

[Math. 1]

$$Fspl(s, k, Rac) = \begin{bmatrix} 1 & Ri \\ 0 & 1 \end{bmatrix} \cdot \begin{bmatrix} 1 & \frac{1}{s \cdot Cr1} \\ 0 & 1 \end{bmatrix} \cdot \begin{bmatrix} 1 & s \cdot Lr(k) \\ 0 & 1 \end{bmatrix} \cdot \begin{bmatrix} 1 & 0 \\ \frac{1}{s \cdot Lm(k)} & 1 \end{bmatrix} \cdot$$
$$\begin{bmatrix} 1 & s \cdot Lr(k) \\ 0 & 1 \end{bmatrix} \cdot \begin{bmatrix} 1 & n^3 \cdot Ris \\ 0 & 1 \end{bmatrix} \cdot$$
$$\begin{bmatrix} 1 & 0 \\ s \cdot \frac{1}{n^2} \cdot Cp & 1 \end{bmatrix} \cdot \begin{bmatrix} 1 & s \cdot Lop \cdot n^2 \\ 0 & 1 \end{bmatrix} \cdot \begin{bmatrix} 1 & 0 \\ \frac{1}{n^2 \cdot Rac} & 1 \end{bmatrix} \quad (1)$$

In the above equation, s is expressed as s=j2π. Note that f is frequency of AC power that is supplied to the resonance circuit on the power transmission side. In addition, k denotes a coupling coefficient between the transmission coil and the reception coil.

From the definition of the F-matrix, output gain Gspl(s, k, Rac) of the non-contact power supply device according to the SPL method is expressed by the following equation.

[Math. 2]

$$Gspl(s, k, Rac) = \frac{1}{Fspl(s, k, Rac)_{0,0}} \cdot \frac{Vin}{2} \cdot \frac{1}{n} \quad (2)$$

In the above equation, Vin is voltage (amplitude) of the AC power supplied to the resonance circuit on the power transmission side, and Fspl(s, k, Rac)$_{0,0}$ represents the upper left element of the F-matrix expressed by the equation (1).

Figure 2:
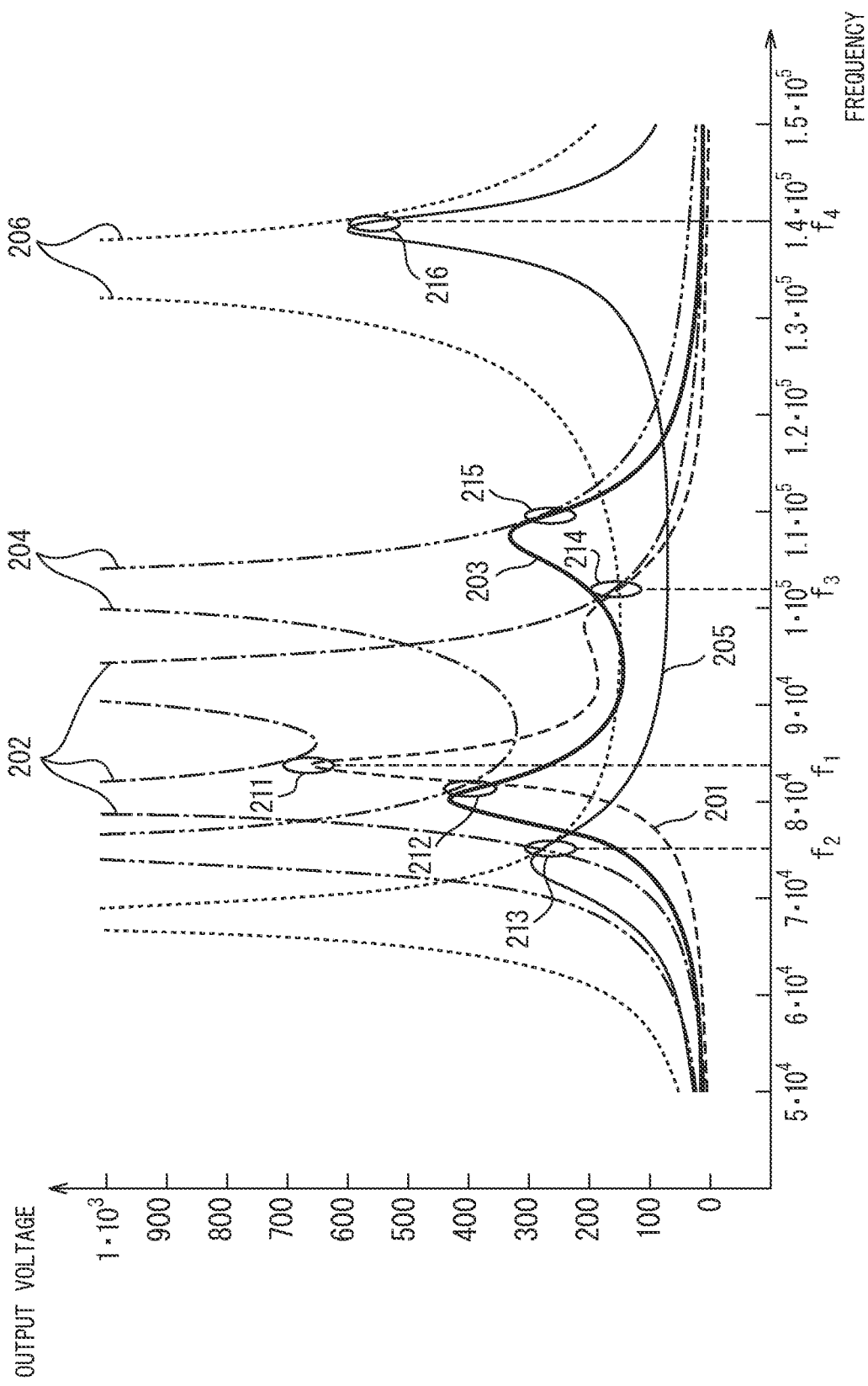
FIG. 2 is a diagram illustrating an example of simulation results of frequency responses of output voltage from the non-contact power supply device according to the SPL method.

FIG. 2 is a diagram illustrating an example of simulation results of frequency responses of output voltage from the non-contact power supply device according to the SPL method, which are calculated in accordance with the equation (2). In FIG. 2, frequency is plotted along the horizontal axis and output voltage is plotted along the vertical axis. Graph 201 represents a frequency response of the output voltage when the coupling coefficient k is set as k=0.15 and the AC equivalent resistance of the load circuit is set at Rac. In addition, graph 202 represents a frequency response of the output voltage when the coupling coefficient k is set as k=0.15 and the AC equivalent resistance of the load circuit is set at (10*Rac). In addition, graph 203 represents a frequency response of the output voltage when the coupling coefficient k is set as k=0.3 and the AC equivalent resistance of the load circuit is set at Rac. In addition, graph 204 represents a frequency response of the output voltage when the coupling coefficient k is set as k=0.3 and the AC equivalent resistance of the load circuit is set at (10*Rac). Further, graph 205 represents a frequency response of the output voltage when the coupling coefficient k is set as k=0.6 and the AC equivalent resistance of the load circuit is set at Rac. In addition, graph 206 represents a frequency response of the output voltage when the coupling coefficient k is set as k=0.6 and the AC equivalent resistance of the load circuit is set at (10*Rac). Note that, in the simulation, it is assumed that Lp=174 µH, Cr1=Cp=20 nF, Lop=3Lp, Ri=Ris=0.3Ω, n=1, Vin=200 V, and Ro=200Ω (Rac≈162.1Ω).

As illustrated by points 211 to 216 in FIG. 2, there exist six combinations of a frequency and an output voltage at which the output voltage becomes substantially constant even when the AC equivalent resistance of the load circuit changes under the condition that the coupling coefficient k is constant (i.e., constant voltage output is obtained when the coupling coefficient k is constant). Among the points 211 to 216, the points 211 to 213 on the low frequency side are close to the resonance frequency of the resonance circuit on the power transmission side and are influenced by the resonance of the resonance circuit on the power transmission side. On the other hand, the points 214 to 216 on the high frequency side are a certain amount higher than the resonance frequency of the resonance circuit on the power transmission side and are little influenced by the resonance of the resonance circuit on the power transmission side. Since, in the SPL method, in general, the resonance circuit on the power transmission side is also resonated, AC power having frequencies as illustrated by the points 211 to 213 is necessarily supplied to the resonance circuit on the power transmission side in order to make the non-contact power supply device perform the constant voltage output operation.

Figure 3:
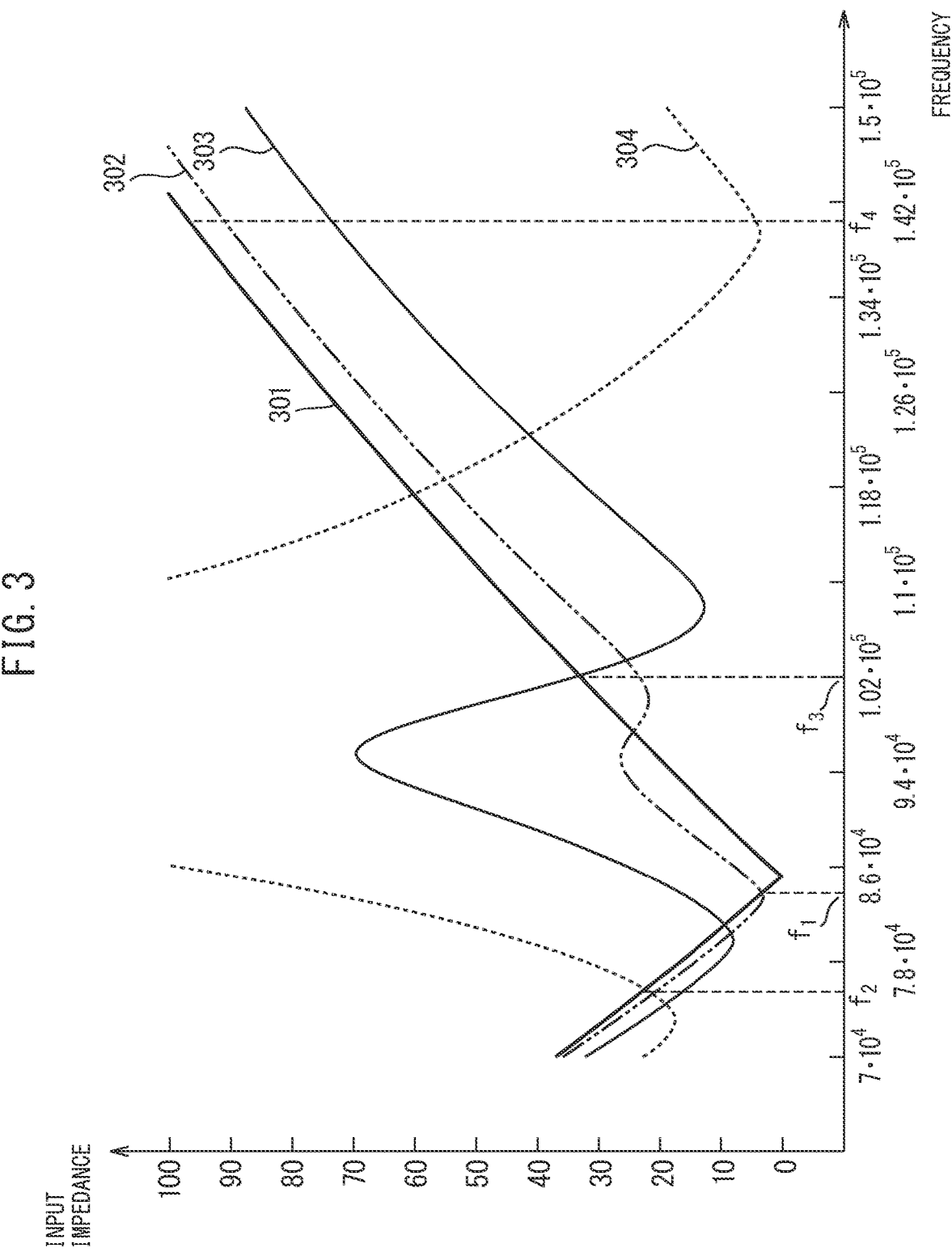
FIG. 3 is a diagram illustrating an example of simulation results of frequency responses of input impedance of the non-contact power supply device according to the SPL method.

FIG. 3 is a diagram illustrating an example of simulation results of frequency responses of input impedance Zinspl(s, k, Rac) of the non-contact power supply device according to the SPL method. In FIG. 3, frequency is plotted along the horizontal axis and input impedance is plotted along the vertical axis. Graphs 301 to 304 represent frequency responses of the input impedance Zinspl(s, k, Rac) when the AC equivalent resistance of the load circuit is set at Rac and the coupling coefficients k are set at 0.001, 0.15, 0.3, and 0.6, respectively. Note that the frequency responses of the input impedance Zinspl(s, k, Rac) illustrated by the graphs 301 to 304 were calculated by inputting values of the respective parameters used in the simulation illustrated in FIG. 2 into an equation of the input impedance Zinspl(s, k, Rac) that is expressed by the following equation.

[Math. 3]

$$Zinspl(s, k, Rac) = \frac{Fspl(s, k, Rac)_{0,0}}{Fspl(s, k, Rac)_{1,0}} \quad (3)$$

In the above equation, Fspl(s, k, Rac)$_{1,0}$ represents the lower left element of the F-matrix expressed by the equation (1).

As illustrated in FIG. 3, in a frequency range close to the resonance frequency of the resonance circuit on the power transmission side, as the coupling coefficient decreases, the input impedance becomes lower at frequencies at which a constant voltage is output. For example, at a frequency f1, illustrated by the point 211, at which the non-contact power supply device can perform the constant voltage output operation when the coupling coefficient k=0.15, the input impedance at the coupling coefficient k=0.15 has a value smaller than 10Ω. This is because energy stored in the transmission coil increases caused by increase in current flowing through the resonance circuit on the power transmission side due to resonance of the resonance circuit. Thus, in the SPL method, supplying the resonance circuit on the power transmission side with AC power when the coupling coefficient is low causes energy loss to increase. In addition, as can be seen from the points 211 to 213, the output gain does not necessarily improve even when the coupling coefficient increases.

On the other hand, in a frequency range that is higher than the resonance frequency of the resonance circuit on the power transmission side and does not cause the resonance circuit on the power transmission side to resonate and in which the non-contact power supply device can perform the constant voltage output operation even when the coupling coefficient changes (for example, a range from a frequency f3 corresponding to the point 214 to a frequency f4 corresponding to the point 216), the input impedance increases to a certain level and the energy loss is therefore suppressed. However, the frequency range becomes wider than a frequency range in which the resonance circuit on the power transmission side resonates and the constant voltage output operation can be performed (a range from the frequency f2 to the frequency f1).

It is considered that this is because the resonance frequency of the resonance circuit on the power reception side varies depending on the coupling coefficient.

Accordingly, the non-contact power supply device according to the embodiment of the present invention supplies power from a power transmission device configured to supply a transmission coil with AC power having a frequency at which the transmission coil does not resonate to a power reception device including a resonance circuit that causes parallel resonance and a coil connected in series with a reception coil included in the resonance circuit. A coil that is connected in series with the transmission coil and is not coupled with the reception coil even at the time of power transmission is disposed to the power transmission device, and whether or not both ends of the coil are short-circuited is switched depending on whether or not the constant voltage output operation is performed in a frequency range determined in accordance with the coupling coefficient between the transmission coil and the reception coil. This configuration enables the non-contact power supply device to narrow an adjustment range of frequency of AC power supplied to the transmission coil at the time of performing the constant voltage output operation and suppress Joule loss due to increase in current flowing through the transmission coil.

Further, the non-contact power supply device measures output voltage from the resonance circuit on the power reception side and controls switching frequency and voltage of the AC power supplied to the transmission coil in such a way that the measured value falls within an allowance range of voltage at the time of the constant voltage output operation and thereby maintains the constant voltage output operation even when the coupling coefficient between the transmission coil and the reception coil or the resistance of the load circuit changes.

Note that, as used herein, the constant voltage output operation is an operation in which the non-contact power supply device operates in such a way that output voltage is maintained within an allowance range of voltage (for example, within ±10% of a predetermined voltage reference value) that is determined in accordance with the specification of a load circuit connected to the non-contact power supply device and the like.

Figure 4:
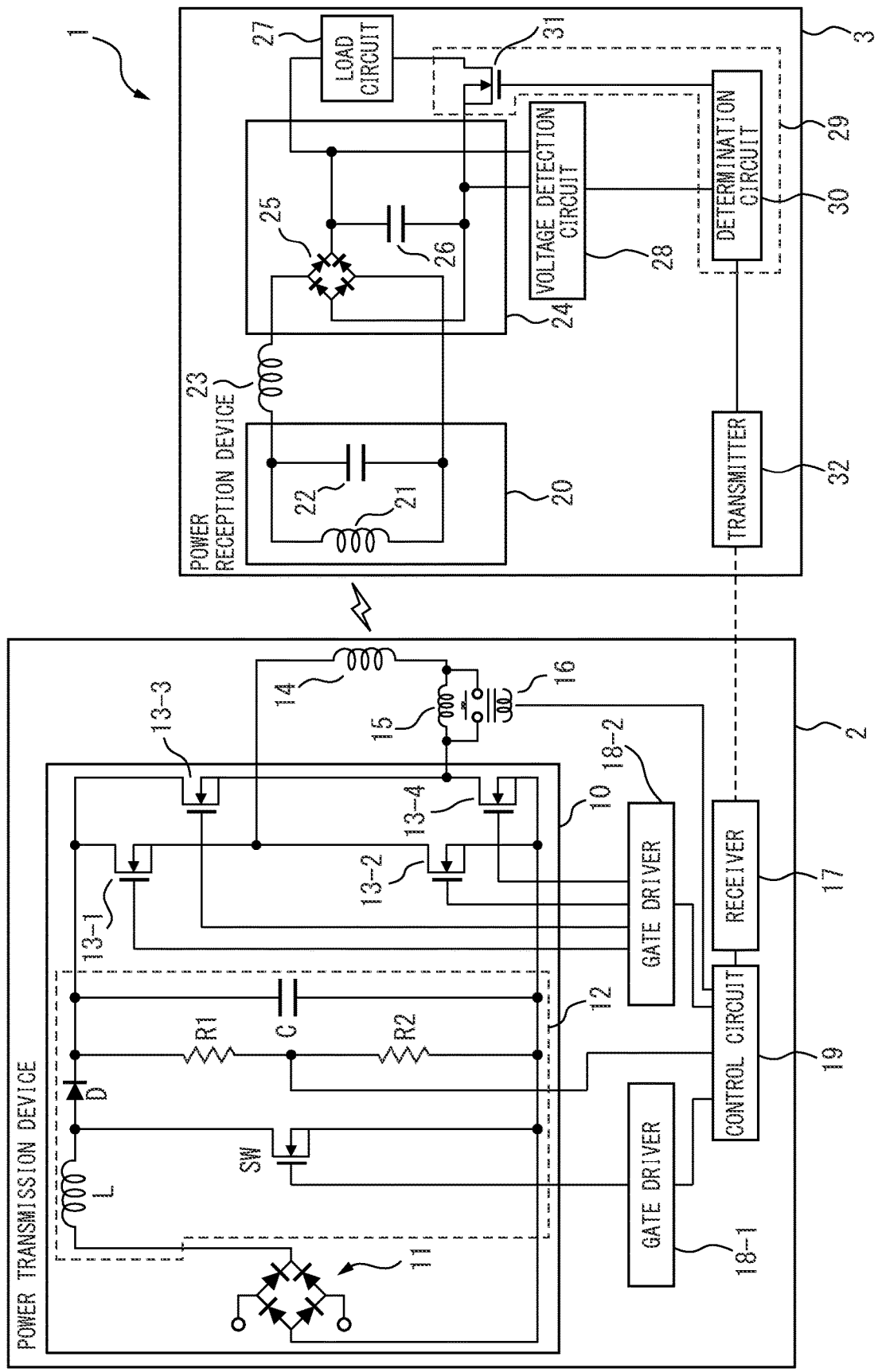
FIG. 4 is a schematic configuration view of a non-contact power supply device according to an embodiment of the present invention.

FIG. 4 is a schematic configuration view of a non-contact power supply device according to an embodiment of the present invention. As illustrated in FIG. 4, a non-contact power supply device 1 includes a power transmission device 2 and a power reception device 3 to which power is transmitted from the power transmission device 2 through space without contact. The power transmission device 2 includes a power supply circuit 10, a transmission coil 14, a coil 15, a relay 16, a receiver 17, gate drivers 18-1 and 18-2, and a control circuit 19. On the other hand, the power reception device 3 includes a resonance circuit 20 that includes a reception coil 21 and a resonance capacitor 22, a coil 23, a rectification and smoothing circuit 24, a load circuit 27, a voltage detection circuit 28, a constant voltage determination circuit 29, and a transmitter 32.

First, the power transmission device 2 will be described.

The power supply circuit 10 supplies the transmission coil 14 with AC power having adjustable switching frequency and adjustable voltage. To that end, the power supply circuit 10 includes a power source 11, a power factor improvement circuit 12, and four switching elements 13-1 to 13-4.

The power source 11 supplies power having a predetermined pulsating voltage. To that end, the power source 11 is connected to a commercial AC power source and includes a full-wave rectification circuit to rectify AC power supplied by the AC power source.

The power factor improvement circuit 12 converts the voltage of the power output from the power source 11 to a voltage that is determined in accordance with control from the control circuit 19 to output the converted voltage. To that end, the power factor improvement circuit 12 includes, for example, a coil L and a diode D that are connected in series in this order from the positive electrode terminal of the power source 11, a switching element SW whose drain terminal and source terminal are connected between the coil L and the diode D and connected to the negative electrode terminal of the power source 11, respectively, and that is an n-channel MOSFET, and a smoothing capacitor C that is connected in parallel with the switching element SW with the diode D interposed therebetween. In addition, the gate terminal of the switching element SW is connected to the gate driver 18-1. Further, the power factor improvement circuit 12 includes two resistors R1 and R2 that are connected in series between the positive electrode terminal and the negative electrode terminal of the power source 11. The resistors R1 and R2 are connected between the diode D and the smoothing capacitor C in parallel with the smoothing capacitor C. Voltage between the resistor R1 and the resistor R2 is measured by the control circuit 19 as a measurement representing voltage output from the diode D.

The power factor improvement circuit 12 performs power factor improvement operation by the gate driver 18-1 controlling switching of the switching element SW between on and off states in accordance with a duty ratio designated by the control circuit 19 and in such a way that a trajectory of a current waveform output from the diode D coincides with a trajectory of voltage supplied from the power source 11.

The higher the duty ratio at which the switching element SW is turned on, the higher the voltage output from the diode D becomes.

The voltage output from the diode D is smoothed by the smoothing capacitor C and supplied to the transmission coil 14 via the four switching elements 13-1 to 13-4.

Note that the power factor improvement circuit 12 is not limited to the above-described configuration and may have another configuration capable of adjusting output voltage, controlled by the control circuit 19.

For the four switching elements 13-1 to 13-4, for example, n-channel MOSFETs can be used. Among the four switching elements 13-1 to 13-4, the switching element 13-1 and the switching element 13-2 are connected in series between the positive electrode terminal and negative electrode terminal of the power source 11 via the power factor improvement circuit 12. In addition, in the present embodiment, the switching element 13-1 is connected to the positive electrode side of the power source 11, whereas the switching element 13-2 is connected to the negative electrode side of the power source 11. The drain terminal of the switching element 13-1 is connected to the positive electrode terminal of the power source 11 via the power factor improvement circuit 12, and the source terminal of the switching element 13-1 is connected to the drain terminal of the switching element 13-2. In addition, the source terminal of the switching element 13-2 is connected to the negative electrode terminal of the power source 11 via the power factor improvement circuit 12. Further, the source terminal of the switching element 13-1 and the drain terminal of the switching element 13-2 are connected to one end of the transmission coil 14, and the source terminal of the switching element 13-2 is connected to the other end of the transmission coil 14 via the switching element 13-4 and the coil 15.

Similarly, among the four switching elements 13-1 to 13-4, the switching element 13-3 and the switching element 13-4 are connected in parallel with the switching element 13-1 and the switching element 13-2 and in series between the positive electrode terminal and negative electrode terminal of the power source 11 via the power factor improvement circuit 12. In addition, the switching element 13-3 is connected to the positive electrode side of the power source 11, whereas the switching element 13-4 is connected to the negative electrode side of the power source 11. The drain terminal of the switching element 13-3 is connected to the positive electrode terminal of the power source 11 via the power factor improvement circuit 12, and the source terminal of the switching element 13-3 is connected to the drain terminal of the switching element 13-4. In addition, the source terminal of the switching element 13-4 is connected to the negative electrode terminal of the power source 11 via the power factor improvement circuit 12. Further, the source terminal of the switching element 13-3 and the drain terminal of the switching element 13-4 are connected to the other end of the transmission coil 14 via the coil 15.

In addition, the gate terminals of the switching elements 13-1 to 13-4 are connected to the control circuit 19 via the gate driver 18-2. Further, each of the switching elements 13-1 to 13-4 may have its gate terminal connected to its own source terminal via a resistor to ensure that the switching element is turned on when a voltage to turn on the switching element is applied. The switching elements 13-1 to 13-4 are switched between on and off states at an adjustable switching frequency in accordance with a control signal from the control circuit 19. In the present embodiment, a pair of the switching element 13-1 and the switching element 13-4 and a pair of the switching element 13-2 and the switching element 13-3 are alternately switched between on and off states in such a way as to turn off the switching element 13-2 and the switching element 13-3 while the switching element 13-1 and the switching element 13-4 are turned on and, conversely, to turn off the switching element 13-1 and the switching element 13-4 while the switching element 13-2 and the switching element 13-3 are turned on. This configuration causes DC power supplied from the power source 11 via the power factor improvement circuit 12 to be converted into AC power having the switching frequency of the switching elements and supplied to the transmission coil 14.

The transmission coil 14 transmits the AC power supplied from the power supply circuit 10 to the resonance circuit 20 of the power reception device 3 through space.

The coil 15 is connected between the transmission coil 14 and the power supply circuit 10. In the present embodiment, one end of the coil 15 is connected to the transmission coil 14, and the other end of the coil 15 is connected to the source terminal of the switching element 13-3 and the drain terminal of the switching element 13-4 of the power supply circuit 10.

The coil 15 is an example of a first coil and is disposed in such a way as not to be coupled with the reception coil 21 even while power transmission from the power transmission device 2 to the power reception device 3 is being performed. This configuration enables the adjustment range of switching frequency of the AC power supplied to the transmission coil 14 for continuing the constant voltage output operation even when the coupling coefficient between the transmission coil 14 and the reception coil 21 varies to be narrowed. Further, the relay 16 being turned on causes both ends of the coil 15 to be short-circuited. Since the frequency response of output voltage from the non-contact power supply device 1 differs between when both ends of the coil 15 are short-circuited and when not short-circuited (i.e., when open-circuited), switching between short-circuiting and open-circuiting both ends of the coil 15 enables the adjustment range of switching frequency to be further narrowed.

The relay 16 is an example of a first short-circuiting circuit and is disposed in such a way that one end and the other end thereof are connected to one end and the other end of the coil 15, respectively, i.e., in parallel with the coil 15. The relay 16 is switched between on and off states by the control circuit 19. The control circuit 19 turning on the relay 16 causes both ends of the coil 15 to be short-circuited, and, as a result, current comes to flow through the transmission coil 14 without flowing through the coil 15. On the other hand, the control circuit 19 turning off the relay 16 causes both ends of the coil 15 not to be short-circuited (i.e., both ends of the coil 15 are open-circuited), and current flowing through the transmission coil 14 also comes to flow through the coil 15.

The receiver 17 is an example of a second communication device and, every time receiving a wireless signal from the transmitter 32 of the power reception device 3, takes out determination information indicating whether or not the non-contact power supply device 1 is performing the constant voltage output operation from the wireless signal and outputs the determination information to the control circuit 19. To that end, the receiver 17 includes, for example, an antenna for receiving a wireless signal and a communication circuit for demodulating the wireless signal in accordance with a predetermined wireless communication standard. Note that the predetermined wireless communication standard may be, for example, ISO/IEC 15693, ZigBee (registered trademark), or Bluetooth (registered trademark).

The gate driver 18-1 receives a control signal for switching the switching element SW of the power factor improvement circuit 12 between on and off states from the control circuit 19 and, in accordance with the control signal, changes voltage applied to the gate terminal of the switching elements SW. In other words, upon receiving a control signal to turn on the switching element SW, the gate driver 18-1 applies to the gate terminal of the switching element SW such a relatively high voltage as to turn on the switching element SW. On the other hand, upon receiving a control signal to turn off the switching element SW, the gate driver 18-1 applies to the gate terminal of the switching element SW such a relatively low voltage as to turn off the switching element SW. This configuration causes the gate driver 18-1 to switch the switching element SW of the power factor improvement circuit 12 between on and off states at timings designated by the control circuit 19.

The gate driver 18-2 receives a control signal for switching the switching elements 13-1 to 13-4 between on and off states from the control circuit 19 and, in accordance with the control signal, changes voltage applied to the gate terminals of the switching elements 13-1 to 13-4. In other words, upon receiving a control signal to turn on the switching element 13-1 and the switching element 13-4, the gate driver 18-2 applies to the gate terminal of the switching element 13-1 and the gate terminal of the switching element 13-4 such a relatively high voltage as to turn on the switching element 13-1 and the switching element 13-4. This operation causes current from the power source 11 to flow through the switching element 13-1, the transmission coil 14, and the switching element 13-4. On the other hand, upon receiving a control signal to turn off the switching element 13-1 and the switching element 13-4, the gate driver 18-2 applies to the gate terminal of the switching element 13-1 and the gate terminal of the switching element 13-4 such a relatively low voltage as to turn off the switching element 13-1 and the switching element 13-4 and as to prevent current from the power source 11 from flowing through the switching element 13-1 and the switching element 13-4. Similarly, the gate driver 18-2 controls voltage applied to the gate terminals of the switching element 13-2 and the switching element 13-3. Thus, when the switching element 13-1 and the switching element 13-4 are turned off and the switching element 13-2 and the switching element 13-3 are turned on, current from the power source 11 comes to flow through the switching element 13-3, the transmission coil 14, and the switching element 13-2.

The control circuit 19 includes, for example, a non-volatile memory circuit and a volatile memory circuit, an arithmetic operation circuit, and an interface circuit for connection to other circuits. Every time the control circuit 19 receives determination information from the receiver 17, the control circuit 19 controls the switching frequency and voltage of the AC power supplied from the power supply circuit 10 to the transmission coil 14 in accordance with the determination information.

To that end, in the present embodiment, the control circuit 19 controls the switching elements 13-1 to 13-4 in such a way that the pair of the switching element 13-1 and the switching element 13-4 and the pair of the switching element 13-2 and the switching element 13-3 are alternately turned on and that a duration for which the pair of the switching element 13-1 and the switching element 13-4 are in the on state and a duration for which the pair of the switching element 13-2 and the switching element 13-3 are in the on state are equal to each other in one period corresponding to the switching frequency. Note that, in order to prevent the pair of the switching element 13-1 and the switching element 13-4 and the pair of the switching element 13-2 and the switching element 13-3 from being simultaneously in the on state and the power source 11 from being short-circuited, the control circuit 19 may set a dead time during which both pairs of switching elements are turned off when the pair of the switching element 13-1 and the switching element 13-4 and the pair of the switching element 13-2 and the switching element 13-3 are switched between on and off states.

In addition, the control circuit 19, referring to a reference table each entry of which indicates a relationship between a switching frequency and a duty ratio that corresponds to an applied voltage to the transmission coil 14 that causes a constant voltage to be output at the switching frequency and is used in the on/off control of the switching element SW of the power factor improvement circuit 12, selects a duty ratio corresponding to a desired switching frequency. The control circuit 19 determines timings at which the switching element SW is switched between on and off states, on the basis of the duty ratio and change in the output voltage from the diode D of the power factor improvement circuit 12 and outputs control signals representing the timings to the gate driver 18-1.

Further, when the receiver 17 is unable to receive a wireless signal from the power reception device 3, it is estimated that the power reception device 3 is not present at a position enabling the power reception device 3 to receive power supply from the power transmission device 2, i.e., the power transmission device 2 is in a standby state. Thus, in this case, the control circuit 19 may set the duty ratio for the on/off control of the switching element SW at a minimum value that can be set. Alternatively, the control circuit 19 may control the power supply circuit 10 in a so-called burst mode, which repeats control of making the power supply circuit 10 operate with the duty ratio for the on/off control of the switching element SW set at a preset value for a relatively short, fixed duration (for example, approximately several seconds) and subsequently suspending the power supply from the power supply circuit 10 to the transmission coil 14 with the switching elements kept in the off state for a relatively long duration (for example, approximately several minutes). Since this control causes voltage applied to the transmission coil 14 to be set at a minimum value that can be set while the power transmission device 2 is in the standby state, energy loss can be suppressed.

Further, the control circuit 19 narrows the adjustment range of switching frequency by controlling switching of the relay 16 between on and off states when searching for a switching frequency at which the non-contact power supply device 1 performs the constant voltage output operation.

Note that details of the on/off control of the relay 16 and the control of the switching frequency and the applied voltage to the transmission coil 14 by the control circuit 19 will be described later.

Next, the power reception device 3 will be described.

The resonance circuit 20 is an LC resonance circuit in which the reception coil 21 and the resonance capacitor 22 are connected in parallel with each other. One end of the reception coil 21 included in the resonance circuit 20 is connected to one end of the resonance capacitor 22 and, in conjunction therewith, connected to one input terminal of the rectification and smoothing circuit 24 via the coil 23. In addition, the other end of the reception coil 21 is connected to the other end of the resonance capacitor 22 and, in conjunction therewith, connected to the other input terminal of the rectification and smoothing circuit 24.

The reception coil 21 receives power from the transmission coil 14 by resonating with the AC current flowing through the transmission coil 14 of the power transmission device 2. The reception coil 21 outputs the received power to the rectification and smoothing circuit 24 via the resonance capacitor 22 and the coil 23. Note that the number of turns in the winding of the reception coil 21 and the number of turns in the winding of the transmission coil 14 of the power transmission device 2 may be identical or different.

The resonance capacitor 22 is, at one end, connected to one end of the reception coil 21 and, in conjunction therewith, connected to the coil 23 and is connected at the other end to the other end of the reception coil 21 and the rectification and smoothing circuit 24. The resonance capacitor 22 outputs the power received by the reception coil 21 to the rectification and smoothing circuit 24 via the coil 23.

The coil 23 is an example of a second coil and is connected between the resonance circuit 20 and the rectification and smoothing circuit 24. In the present embodiment, the coil 23 is connected at one end to the reception coil 21 and the resonance capacitor 22 in such a way as to be in series with the reception coil 21 and at the other end to the rectification and smoothing circuit 24. The coil 23 outputs the power received from the resonance circuit 20 to the rectification and smoothing circuit 24. Note that, as with the SPL method, disposing the coil 23 enables harmonic components of the received power to be suppressed.

The rectification and smoothing circuit 24 is an example of a rectification circuit, includes a full-wave rectification circuit 25 that includes four diodes connected in a bridge circuit and a smoothing capacitor 26, and rectifies and smooths the power which is received via the resonance circuit 20 and the coil 23 to convert the power into DC power. The rectification and smoothing circuit 24 outputs the DC power to the load circuit 27.

The voltage detection circuit 28 detects output voltage between both terminals of rectification and smoothing circuit 24. Since the output voltage between both terminals of the rectification and smoothing circuit 24 corresponds one-to-one to the output voltage of the resonance circuit 20, a measured value of the output voltage between both terminals of the rectification and smoothing circuit 24 indirectly represents a measured value of the output voltage of the resonance circuit 20. For the voltage detection circuit 28, for example, any of various known voltage detection circuits that can detect DC voltage can be used. The voltage detection circuit 28 outputs a voltage detection signal representing a measured value of the output voltage to the constant voltage determination circuit 29.

The constant voltage determination circuit 29 determines, on the basis of the measured value of the output voltage received from the voltage detection circuit 28, whether or not the non-contact power supply device 1 is performing the constant voltage output operation and whether or not the measured value of the output voltage falls within an allowance range of voltage when the constant voltage output operation is performed. The constant voltage determination circuit 29 notifies the transmitter 32 of a result of the determination. To that end, the constant voltage determination circuit 29 includes, for example, a memory circuit configured to store the allowance range of voltage and a determination circuit 30 including an arithmetic operation circuit configured to compare a measured value of the output voltage with the allowance range of voltage.

Further, the constant voltage determination circuit 29 includes a switching element 31, such as a MOSFET, that is connected between the rectification and smoothing circuit 24 and the load circuit 27. The switching element 31, when turned off, prevents current from flowing from the rectification and smoothing circuit 24 to the load circuit 27 (i.e., Rac=G0) whereas the switching element 31, when turned on, allows current to flow from the rectification and smoothing circuit 24 to the load circuit 27. The determination circuit 30 of the constant voltage determination circuit 29 switches the switching element 31 between on and off states at a predetermined period while measured values of the output voltage are out of the allowance range of voltage. This operation causes the resistance of the whole circuit including the load circuit 27, which is connected to the rectification and smoothing circuit 24, to change at the predetermined period. Therefore, the determination circuit 30 is able to determine whether or not the non-contact power supply device 1 is performing the constant voltage output operation by determining whether or not the measured values of the output voltage become substantially constant while switching the switching element 31 between on and off states. Thus, while measured values of the output voltage are substantially constant even when the determination circuit 30 switches the switching element 31 between on and off states at a predetermined period, the determination circuit 30 notifies the transmitter 32 that the non-contact power supply device 1 is performing the constant voltage output operation.

In addition, when measured values of the output voltage indicate that the non-contact power supply device 1 is performing the constant voltage output operation for a certain duration longer than the predetermined period, the determination circuit 30 suspends the switching of the switching element 31 between on and off states and maintains the switching element 31 in the on state. The determination circuit 30 determines whether or not the measured value of the output voltage falls within the allowance range of voltage and notifies the transmitter 32 of a result of the determination.

When the measured values of the output voltage fall within the allowance range of voltage for a certain duration longer than the predetermined period, the determination circuit 30 notifies the transmitter 32 of a determination result indicating that the non-contact power supply device 1 is performing the constant voltage output operation and the measured values of the output voltage are within the allowance range of voltage.

Note that, according to a variation, the constant voltage determination circuit 29 may include a resistor that is connected to the rectification and smoothing circuit 24 in parallel with the load circuit 27. In this case, the switching element 31 may be disposed in such a way as to be in series with the resistor and in parallel with the load circuit 27. In this case, the determination circuit 30 turns off the switching element 31 while measured values of the output voltage fall within the allowance range of voltage. On the other hand, when a measured value of the output voltage is out of the allowance range of voltage, the determination circuit 30 may, as with the above-described embodiment, switch the switching element 31 between on and off states at the predetermined period. According to the variation, the power supply to the load circuit 27 is maintained even when the non-contact power supply device 1 is not performing the constant voltage output operation.

Further, according to another variation, a second switching element, such as a MOSFET, may be disposed in parallel with the above-described resistor and in series with the load circuit 27. In this case, while measured values of the output voltage fall within the allowance range of voltage, the determination circuit 30 turns on the second switching element and thereby enables power supply to the load circuit 27. On the other hand, when a measured value of the output voltage is out of the allowance range of voltage, the determination circuit 30 may turn off the second switching element and suspend the power supply to the load circuit 27. Even when voltage of received power has increased to an excessively high level while the switching frequency is adjusted in the power transmission device 2, this configuration prevents the excessively high voltage from being applied to the load circuit 27.

The transmitter 32 is an example of a first communication device and, every predetermined transmission period, generates a wireless signal including determination information indicating whether or not the non-contact power supply device 1 is performing the constant voltage output operation and whether or not measured values of the output voltage fall within the allowance range of voltage, on the basis of a determination result received from the determination circuit 30 of the constant voltage determination circuit 29 and transmits the wireless signal to the receiver 17 of the power transmission device 2. To that end, the transmitter 32 includes, for example, a communication circuit that generates a wireless signal in accordance with a predetermined wireless communication standard and an antenna for outputting the wireless signal. Note that, as with the receiver 17, the predetermined wireless communication standard may be, for example, ISO/IEC 15693, ZigBee (registered trademark), or Bluetooth (registered trademark).

Operation of the non-contact power supply device 1 will be described in detail below.

In the present embodiment, the control circuit 19 of the power transmission device 2 controls switching of the relay between on and off states and switching frequency and voltage of AC power supplied from the power supply circuit 10 to the transmission coil 14, on the basis of determination information received from the receiver 17, in such a way that the non-contact power supply device 1 continues the constant voltage output operation.

The non-contact power supply device 1 differs from the non-contact power supply device according to the SPL method in that resonance of the resonance circuit is not used on the power transmission side and the non-contact power supply device 1 includes the coil 15 connected in series with the transmission coil 14. Therefore, the frequency response of the output voltage from the non-contact power supply device 1 when both ends of the coil 15 are short-circuited resembles the frequency response of the output voltage from the non-contact power supply device according to the SPL method when, in the equivalent circuit in FIG. 1, the capacitance Cr1 of the capacitor connected in series with the transmission coil in the resonance circuit on the power transmission side is increased and the resonance frequency of the resonance circuit on the power transmission side is thereby lowered in order to prevent the resonance of the resonance circuit on the power transmission side from influencing the power supply.

Figure 5:
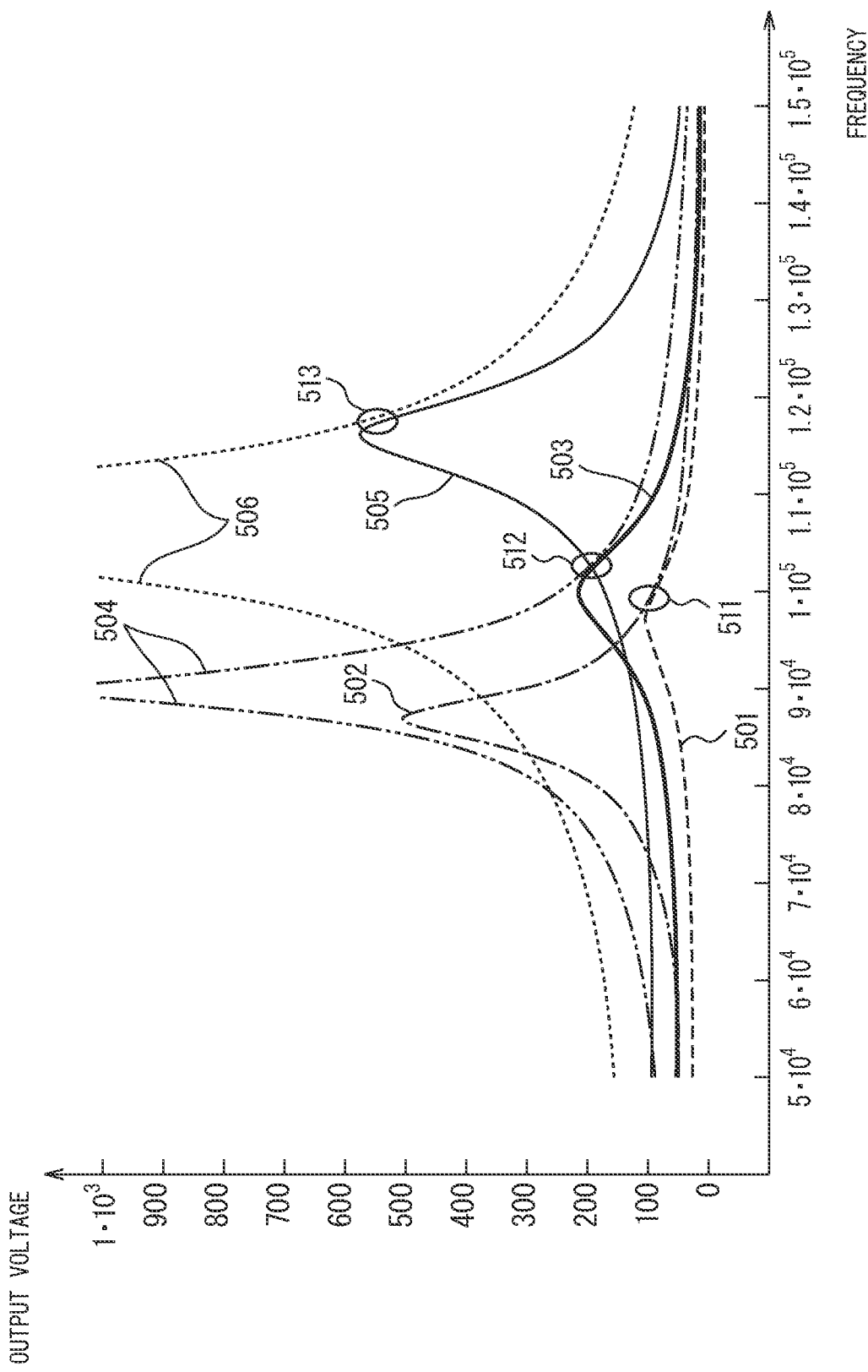
FIG. 5 is a diagram illustrating an example of simulation results of frequency responses of output voltage from the non-contact power supply device according to the present embodiment when both ends of a coil connected in series with a transmission coil are short-circuited.

FIG. 5 is a diagram illustrating an example of simulation results of frequency responses of output voltage from the non-contact power supply device 1 when both ends of the coil 15 are short-circuited. In FIG. 5, frequency is plotted along the horizontal axis and output voltage is plotted along the vertical axis. Note that, in the simulation, the same values as the values of parameters of the respective circuit elements used in the simulation illustrated in FIG. 2 were used. Graph 501 represents a frequency response of the output voltage when the coupling coefficient k is set as k=0.15 and the AC equivalent resistance of the load circuit 27 is set at Rac. In addition, graph 502 represents a frequency response of the output voltage when the coupling coefficient k is set as k=0.15 and the AC equivalent resistance of the load circuit 27 is set at (10*Rac). In addition, graph 503 represents a frequency response of the output voltage when the coupling coefficient k is set as k=0.3 and the AC equivalent resistance of the load circuit 27 is set at Rac. In addition, graph 504 represents a frequency response of the output voltage when the coupling coefficient k is set as k=0.3 and the AC equivalent resistance of the load circuit 27 is set at (10*Rac). Further, graph 505 represents a frequency response of the output voltage when the coupling coefficient k is set as k=0.6 and the AC equivalent resistance of the load circuit 27 is set at Rac. In addition, graph 506 represents a frequency response of the output voltage when the coupling coefficient k is set as k=0.6 and the AC equivalent resistance of the load circuit 27 is set at (10*Rac).

In FIG. 5, since the transmission coil 14 does not resonate, extreme values of the output voltage disappeared on the low frequency side compared with FIG. 2, in the frequency range illustrated in FIG. 5. However, even in this case, there exists, for every coupling coefficient, a combination of a frequency and an output voltage at which the output voltage becomes substantially constant (i.e., a constant voltage is output) even when the AC equivalent resistance of the load circuit 27 changes under the condition that the coupling coefficient k does not change (there exist three combinations illustrated by points 511 to 513 in the Figure). Therefore, it is revealed that, even when AC power having a switching frequency at which the transmission coil 14 does not resonate is applied to the transmission coil 14, it is possible to make the non-contact power supply device 1 perform the constant voltage output operation against change in the resistance of the load circuit 27. Further, although, as illustrated by the points 511 to 513, output voltages when a constant voltage is output against variation in the resistance of the load circuit 27 differ from one another depending on the coupling coefficient, the differences in the output voltages can be reduced to a substantially constant output voltage without depending on the coupling coefficient by adjusting voltage applied to the transmission coil 14.

Figure 6:
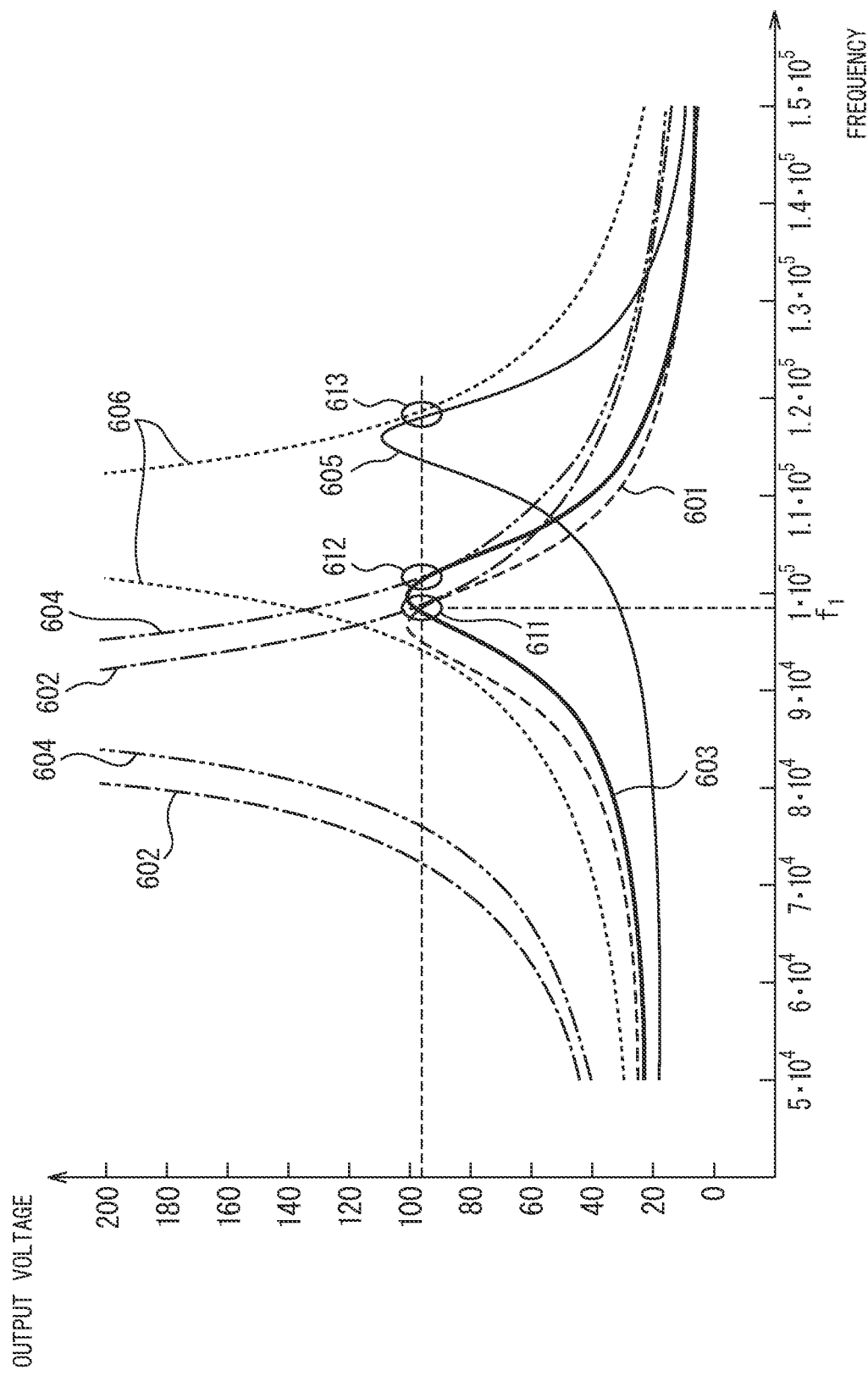
FIG. 6 is a diagram illustrating an example of simulation results of frequency responses of the output voltage when voltage applied to the transmission coil is changed in accordance with a coupling coefficient in the simulation illustrated in FIG. 5.

FIG. 6 is a diagram illustrating an example of simulation results of frequency responses of the output voltage when the voltage applied to the transmission coil 14 is changed in accordance with the coupling coefficient in the simulation illustrated in FIG. 5. In FIG. 6, frequency is plotted along the horizontal axis and output voltage is plotted along the vertical axis. Graph 601 represents a frequency response of the output voltage when the coupling coefficient k is set as k=0.15, the AC equivalent resistance of the load circuit 27 is set at Rac, and the voltage applied to the transmission coil is set at Vin. In addition, graph 602 represents a frequency response of the output voltage when the coupling coefficient k is set as k=0.15, the AC equivalent resistance of the load circuit 27 is set at (10*Rac), and the voltage applied to the transmission coil is set at Vin. In addition, graph 603 represents a frequency response of the output voltage when the coupling coefficient k is set as k=0.3, the AC equivalent resistance of the load circuit 27 is set at Rac, and the voltage applied to the transmission coil is set at (0.47*Vin). In addition, graph 604 represents a frequency response of the output voltage when the coupling coefficient k is set as k=0.3, the AC equivalent resistance of the load circuit 27 is set at (10*Rac), and the voltage applied to the transmission coil is set at (0.47*Vin). Further, graph 605 represents a frequency response of the output voltage when the coupling coefficient k is set as k=0.6, the AC equivalent resistance of the load circuit 27 is set at Rac, and the voltage applied to the transmission coil is set at (0.19*Vin). In addition, graph 606 represents a frequency response of the output voltage when the coupling coefficient k is set as k=0.6, the AC equivalent resistance of the load circuit 27 is set at (10*Rac), and the voltage applied to the transmission coil is set at (0.19*Vin).

Combinations of a frequency and an output voltage that correspond to the points 511 to 513 illustrated in FIG. 5 and at which the output voltage becomes substantially constant (i.e., a constant voltage is output) even when the AC equivalent resistance of the load circuit 27 changes under the condition that the coupling coefficient k does not change are three combinations indicated by points 611 to 613. The output voltages at the respective points 611 to 613 are substantially equal to one another.

The above description reveals that, even when either the resistance of the load circuit 27 or the coupling coefficient changes, appropriately adjusting the switching frequency and voltage of the AC power applied to the transmission coil 14 enables the output voltage to be maintained substantially constant.

Note, however, that, as illustrated in FIG. 6, the frequency at which the non-contact power supply device 1 performs the constant voltage output operation becomes higher as the coupling coefficient increases. In addition, in order to make the output voltage at the time of the coupling coefficient k=0.6 substantially equal to the output voltage at the time of the coupling coefficient k=0.15, the input voltage at the time of the coupling coefficient k=0.6 needs to be 0.19 times the input voltage at the time of the coupling coefficient k=0.15. Since the power transmission performed with input voltage reduced as described above causes current flowing through the transmission coil 14 to increase even if the power factor is good, there is a possibility that Joule loss increases.

Figure 7:
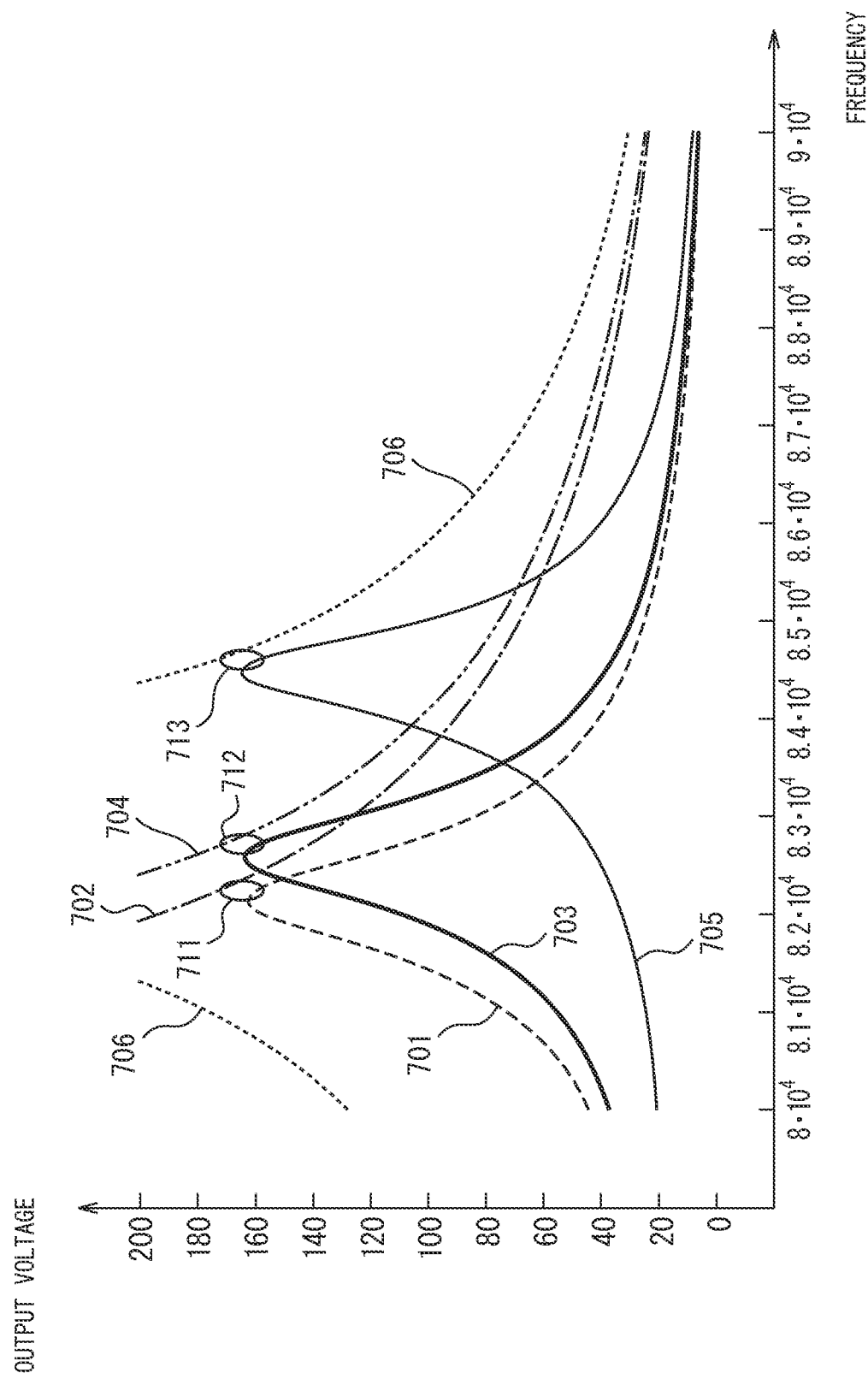
FIG. 7 is a diagram illustrating an example of simulation results of frequency responses of the output voltage from the non-contact power supply device in accordance with the present embodiment when both ends of a coil connected in series with the transmission coil are open-circuited and the voltage applied to the transmission coil is changed in accordance with the coupling coefficient.

FIG. 7 is a diagram illustrating an example of simulation results of frequency responses of the output voltage from the non-contact power supply device 1 when both ends of the coil 15 are open-circuited and the voltage applied to the transmission coil 14 is changed in accordance with the coupling coefficient. Note that, in the simulation, the same values as the values of parameters of the respective circuit elements used in the simulation illustrated in FIG. 2 were used except the inductance of the coil 15. In addition, the inductance of the coil 15 is set at 250 µH. In FIG. 7, frequency is plotted along the horizontal axis and output voltage is plotted along the vertical axis. Graph 701 represents a frequency response of the output voltage when the coupling coefficient k is set as k=0.15, the AC equivalent resistance of the load circuit 27 is set at Rac, and the voltage applied to the transmission coil 14 is set at Vin. In addition, graph 702 represents a frequency response of the output voltage when the coupling coefficient k is set as k=0.15, the AC equivalent resistance of the load circuit 27 is set at (10*Rac), and the voltage applied to the transmission coil 14 is set at Vin. In addition, graph 703 represents a frequency response of the output voltage when the coupling coefficient k is set as k=0.3, the AC equivalent resistance of the load circuit 27 is set at Rac, and the voltage applied to the transmission coil 14 is set at (0.48*Vin). In addition, graph 704 represents a frequency response of the output voltage when the coupling coefficient k is set as k=0.3, the AC equivalent resistance of the load circuit 27 is set at (10*Rac), and the voltage applied to the transmission coil 14 is set at (0.48*Vin). Further, graph 705 represents a frequency response of the output voltage when the coupling coefficient k is set as k=0.6, the AC equivalent resistance of the load circuit 27 is set at Rac, and the voltage applied to the transmission coil 14 is set at (0.22*Vin). In addition, graph 706 represents a frequency response of the output voltage when the coupling coefficient k is set as k=0.6, the AC equivalent resistance of the load circuit 27 is set at (10*Rac), and the voltage applied to the transmission coil 14 is set at (0.22*Vin).

In this case, although variation in the output voltage due to change in the resistance of the load circuit 27 increases, there exists a frequency at which the variation in the output voltage is suppressed for each coupling coefficient, as illustrated by points 711 to 713. In addition, it is evident that, in this case, adjusting the voltage of the AC power supplied to the transmission coil 14 also enables the output voltage to be maintained substantially constant without depending on the coupling coefficient. Further, with respect to the same coupling coefficient, the frequency at which a constant voltage is output is lower than that in the case where both ends of the coil 15 are short-circuited. Furthermore, since, on the power transmission side, inductance components that do not contribute to the power transmission increase, the gain for the same coupling coefficient is lower than that in the case where both ends of the coil 15 are short-circuited.

Therefore, it is revealed that searching for a switching frequency at which the non-contact power supply device 1 performs the constant voltage output operation with both ends of the coil 15 short-circuited when the coupling coefficient is relatively low and searching for a switching frequency at which the non-contact power supply device 1 performs the constant voltage output operation with both ends of the coil 15 open-circuited when the coupling coefficient is increased to a certain level enable the adjustment range of switching frequency to be narrowed.

Figure 8:
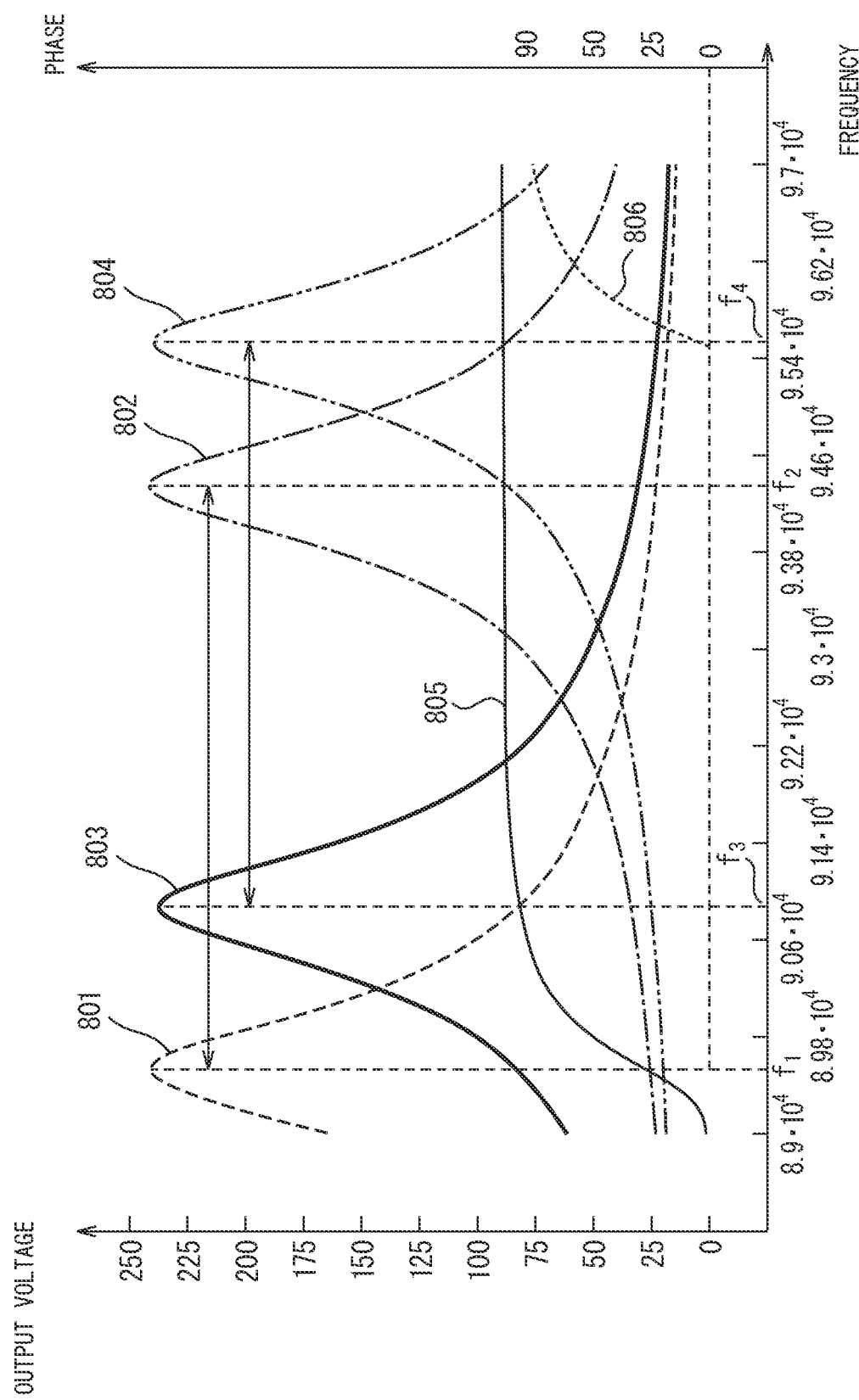
FIG. 8 is a diagram illustrating an example of simulation results of frequency responses of the output voltage from the non-contact power supply device when, while whether or not short-circuiting both ends of the coil connected in series with the transmission coil is switched, the voltage applied to the transmission coil is changed in accordance with the coupling coefficient.

FIG. 8 is a diagram illustrating an example of simulation results of frequency responses of the output voltage from the non-contact power supply device 1 when, while whether or not short-circuiting both ends of the coil 15 is switched, the voltage applied to the transmission coil 14 is changed in accordance with the coupling coefficient. In FIG. 8, frequency is plotted along the horizontal axis and output voltage is plotted along the vertical axis on the left side. In addition, phase is plotted along the vertical axis on the right side. Graph 801 represents a frequency response of the output voltage when both ends of the coil 15 are short-circuited, the coupling coefficient k is set as k=0.15, and the voltage applied to the transmission coil 14 is set at Vin. In addition, graph 802 represents a frequency response of the output voltage when both ends of the coil 15 are short-circuited, the coupling coefficient k is set as k=0.35, and the voltage applied to the transmission coil 14 is set at (0.4*Vin). In addition, graph 803 represents a frequency response of the output voltage when both ends of the coil 15 are open-circuited, the coupling coefficient k is set as k=0.36, and the voltage applied to the transmission coil 14 is set at Vin. Further, graph 804 represents a frequency response of the output voltage when both ends of the coil 15 are open-circuited, the coupling coefficient k is set as k=0.6, and the voltage applied to the transmission coil 14 is set at (0.56*Vin). Further, graph 805 represents a frequency response of delay of the phase of current with respect to the voltage applied to the transmission coil 14 when both ends of the coil 15 are short-circuited and the coupling coefficient k is set as k=0.15. Moreover, graph 806 represents a frequency response of delay of the phase of current with respect to the voltage applied to the transmission coil 14 when both ends of the coil 15 are open-circuited and the coupling coefficient k is set as k=0.6. Note that, in the simulation, it was assumed that inductance of the transmission coil 14 Lp=174 μH, capacitance of the resonance capacitor 22 Cp=20 nF, inductance of the coil 23 Lop=2200 μH, inductance of the coil 15 L1=250 μH, winding resistances Ri=Ris=0.1Ω, n=1, applied voltage of the transmission coil 14 Vin=260 V, and resistance of the load circuit 27 Ro=220Ω.

Further, frequency f1 is a frequency at which, when both ends of the coil 15 are short-circuited and the coupling coefficient k is set as k=0.15, the output voltage becomes substantially constant even when the resistance of the load circuit 27 changes, i.e., the non-contact power supply device 1 performs the constant voltage output operation. Similarly, frequency f2 is a frequency at which, when both ends of the coil 15 are short-circuited and the coupling coefficient k is set as k=0.35, the non-contact power supply device 1 performs the constant voltage output operation. In addition, frequency f3 is a frequency at which, when both ends of the coil 15 are open-circuited and the coupling coefficient k is set as k=0.36, the non-contact power supply device 1 performs the constant voltage output operation. Further, frequency f4 is a frequency at which, when both ends of the coil 15 are open-circuited and the coupling coefficient k is set as k=0.6, the non-contact power supply device 1 performs the constant voltage output operation.

As illustrated by the graphs 801 to 804, it is evident that, even when the coupling coefficient varies, appropriately adjusting the switching frequency and voltage of the AC power applied to the transmission coil 14 enables the output voltage to be maintained substantially constant.

Further, it is evident that, since a frequency range from the frequency f1 to the frequency f2 and a frequency range from the frequency f3 to the frequency f4 partially overlap each other, the adjustment range of switching frequency at which the non-contact power supply device 1 performs the constant voltage output operation can be narrowed, compared with the cases, illustrated in FIGS. 6 and 7, where whether or not short-circuiting both ends of the coil 15 is not switched.

Note that the lower limit of the adjustment range of switching frequency with both ends of the coil 15 open-circuited (i.e., a second frequency range) can be set at, for example, a frequency at which the voltage of the AC power supplied to the transmission coil 14 substantially coincides with a voltage of the AC power that is supplied to the transmission coil 14 when the coupling coefficient is the minimum of the expected values thereof. In addition, the upper limit of the adjustment range of switching frequency with both ends of the coil 15 short-circuited (i.e., a first frequency range) may be set at a switching frequency at which the constant voltage output operation is performed with both ends of the coil 15 short-circuited when the coupling coefficient is substantially equal to a coupling coefficient corresponding to the lower limit of the adjustment range of switching frequency with both ends of the coil 15 open-circuited.

In addition, in order to improve the energy transmission efficiency, it is preferable that the power supply circuit 10 and transmission coil 14 of the power transmission device 2 continue to operate with soft switching (inductive operation). In order for the power supply circuit 10 and the transmission coil 14 to operate with soft switching, it is preferable that the phase of current flowing through the transmission coil 14 be delayed from the phase of voltage applied thereto. This configuration allows, for example, current to flow from the source terminal to the drain terminal of the switching element 13-1 when the switching element 13-1 and the switching element 13-4 are turned on, and the power supply circuit 10 and the transmission coil 14 thereby operate with soft switching, suppressing an occurrence of switching loss.

In the present embodiment, as illustrated by the graphs 805 and 806, the delays of phases have positive values at frequencies at which the non-contact power supply device 1 performs the constant voltage output operation without depending on the coupling coefficient. Therefore, it is evident that the non-contact power supply device 1 according to the present embodiment is capable of making the power supply circuit 10 and the transmission coil 14 operate with soft switching.

Consequently, in order to achieve the constant voltage output operation, the control circuit 19 controls switching of the relay 16 between on and off states and the switching frequency and voltage of the AC power applied to the transmission coil 14, as described below.

When determination information included in a wireless signal received from the power reception device 3 via the receiver 17 indicates that the non-contact power supply device 1 is not performing the constant voltage output operation, the control circuit 19 turns on the relay 16 (i.e., short-circuits both ends of the coil 15) and successively raises the switching frequency with both ends of the coil 15 short-circuited from the lower limit of a predetermined frequency range (for example, frequency f1 in FIG. 8) to the upper limit of frequency enabling constant voltage output (for example, frequency f2). When constant voltage output has not been achieved even when the switching frequency has reached the upper limit of frequency enabling constant voltage output with both ends of the coil 15 short-circuited, the control circuit 19 turns off the relay 16 and thereby open-circuits both ends of the coil 15. The control circuit 19 successively raises the switching frequency with both ends of the coil 15 open-circuited from the lower limit of frequency enabling constant voltage output with both ends of the coil 15 open-circuited (for example, frequency f3 in FIG. 8) to the upper limit of the frequency enabling constant voltage output (for example, frequency f4 in FIG. 8).

Alternatively, when changing the switching frequency, the control circuit 19 may first turn off the relay 16 and successively reduce the switching frequency with both ends of the coil 15 open-circuited from the upper limit of the frequency enabling constant voltage output to the lower limit of the frequency enabling constant voltage output. When constant voltage output has not been achieved even when the switching frequency has reached the lower limit of the frequency enabling constant voltage output with both ends of the coil 15 open-circuited, the control circuit 19 may turn on the relay 16 and thereby short-circuit both ends of the coil 15 and successively reduce the switching frequency from the upper limit to the lower limit of the frequency enabling constant voltage output.

Note that, it is preferable that, in order for the constant voltage determination circuit 29 of the power reception device 3 to be able to check whether or not the output voltage has become substantially constant, the control circuit 19 change the switching frequency in a stepwise manner in such a way as to keep the same switching frequency for a duration longer than the period at which the determination circuit 30 of the constant voltage determination circuit 29 switches the switching element 31 between on and off states.

Further, it is preferable that, while adjusting the switching frequency, the control circuit 19 reduce the voltage applied to the transmission coil 14 to a lower limit voltage. This configuration suppresses voltage of power supplied to the power reception device 3 from excessively increasing.

When the determination information included in the wireless signal received from the power reception device 3 via the receiver 17 indicates that measured values of the output voltage, although not falling within the allowance range of voltage, are substantially constant even when the resistance of the load circuit 27 changes, i.e., the constant voltage output operation is performed, the control circuit 19 keeps the switching frequency constant thereafter. Next, the control circuit 19, referring to the reference table each entry of which indicates a relationship between a switching frequency and a duty ratio that causes a constant voltage to be output at the switching frequency without depending on the coupling coefficient and is used in the on/off control of the switching element SW of the power factor improvement circuit 12, determines a duty ratio. The control circuit 19 controls the gate driver 18-1 in such a way as to switch the switching element SW of the power factor improvement circuit 12 between on and off states in accordance with the duty ratio. This operation causes the voltage applied to the transmission coil 14 to be adjusted in such a way that the output voltage from the resonance circuit 20 falls within the allowance range of voltage, i.e., a constant voltage is output without depending on the coupling coefficient. When, an determination information included in a wireless signal received from the power reception device 3 via the receiver 17, indicates that measured values of the output voltage fall within the allowance range of voltage, the control circuit 19 keeps constant the switching frequency and voltage of the AC power supplied to the transmission coil 14.

Note that the control circuit 19 may, in place of determining a duty ratio referring to the above-described reference table, change the duty ratio gradually until, the determination information included in a wireless signal received from the power reception device 3 via the receiver 17, indicates that measured values of the output voltage fall within the allowance range of voltage.

Figure 9:
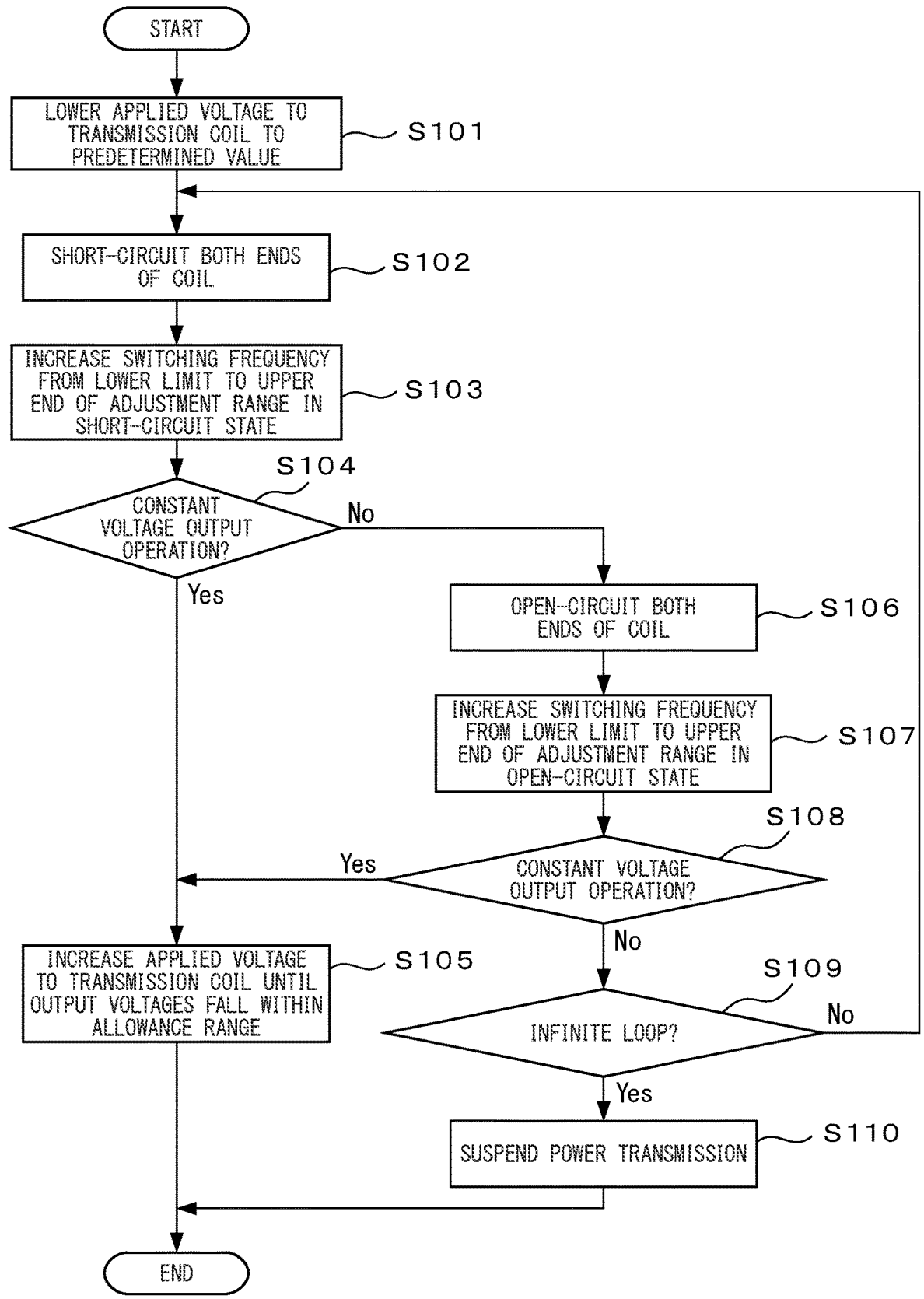
FIG. 9 is an operation flowchart of control of switching of the relay between on and off states and switching frequency and voltage of AC power supplied to the transmission coil, the control being executed by a control circuit.

FIG. 9 is an operation flowchart of control of the switching of the relay 16 between on and off states and the switching frequency and voltage of the AC power applied to the transmission coil 14, the control being executed by the control circuit 19.

When determination information received from the power reception device 3 indicates that constant voltage output operation is not performed, the control circuit 19 controls the power supply circuit 10 to lower voltage of AC power supplied to the transmission coil 14 to a predetermined value (step S101). The control circuit 19 turns on the relay 16 and thereby short-circuits both ends of the coil 15 (step S102).

The control circuit 19 controls the power supply circuit 10 to successively raise switching frequency from the lower limit to the upper limit of an adjustment range of switching frequency with both ends of the coil 15 short-circuited (step S103). The control circuit 19, referring to determination information received from the power reception device 3, determines whether or not it is indicated that the constant voltage output operation is performed at any switching frequency (step S104).

When it is indicated that the constant voltage output operation is performed at any switching frequency (Yes in step S104), the control circuit 19 controls the power supply circuit 10 to raise the voltage of the AC power supplied to the transmission coil 14 until output voltage from the resonance circuit 20 of the power reception device 3 falls within a predetermined allowance range of voltage (step S105).

On the other hand, when it is not indicated that the constant voltage output operation is performed at any switching frequency (No in step S104), the control circuit 19 turns off the relay 16 and thereby open-circuits both ends of the coil 15 (step S106). The control circuit 19 controls the power supply circuit 10 to successively raise the switching frequency from the lower limit to the upper limit of an adjustment range of switching frequency with both ends of the coil 15 open-circuited (step S107). The control circuit 19, referring to determination information received from the power reception device 3, determines whether or not it is indicated that the constant voltage output operation is performed at any switching frequency (step S108).

When it is indicated that the constant voltage output operation is performed at any switching frequency (Yes in step S108), the control circuit 19 controls the power supply circuit 10 to raise the voltage of the AC power supplied to the transmission coil 14 until the output voltage from the resonance circuit 20 of the power reception device 3 falls within the predetermined allowance range of voltage (step S105).

On the other hand, when it is not indicated that the constant voltage output operation is performed at any switching frequency (No in step S108), the control circuit 19 determines whether or not the control has fallen into an infinite loop (step S109). For example, when the switching of the relay 16 between on and off states (steps S102 and S105) are repeated predetermined times (for example, three to five times) or more without reaching the constant voltage output operation, the control circuit 19 determines that the control has fallen into an infinite loop.

When the control has not fallen into an infinite loop (No in step S109), the control circuit 19 repeats processing from step S102 onward. On the other hand, when the control has fallen into an infinite loop (Yes in step S109), the non-contact power supply device 1 is unable to perform the constant voltage output operation within the adjustment range of switching frequency, i.e., within an expected range of coupling coefficient. Thus, the control circuit 19 suspends power supply from the power supply circuit 10 to the transmission coil 14 and thereby suspends power transmission from the power transmission device 2 to the power reception device 3 (step S110). Note that presence of a foreign object made of metal in a vicinity of the transmission coil 14 and the reception coil 21 is considered to be a reason why the non-contact power supply device 1 is unable to perform the constant voltage output operation within the expected range of coupling coefficient. Thus, in step S110, the control circuit 19 may output an abnormality signal indicating that a foreign object made of metal has been detected to another device via a not-illustrated interface.

After step S105 or S110, the control circuit 19 terminates the switching of the relay 16 between on and off states and the control of the switching frequency and voltage of the AC power supplied to the transmission coil 14.

As described in the foregoing, the non-contact power supply device can narrow an adjustment range of switching frequency of AC power supplied to the transmission coil when performing the constant voltage output operation in an environment in which the coupling coefficient does not stay constant by disposing a coil that is connected in series with the transmission coil of the power transmission device and is not coupled with the reception coil even at the time of power transmission and by short-circuiting or open-circuiting both ends of the coil. In addition, the non-contact power supply device suppresses an increase in current flowing through the transmission coil by supplying the transmission coil of the power transmission device with AC power having a switching frequency at which the transmission coil does not resonate and thereby causing input impedance to have a certain magnitude even when the coupling coefficient decreases. Thus, the non-contact power supply device is capable of suppressing energy loss even when the coupling coefficient between the transmission coil and the reception coil is low. In addition, the non-contact power supply device monitors output voltage from the resonance circuit of the power reception device and controls the switching frequency and voltage of the AC power supplied to the transmission coil in accordance with the output voltage. This configuration enables the non-contact power supply device to perform the constant voltage output operation even when the coupling coefficient between the transmission coil and the reception coil changes or the resistance of the load circuit changes.

According to a variation, to control open-circuiting or short-circuiting of both ends of a coil 15 that is connected in series with a transmission coil 14, a switching element may be used.

Figure 10:
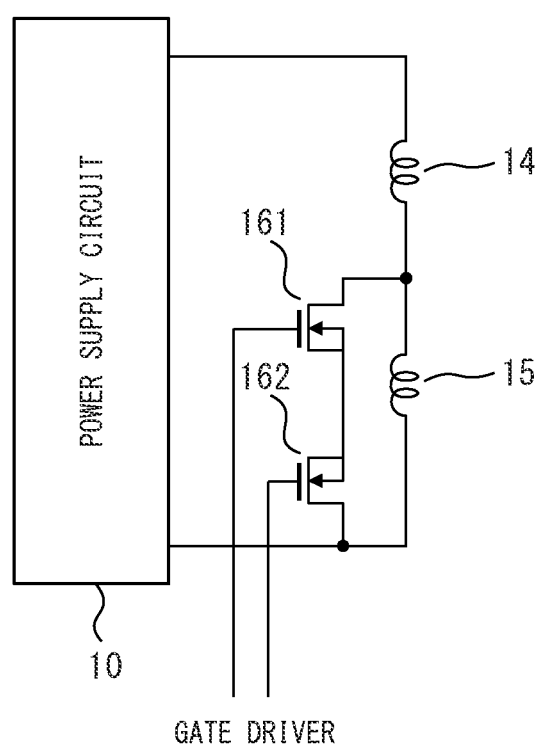
FIG. 10 is a circuit diagram of a power transmission device according to a variation.

FIG. 10 is a circuit diagram of a power transmission device 2 according to the variation. In the variation, as with the above-described embodiment, the transmission coil 14 and the coil 15 that is not coupled with a reception coil 21 at the time of power transmission are connected to a power supply circuit 10 in series with each other. Note that the configuration of the power supply circuit 10 can be set identical to the configuration of the power supply circuit 10 in the above-described embodiment. Two switching elements 161 and 162 that are connected in series with each other are connected in parallel with the coil 15. Note that the switching elements 161 and 162 are another example of the first short-circuiting circuit. For each of the switching elements 161 and 162, for example, an n-channel MOSFET can be used. The source terminal of the switching element 161 and the source terminal of the switching element 162 are connected to each other, the drain terminal of the switching element 161 is connected to one end of the coil 15, and the drain terminal of the switching element 162 is connected to the other end of the coil 15. Since, because of this configuration, turning off both switching elements 161 and 162 prevents current from flowing through parasitic diodes of the switching elements, both ends of the coil 15 are open-circuited. In addition, each of the gate terminals of the switching elements 161 and 162 is connected to a gate driver (not illustrated).

A control circuit 19 is able to short-circuit both ends of the coil 15 by simultaneously turning on the switching elements 161 and 162 via the gate driver. On the other hand, the control circuit 19 is able to open-circuit both ends of the coil 15 by simultaneously turning off the switching elements 161 and 162 via the gate driver.

In addition, the inventors have acquired knowledge that, when the resistance of the load circuit of the power reception device has a preset value, the input impedance of the non-contact power supply device according to the above-described embodiment has a local minimum value at a frequency at which the non-contact power supply device performs the constant voltage output operation.

FIG. 11 is a diagram illustrating an example of a relationship between frequency responses of output voltage from and frequency responses of input impedance of the non-contact power supply device according to the SPL method. In the upper side graph in FIG. 11, frequency is plotted along the horizontal axis and output voltage is plotted along the vertical axis. In addition, in the lower side graph in FIG. 11, frequency is plotted along the horizontal axis and input impedance is plotted along the vertical axis. Note that, in the simulation, the same values as the values of parameters of the respective circuit elements used in the simulation illustrated in FIG. 2 were used. In the upper side graph, graph 1101 (the same as the graph 203 in FIG. 2) represents a frequency response of the output voltage from the non-contact power supply device 1 when the coupling coefficient k is set as k=0.3 and the AC equivalent resistance of the load circuit 27 is set at Rac. In addition, graph 1102 (the same as the graph 204 in FIG. 2) represents a frequency response of the output voltage from the non-contact power supply device 1 when the coupling coefficient k is set as k=0.3 and the AC equivalent resistance of the load circuit 27 is set at (10*Rac). In addition, in the lower side graph, graph 1111 represents a frequency response of the input impedance of the non-contact power supply device 1 when the coupling coefficient k is set as k=0.3 and the AC equivalent resistance of the load circuit 27 is set at Rac. Further, graph 1112 represents a frequency response of the input impedance of the non-contact power supply device 1 when the coupling coefficient k is set as k=0.3 and the AC equivalent resistance of the load circuit 27 is set at (100*Rac).

As illustrated in FIG. 11, at a frequency f0 at which the non-contact power supply device 1 performs the constant voltage output operation, the input impedance when the AC equivalent resistance of the load circuit 27 is set at Rac has a local minimum value. In other words, current flowing through the transmission coil 14 has a local maximum value at the frequency f0.

Thus, according to a variation, the control circuit of the power transmission device may determine whether or not the non-contact power supply device performs the constant voltage output operation, on the basis of a frequency response of current flowing through the transmission coil.

Figure 12:
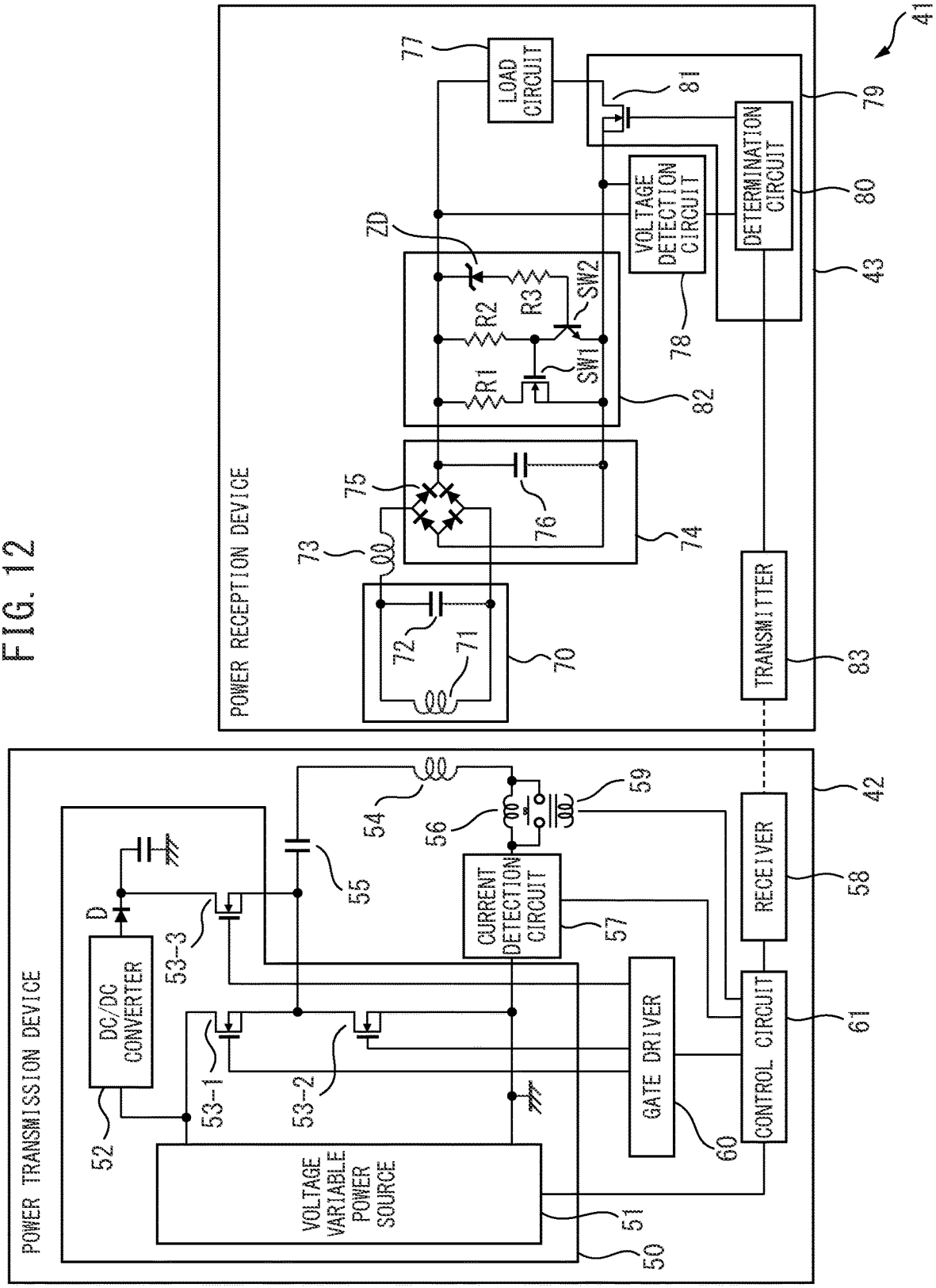
FIG. 12 is a schematic configuration view of a non-contact power supply device according to another variation.

FIG. 12 is a schematic configuration view of a non-contact power supply device according to the variation. As illustrated in FIG. 12, a non-contact power supply device 41 includes a power transmission device 42 and a power reception device 43 to which power is transmitted from the power transmission device 42 through space without contact. The power transmission device 42 includes a power supply circuit 50, a transmission coil 54, a capacitor 55, a coil 56, a current detection circuit 57, a receiver 58, a relay 59, a gate driver 60, and a control circuit 61. On the other hand, the power reception device 43 includes a resonance circuit 70 including a reception coil 71 and a resonance capacitor 72, a coil 73, a rectification and smoothing circuit 74 including a full-wave rectification circuit 75 and a smoothing capacitor 76, a load circuit 77, a voltage detection circuit 78, a constant voltage determination circuit 79, a fixed load circuit 82, and a transmitter 83.

The non-contact power supply device 41 differs, with respect to the power transmission device 42, from the non-contact power supply device 1 illustrated in FIG. 4 in the configuration of the power supply circuit 50, in including the capacitor 55 and the current detection circuit 57, and in a portion of control performed by the control circuit 61. In addition, with respect to the power reception device 43, the non-contact power supply device 41 differs from the non-contact power supply device 1 in including the fixed load circuit 82. Therefore, the above-described differences and related matters will be described below.

The power supply circuit 50 supplies the transmission coil 54 with AC power having adjustable switching frequency and adjustable voltage. To that end, the power supply circuit 50 includes a voltage variable power source 51, a DC/DC converter 52, and three switching elements 53-1 to 53-3.

The voltage variable power source 51 is a power source that supplies DC power and is capable of adjusting voltage of the DC power in accordance with control from the control circuit 61. Note that the voltage variable power source 51 may have any of various circuit configurations that are capable of adjusting voltage to be supplied. While the non-contact power supply device 41 performs the constant voltage output operation, the DC power supplied from the voltage variable power source 51 is converted into AC power through the switching elements 53-1 and 53-2 and supplied to the transmission coil 54. On the other hand, while adjustment of switching frequency for the non-contact power supply device 41 to perform the constant voltage output operation is performed, the DC power supplied from the voltage variable power source 51 is supplied to the transmission coil 54 via the DC/DC converter 52 and the switching element 53-3.

The input terminal of the DC/DC converter 52 is connected to the positive electrode terminal of the voltage variable power source 51, and the output terminal of the DC/DC converter 52 is connected to one end of the capacitor 55 via a diode D and the switching element 53-3. The DC/DC converter 52 reduces the voltage of the DC power supplied from the voltage variable power source 51 to a predetermined voltage (for example, 5 V).

While adjustment of switching frequency for the non-contact power supply device 41 to perform the constant voltage output operation is carried out, the voltage output from the DC/DC converter 52 is supplied to the transmission coil 54 via the diode D, the switching element 53-3, and the capacitor 55.

For each of the switching elements 53-1 to 53-3, for example, an n-channel MOSFET can be used. The switching elements 53-1 and 53-2 are connected in series between the positive electrode terminal and negative electrode terminal of the voltage variable power source 51. In addition, the switching element 53-1 is connected to the positive electrode side of the voltage variable power source 51, whereas the switching element 53-2 is connected to the negative electrode side of the voltage variable power source 51. The drain terminal of the switching element 53-1 is connected to the positive electrode terminal of the voltage variable power source 51, and the source terminal of the switching element 53-1 is connected to the drain terminal of the switching element 53-2. In addition, the source terminal of the switching element 53-1 and the drain terminal of the switching element 53-2 are connected to one end of the transmission coil 54 via the capacitor 55. Further, the source terminal of the switching element 53-2 is connected to the negative electrode terminal of the voltage variable power source 51 and the other end of the transmission coil 54 via the current detection circuit 57 and the coil 56.

In addition, the drain terminal of the switching element 53-3 is connected to the output terminal of the DC/DC converter 52, and the source terminal of the switching element 53-3 is connected to one end of the transmission coil 54 via the capacitor 55. The gate terminals of the switching elements are connected to the gate driver 60.

While the non-contact power supply device 41 performs the constant voltage output operation, the gate driver 60 keeps the switching element 53-3 in the off state in accordance with a control signal from the control circuit 61. In addition, the gate driver 60 alternately switches the switching elements 53-1 and 53-2 between on and off states at a switching frequency at which the constant voltage output operation is performed, in accordance with a control signal from the control circuit 61. In other words, when the switching element 53-1 is turned on and the switching element 53-2 is turned off, current flows to the transmission coil 54 in association with power being supplied from the voltage variable power source 51 through the switching element 53-1 to the capacitor 55 and the capacitor 55 being charged. On the other hand, when the switching element 53-1 is turned off and the switching element 53-2 is turned on, the capacitor 55 is discharged and current flows from the capacitor 55 to the transmission coil 54.

In addition, while adjustment of switching frequency for the non-contact power supply device 41 to perform the constant voltage output operation is performed, the gate driver 60 keeps the switching element 53-1 in the off state in accordance with a control signal from the control circuit 61 and, in turn, alternately switches the switching elements 53-3 and the switching element 53-2 between on and off states at the switching frequency in accordance with a control signal from the control circuit 61.

The capacitor 55 is connected between the transmission coil 54 and the power supply circuit 50. The capacitor 55 supplies the transmission coil 54 with AC power having the switching frequency by repeating being charged and discharged in response to switching of the switching elements between on and off states at the switching frequency. Note that, it is preferable that the capacitance of the capacitor 55 be set in such a way that the resonance frequency of the transmission coil 54 and the capacitor 55 is lower than the resonance frequency of the resonance circuit 70 of the power reception device 43 and the lower limit frequency of a frequency range in which the switching frequency is adjusted so that the transmission coil 54 and the capacitor 55 do not operate as a resonance circuit in the frequency range in which the switching frequency is adjusted.

The current detection circuit 57 is connected between the transmission coil 54 and the power supply circuit 50 and measures current flowing through the transmission coil 54. The current detection circuit 57 outputs a measured value of the current to the control circuit 61. Note that the current detection circuit 57 may be connected to the transmission coil 54 in parallel with the capacitor 55 in conjunction with a capacitor for diversion (not illustrated) connected in series with the current detection circuit 57. In this case, the current detection circuit 57 is able to indirectly measure the current flowing through the transmission coil 54.

In addition, the constant voltage determination circuit 79 of the power reception device 43 includes a determination circuit 80 and a switching element 81 that are similar to the determination circuit 30 and the switching element 31 according to the above-described embodiment, respectively.

While measured values of the output voltage from the resonance circuit 70 measured by the voltage detection circuit 78 fall within the allowance range of voltage, i.e., the non-contact power supply device 40 performs the constant voltage output operation, the determination circuit 80 of the constant voltage determination circuit 79 turns on the switching element 81 and thereby causes the output voltage from the resonance circuit 70 to be supplied to the load circuit 77 via the rectification and smoothing circuit 74. On the other hand, when measured values of the output voltage are out of the allowance range of voltage, the determination circuit 80 turns off the switching element 81 and thereby causing the output voltage from the resonance circuit 70 not to be supplied to the load circuit 77.

The fixed load circuit 82 is connected to the rectification and smoothing circuit 74 in parallel with the load circuit 77 and, while adjustment of the switching frequency is performed, provides the power reception device 43 with a load that is substantially equal to a load serving as a reference for the load circuit 77 (for example, Rac in the simulation illustrated in FIG. 9). To that end, the fixed load circuit 82 is connected to the rectification and smoothing circuit 74 in parallel with the load circuit 77 and includes a resistor R1 that has a resistance corresponding to the load serving as a reference for the load circuit 77. The resistor R1 is connected in series with a switching element SW1, which is an n-channel MOSFET. Further, the fixed load circuit 82 includes, between both output terminals of the rectification and smoothing circuit 74, a resistor R2 and a switching element SW2, which is an npn bipolar transistor, that are connected in series in this order from the positive electrode side. In addition, the resistor R2 and the switching element SW2 are connected in parallel with the resistor R1. The gate terminal of the switching element SW1 is connected between the resistor R2 and one end (in this example, the collector terminal) of the switching element SW2. Further, the base terminal of the switching element SW2 is connected to the positive electrode terminal of the rectification and smoothing circuit 74 via a resistor R3 and a Zener diode ZD, which is reverse-biased.

While the non-contact power supply device 41 performs the constant voltage output operation, the output voltage from the resonance circuit 70 is higher than the breakdown voltage of the Zener diode ZD and, as a result, current is supplied to the base terminal of the switching element SW2 via the Zener diode ZD and the resistor R3, turning on the switching element SW2. As a result, voltage applied to the gate terminal of the switching element SW1 decreases and the switching element SW1 is thereby turned off. Therefore, the output voltage from the resonance circuit 70 is not applied to the resistor R1.

On the other hand, since, while the adjustment of the switching frequency in order for the non-contact power supply device 41 to perform the constant voltage output operation is carried out, the voltage of power supplied from the DC/DC converter 52 to the transmission coil 54 is low, the power supplied from the power transmission device 42 to the power reception device 43 also decreases. Therefore, the output voltage from the resonance circuit 70 also decreases to a voltage lower than the breakdown voltage of the Zener diode ZD. As a result, the switching element SW2 is turned off, and, in association therewith, the voltage applied to the gate terminal of the switching element SW1 increases and the switching element SW1 is thereby turned on. Thus, the output voltage from the resonance circuit 70 is applied to the resistor R1. As a result, a fixed load of the resistor R1 is provided to the power reception device 43.

Operation of the control circuit 61 of the power transmission device 42 according to the variation will be described below. While the non-contact power supply device 41 performs the constant voltage output operation, the control circuit 61, as with the above-described embodiment, controls the voltage variable power supply 51 of the power supply circuit 50 to supply the transmission coil 54 with DC voltage having a voltage in accordance with switching frequency in such a way that a measured value of the output voltage from the resonance circuit 70 of the power reception device 43 falls within a predetermined allowance range. In addition, the control circuit 61 keeps the switching element 53-3 in the off state and, in conjunction therewith, switches the switching elements 53-1 and 53-2 between on and off states at a switching frequency at which the constant voltage output operation is performed, via the gate driver 60.

On the other hand, when determination information included in a wireless signal received from the power reception device 43 via the receiver 58 indicates that the non-contact power supply device 41 is not performing the constant voltage output operation, the control circuit 61 keeps the switching element 53-1 in the off state and, in conjunction therewith, alternately switches the switching elements 53-3 and 53-2 between on and off states via the gate driver 60 and thereby causes power to be supplied from the DC/DC converter 52 to the transmission coil 54. In addition, the control circuit 61 controls the voltage variable power source 51 in such a way that the voltage supplied from the DC/DC converter 52 to the transmission coil 54 has a predetermined value. Through this control, the control circuit 61 reduces the power supplied from the power transmission device 42 to the power reception device 43 to a level at which voltage is applied to the resistor R1 of the fixed load circuit 82 of the power reception device 43.

The control circuit 61 monitors measured values of current flowing through the transmission coil 54 measured by the current detection circuit 57 while the switching frequency is changed and detects a switching frequency at which the measured values of the current have a local maximum. In so doing, when, in an adjustment range of switching frequency with both ends of the coil 56 short-circuited, no local maximum value is found among measured values of the current (i.e., in the adjustment range of switching frequency, the measured values of the current monotonically increase or monotonically decrease as the switching frequency increases), the control circuit 61 controls the relay 59 to open-circuit both ends of the coil 56. Subsequently, the control circuit 61 may detect a switching frequency at which measured values of the current have a local maximum in an adjustment range of switching frequency with both ends of the coil 56 open-circuited. Conversely, when, in the adjustment range of switching frequency with both ends of the coil 56 open-circuited, no local maximum value is found among measured values of the current, the control circuit 61 controls the relay 59 to short-circuit both ends of the coil 56. Subsequently, the control circuit 61 may detect a switching frequency at which measured values of the current have a local maximum in the adjustment range of switching frequency with both ends of the coil 56 short-circuited.

The switching frequency at which measured values of the current flowing through the transmission coil 54 have a local maximum is a frequency at which the input impedance of the non-contact power supply device 41 has a local minimum value, i.e., a frequency at which the non-contact power supply device 41 performs the constant voltage output operation, such as the frequency f0 illustrated in FIG. 11. Thus, when a switching frequency at which measured values of the current flowing through the transmission coil 54 have a local maximum is detected, the control circuit 61, at the switching frequency, controls switching of the switching elements 53-1 and 53-2 between on and off states via the gate driver 60 in such a way that power from the voltage variable power source 51 is supplied to the transmission coil 54. In addition, the control circuit 61 turns off the switching element 53-3. This operation enables the control circuit 61 to make the non-contact power supply device 41 perform the constant voltage output operation. In addition, the control circuit 61, as described above, controls the voltage variable power supply 51 of the power supply circuit 50 to supply the transmission coil 54 with DC voltage having a voltage in accordance with the switching frequency in such a way that measured values of the output voltage from the resonance circuit 70 of the power reception device 43 fall within a predetermined allowance range.

According to the variation, the control circuit of the power transmission device is capable of, by monitoring current flowing through the transmission coil of the power transmission device, detecting a switching frequency at which the non-contact power supply device performs the constant voltage output operation.

According to another variation, in the power transmission device, the power supply circuit that supplies AC power to the transmission coil may have a circuit configuration different from the one in the above-described embodiment and its variations as long as the power supply circuit is a circuit that can variably adjust the switching frequency and voltage applied to the transmission coil.

Figure 13A:
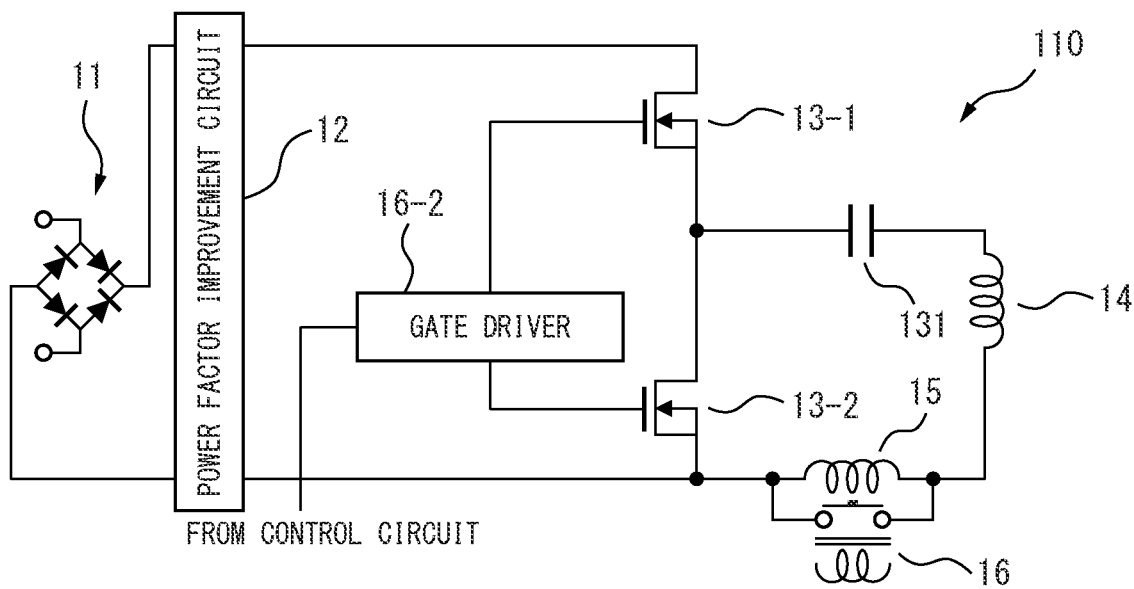
FIG. 13A is a circuit diagram of a power supply circuit according to still another variation.
Figure 13B:
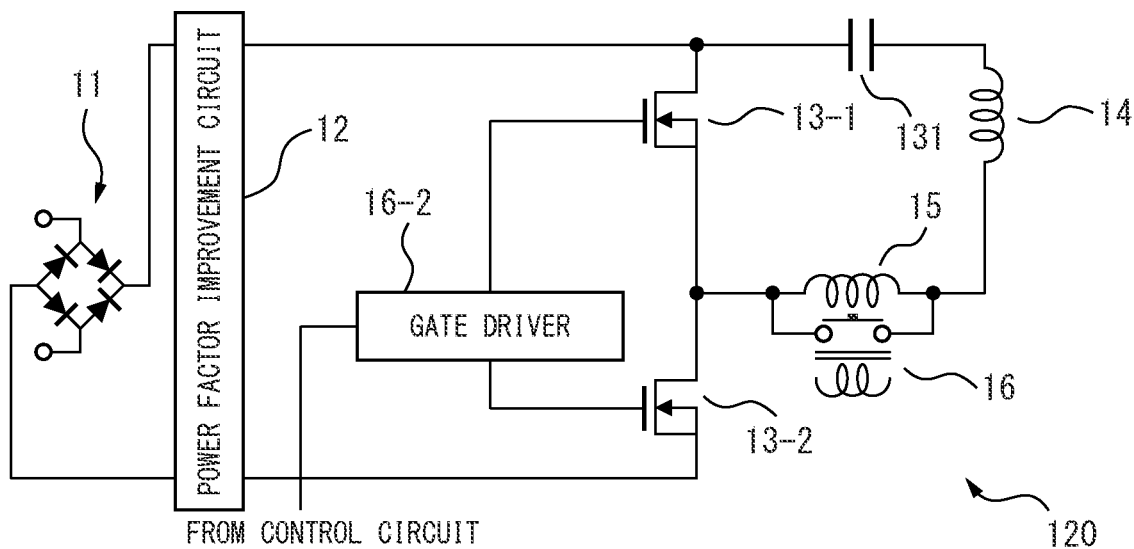
FIG. 13B is a circuit diagram of a power supply circuit according to still another variation.

FIGS. 13A and 13B are respectively circuit diagrams of power supply circuits according to the variation.

A power supply circuit 110 illustrated in FIG. 13A includes a power source 11, a power factor improvement circuit 12, two switching elements 13-1 and 13-2, and a capacitor 131 for blocking DC current that is connected in series with a transmission coil 14. Note that, for the switching elements, for example, n-channel MOSFETs can also be used in this variation. In addition, the power factor improvement circuit 12 can be, for example, configured identical to the power factor improvement circuit 12 in the above-described embodiment.

In this variation, the switching element 13-1 and the switching element 13-2 are connected in series between the positive electrode terminal and negative electrode terminal of the power source 11. In addition, the switching element 13-1 is connected to the positive electrode side of the power source 11, whereas the switching element 13-2 is connected to the negative electrode side of the power source 11. The drain terminal of the switching element 13-1 is connected to the positive electrode terminal of the power source 11 via the power factor improvement circuit 12, and the source terminal of the switching element 13-1 is connected to the drain terminal of the switching element 13-2. In addition, the source terminal of the switching element 13-2 is connected to the negative electrode terminal of the power source 11 via the power factor improvement circuit 12. Further, the source terminal of the switching element 13-1 and the drain terminal of the switching element 13-2 are connected to one end of the transmission coil 14 via the capacitor 131, and the source terminal of the switching element 13-2 is connected to the other end of the transmission coil 14 via a coil 15 or a relay 16. In addition, the gate terminals of the switching elements are connected to a gate driver 18-2.

In this variation, the gate driver 18-2 may alternately switch the switching element 13-1 and the switching element 13-2 between on and off states in accordance with a control signal from a control circuit. In other words, when the switching element 13-1 is turned on and the switching element 13-2 is turned off, the capacitor 131 is charged with current flowing from the power source 11 via the power factor improvement circuit 12 and the switching element 13-1 and, in conjunction therewith, current also flows to the transmission coil 14 via the coil 15 or the relay 16. On the other hand, when the switching element 13-1 is turned off and the switching element 13-2 is turned on, the capacitor 131 is discharged and current flows from the capacitor 131 via the transmission coil 14 and the coil 15 or the relay 16. In this variation, therefore, the control circuit may control the switching frequency at which the switching element 13-1 and the switching element 13-2 are switched between on and off states via the gate driver 18-2 depending on determination information received from a power reception device 3.

A power supply circuit 120 illustrated in FIG. 13B, as with the power supply circuit 110, includes a power source 11, a power factor improvement circuit 12, two switching elements 13-1 and 13-2, and a capacitor 131 connected in series with a transmission coil 14. Note, however, that, in the power supply circuit 120, compared with the power supply circuit 110, one end of the transmission coil 14 is connected to the positive electrode terminal of the power source 11 via the capacitor 131 and the power factor improvement circuit 12 and the other end of the transmission coil 14 is connected to the source terminal of the switching element 13-1 and the drain terminal of the switching element 13-2 via the coil 15 or the relay 16.

In this variation, the gate driver 18-2 may also only alternately switch the switching element 13-1 and the switching element 13-2 between on and off states in accordance with a control signal from the control circuit.

Note that, with respect to the power supply circuit 110 illustrated in FIG. 13A and the power supply circuit 120 illustrated in FIG. 13B, it is preferable that the capacitance of the capacitor 131 be set in such a way that the resonance frequency of the transmission coil 14 and the capacitor 131 is lower than the resonance frequency of a resonance circuit 20 of the power reception device 3 and the lower limit frequency of the frequency range in which the switching frequency is adjusted so that the transmission coil 14 and the capacitor 131 do not operate as a resonance circuit within a frequency range in which the switching frequency is adjusted.

In addition, in the above-described embodiment or the variation illustrated in FIG. 10, a capacitor 131 for blocking DC current connected in series with the transmission coil 14 and the coil 15 may be disposed, as with the variation illustrated in FIG. 13A.

Further, in the embodiment illustrated in FIG. 4 and the variations illustrated in FIGS. 13A and 13B, a voltage variable power source may be used in place of the power source and the power factor improvement circuit, as illustrated in FIG. 12. Conversely, in the variation illustrated in FIG. 12, the power source and the power factor improvement circuit in the embodiment illustrated in FIG. 4 may be used in place of the voltage variable power source. Further, in the variation illustrated in FIG. 12, the voltage variable power source 51 may be configured in such a manner as to be able to supply the transmission coil 54 with power having a predetermined voltage while the switching frequency is adjusted. In this case, the DC/DC converter 52 and the switching element 53-3 may be omitted.

In addition, when it is possible to connect the receiver 17 of the power transmission device 2 and the transmitter 32 of the power reception device 3 to each other in a wired manner, each of the receiver 17 and the transmitter 32 may include a communication circuit capable of communicating a signal including determination information in a wired manner.

Note that the switching frequency at which the non-contact power supply device 1 performs the constant voltage output operation exists in a frequency range in which output gain decreases as the switching frequency increases. Thus, according to still another variation, when a non-contact power supply device 1 does not perform the constant voltage output operation, a determination circuit 30 of a constant voltage determination circuit 29 in a power reception device 3 may notify a transmitter 32 of the average value of measured values of output voltage during a latest predetermined duration (for example, a duration one to three times longer than a period of switching of a switching element 31 between on and off states). The transmitter 32 may include the average value of measured values of the output voltage in determination information.

In this case, while the average value of measured values of the output voltage is increasing as the switching frequency is increased, a control circuit 19 of a power transmission device 2 may change the switching frequency by a relatively large step width. When the average value of measured values of the output voltage decreases as the switching frequency is increased, the control circuit 19 may change the switching frequency by a relatively small step width. This configuration enables the control circuit 19 to reduce the time needed for searching for a switching frequency at which the non-contact power supply device 1 performs the constant voltage output operation.

According to still another variation, the reception coil and the resonance capacitor that the resonance circuit of the power reception device includes may be connected in series with each other, as with the SS method. Since, in this case, the non-contact power supply device is also able to perform the constant voltage output operation, the non-contact power supply device is, as with the above-described embodiment or the variations, capable of narrowing an adjustment range of switching frequency of AC power supplied to the transmission coil when performing the constant voltage output operation in an environment in which the coupling coefficient does not stay constant, by disposing a coil that is connected in series with the transmission coil of the power transmission device and is not coupled with the reception coil even at the time of power transmission and by short-circuiting or open-circuiting both ends of the coil.

Figure 14:
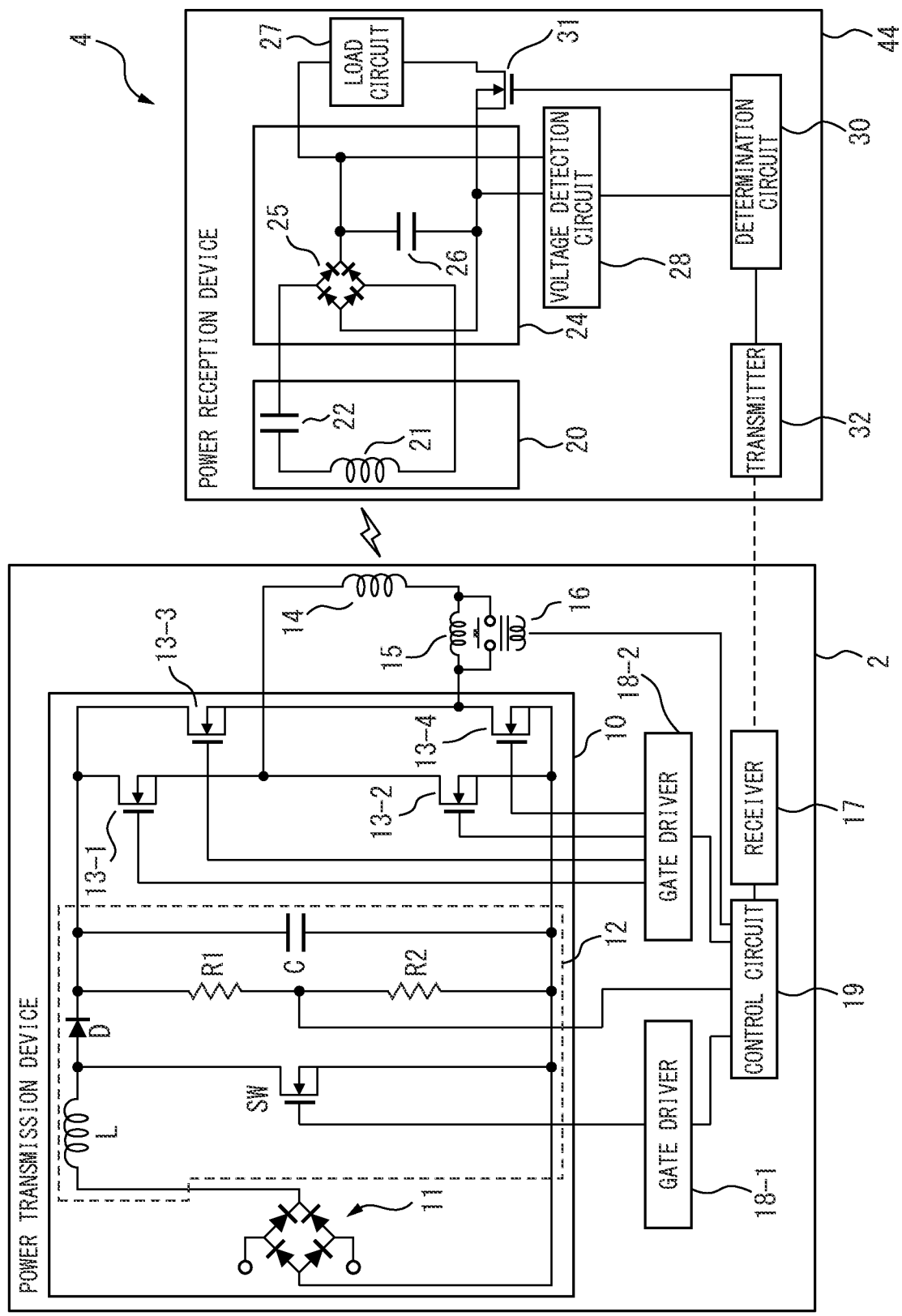
FIG. 14 is a schematic configuration view of a non-contact power supply device according to still another variation.

FIG. 14 is a schematic configuration view of a non-contact power supply device according to the variation. As illustrated in FIG. 14, a non-contact power supply device 4 according to the variation includes a power transmission device 2 and a power reception device 44 to which power is transmitted from the power transmission device 2 through space without contact. The power transmission device 2 includes a power supply circuit 10, a transmission coil 14, a coil 15, a relay 16, a receiver 17, gate drivers 18-1 and 18-2, and a control circuit 19. On the other hand, the power reception device 44 includes a resonance circuit 20 including a reception coil 21 and a resonance capacitor 22, a rectification and smoothing circuit 24 including a full-wave rectification circuit 25 and a smoothing capacitor 26, a load circuit 27, a voltage detection circuit 28, a determination circuit 30 and a switching element 31 constituting a constant voltage determination circuit, and a transmitter 32. The non-contact power supply device 4 illustrated in FIG. 14 differs from the non-contact power supply device 1 illustrated in FIG. 4 in the configuration of the resonance circuit 20 included in the power reception device 44 and in that the power reception device 44 does not include the coil 23. Therefore, the above-described differences and related matters will be described below. Regarding the other constituent components of the non-contact power supply device 4, see the description of corresponding constituent components of the non-contact power supply device 1 according to the above-described embodiment.

In the variation, the reception coil 21 and resonance capacitor 22 of the resonance circuit 20 are connected in series with each other. Power received via the reception coil 21 is output to the rectification and smoothing circuit 24 via the resonance capacitor 22. Since, as described above, the non-contact power supply device 4 according to the variation has a similar configuration to that of the SS method, the non-contact power supply device 4 is capable of performing the constant voltage output operation. In addition, in this example, since, differing from the non-contact power supply device according to the SPL method, the resonance circuit 20 performs series resonance, the coil 23 may be omitted. Note that, differing from the SS method, the non-contact power supply device 4 does not have to use resonance of the transmission coil 14 on the power transmission side. In other words, the control circuit 19 of the power transmission device 2 may, as with the above-described embodiment, control the power supply circuit 10 to supply the transmission coil 14 with AC power having a switching frequency at which the transmission coil 14 does not resonate.

Figure 15:
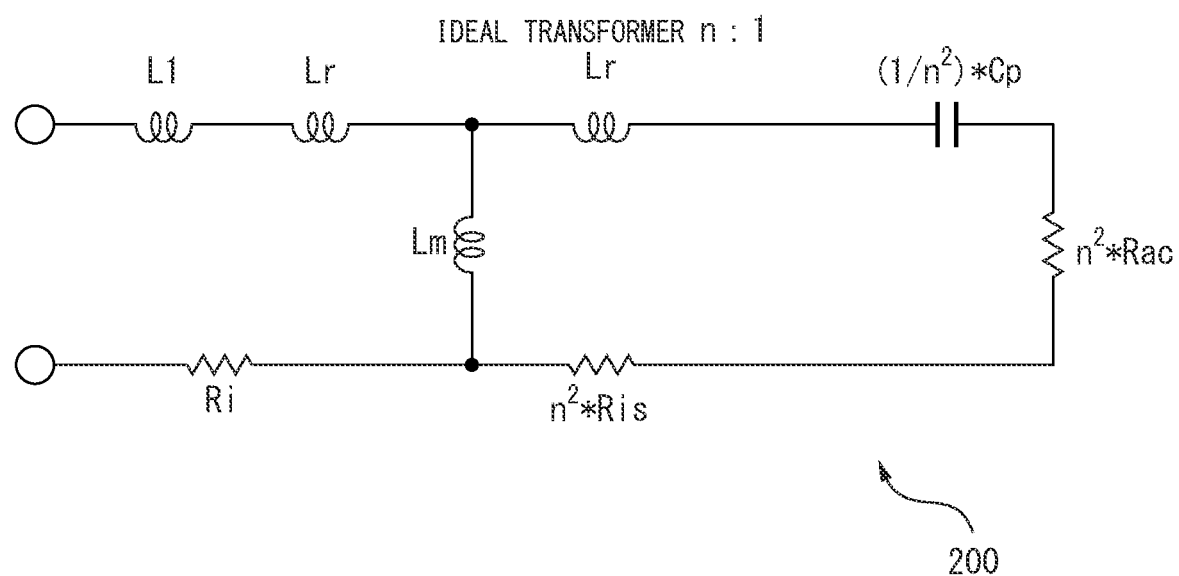
FIG. 15 is an equivalent circuit diagram of the non-contact power supply device according to the variation illustrated in FIG. 14 when both ends of a coil connected in series with a transmission coil are short-circuited.

FIG. 15 is an equivalent circuit diagram of the non-contact power supply device 4 according to the variation when both ends of the coil 15 are short-circuited. It is assumed that, in an equivalent circuit 200 in the diagram, the transmission coil 14 on the power transmission side coupled with the reception coil 21 of the resonance circuit 20 on the power reception side forms an ideal transformer with a ratio of n:1. Lr and Lm are leakage inductance and excitation inductance, respectively, of the transmission coil 14 of the power transmission device 2. Note that inductance Lp of the transmission coil 14 is equal to (Lm+Lr) and, when it is assumed that a coupling coefficient between the transmission coil 14 and the reception coil 21 is denoted by k, Lr=(1−k)Lp and Lm=kLp hold. In addition, Ri and Ris are winding resistance of the power transmission device 2 and winding resistance of the power reception device 44, respectively. Cp is capacitance of the resonance capacitor 22 connected in series with the reception coil 21 in the resonance circuit 20 of the power reception device 44. L1 is inductance of the coil 15. Note that, when both ends of the coil 15 are short-circuited via the relay 16, L1=0 holds. Rac is AC equivalent resistance of resistance Ro of the load circuit 27 and is expressed as Rac=(8/π²)×Ro.

From the equivalent circuit 200, an F-matrix Fspl(s, k, Rac) of the non-contact power supply device 4 according to the variation is expressed by the following equation.

[Math. 4]

$$Fp(s, Rac, k, Lt) = \begin{bmatrix} 1 & s \cdot Lt \\ 0 & 1 \end{bmatrix} \cdot \begin{bmatrix} 1 & Ri \\ 0 & 1 \end{bmatrix} \cdot \begin{bmatrix} 1 & s \cdot (1-k) \cdot Lp \\ 0 & 1 \end{bmatrix} \cdot \begin{bmatrix} 1 & 0 \\ \frac{1}{s \cdot k \cdot Lp} & 1 \end{bmatrix} \cdot \begin{bmatrix} 1 & s \cdot (1-k) \cdot Lp \\ 0 & 1 \end{bmatrix} \cdot \begin{bmatrix} 1 & n^2 \cdot Ris \\ 0 & 1 \end{bmatrix} \cdot \begin{bmatrix} 1 & \frac{n^2}{s \cdot Cp} \\ 0 & 1 \end{bmatrix} \cdot \begin{bmatrix} 1 & 0 \\ \frac{1}{n^2 \cdot Rac} & 1 \end{bmatrix} \quad (4)$$

In the above equation, s is expressed as s=j2πf. Note that f is frequency of AC power that is supplied to the transmission coil 14. In addition, k denotes a coupling coefficient between the transmission coil 14 and the reception coil 21.

From the definition of the F-matrix, output gain Gspl(s, k, Rac) of the non-contact power supply device 4 is expressed by the following equation.

[Math. 5]

$$Gspl(s, k, Rac) = \frac{1}{Fspl(s, k, Rac)_{0,0}} \cdot \frac{Vin}{2} \cdot \frac{1}{n} \quad (5)$$

In the above equation, Vin is voltage (amplitude) of the AC power supplied to the transmission coil 14, and $Fspl(s, k, Rac)_{0,0}$ represents the upper left element of the F-matrix expressed by the equation (4).

Figure 16:
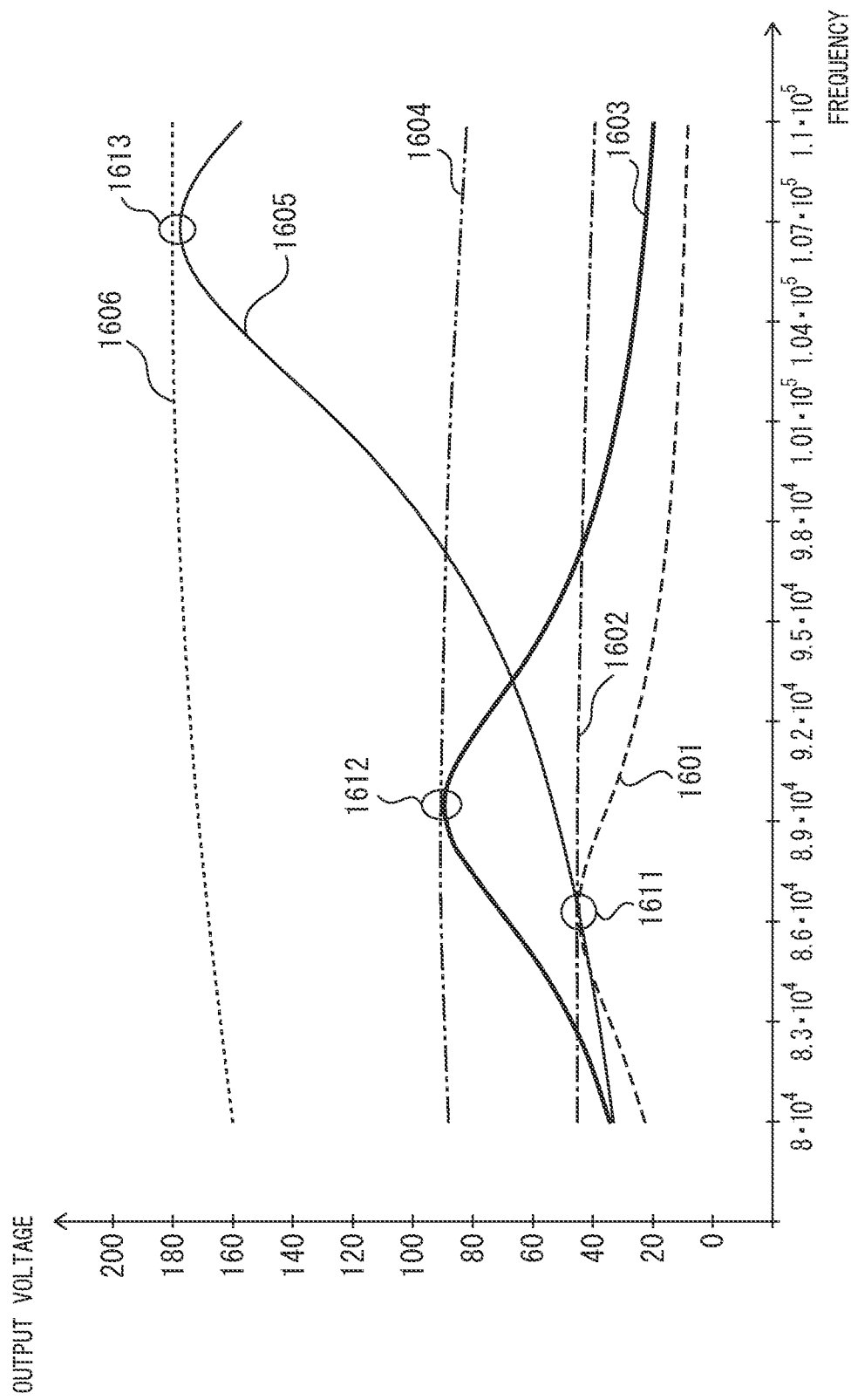
FIG. 16 is a diagram illustrating an example of simulation results of frequency responses of output voltage from the non-contact power supply device according to the variation illustrated in FIG. 14 when both ends of the coil connected in series with the transmission coil are short-circuited.

FIG. 16 is a diagram illustrating an example of simulation results of frequency responses of output voltage from the non-contact power supply device 4 according to the variation when both ends of the coil 15 are short-circuited, the frequency responses being calculated in accordance with the equation (5). In FIG. 16, frequency is plotted along the horizontal axis and output voltage is plotted along the vertical axis. Graph 1601 represents a frequency response of the output voltage when the coupling coefficient k is set as k=0.15 and the AC equivalent resistance of the load circuit 27 is set at Rac. In addition, graph 1602 represents a frequency response of the output voltage when the coupling coefficient k is set as k=0.15 and the AC equivalent resistance of the load circuit 27 is set at (10*Rac). In addition, graph 1603 represents a frequency response of the output voltage when the coupling coefficient k is set as k=0.3 and the AC equivalent resistance of the load circuit 27 is set at Rac. In addition, graph 1604 represents a frequency response of the output voltage when the coupling coefficient k is set as k=0.3 and the AC equivalent resistance of the load circuit 27 is set at (10*Rac). Further, graph 1605 represents a frequency response of the output voltage when the coupling coefficient k is set as k=0.6 and the AC equivalent resistance of the load circuit 27 is set at Rac. In addition, graph 1606 represents a frequency response of the output voltage when the coupling coefficient k is set as k=0.6 and the AC equivalent resistance of the load circuit 27 is set at (10*Rac). Note that, in the simulation, it is assumed that Lp=174 µH, Cp=20 nF, Ri=Ris=0.1Ω, n=1, Vin=300 V, and Ro=10Ω (Rac≅8.1Ω).

As illustrated by points 1611 to 1613 in FIG. 16, in the variation, there also exists, for every coupling coefficient, a combination of a frequency and an output voltage at which the output voltage becomes substantially constant even when the AC equivalent resistance Rac of the load circuit 27 changes under the condition that the coupling coefficient k is constant (i.e., a constant voltage is output when the coupling coefficient k is constant). In other words, it is revealed that, in the present embodiment, although no capacitor connected in series or in parallel with the transmission coil 14 is included and the transmission coil 14 does not resonate, it is possible, as with the non-contact power supply device according to the SS method, to make the non-contact power supply device 4 perform the constant voltage output operation against change in the resistance of the load circuit 27. Further, although, as illustrated by the points 1611 to 1613, output voltages when a constant voltage is output against variation in the resistance of the load circuit 27 differ from one another depending on the coupling coefficient, the differences in the output voltages can be reduced to a substantially constant output voltage without depending on the coupling coefficient by adjusting voltage applied to the transmission coil 14. Note that, differing from the non-contact power supply device according to the SS method, the non-contact power supply device 4 according to the variation is capable of, by not using resonance on the power transmission side, preventing the input impedance from excessively decreasing when, in particular, the coupling coefficient is low and thereby suppressing energy loss.

Figure 17:
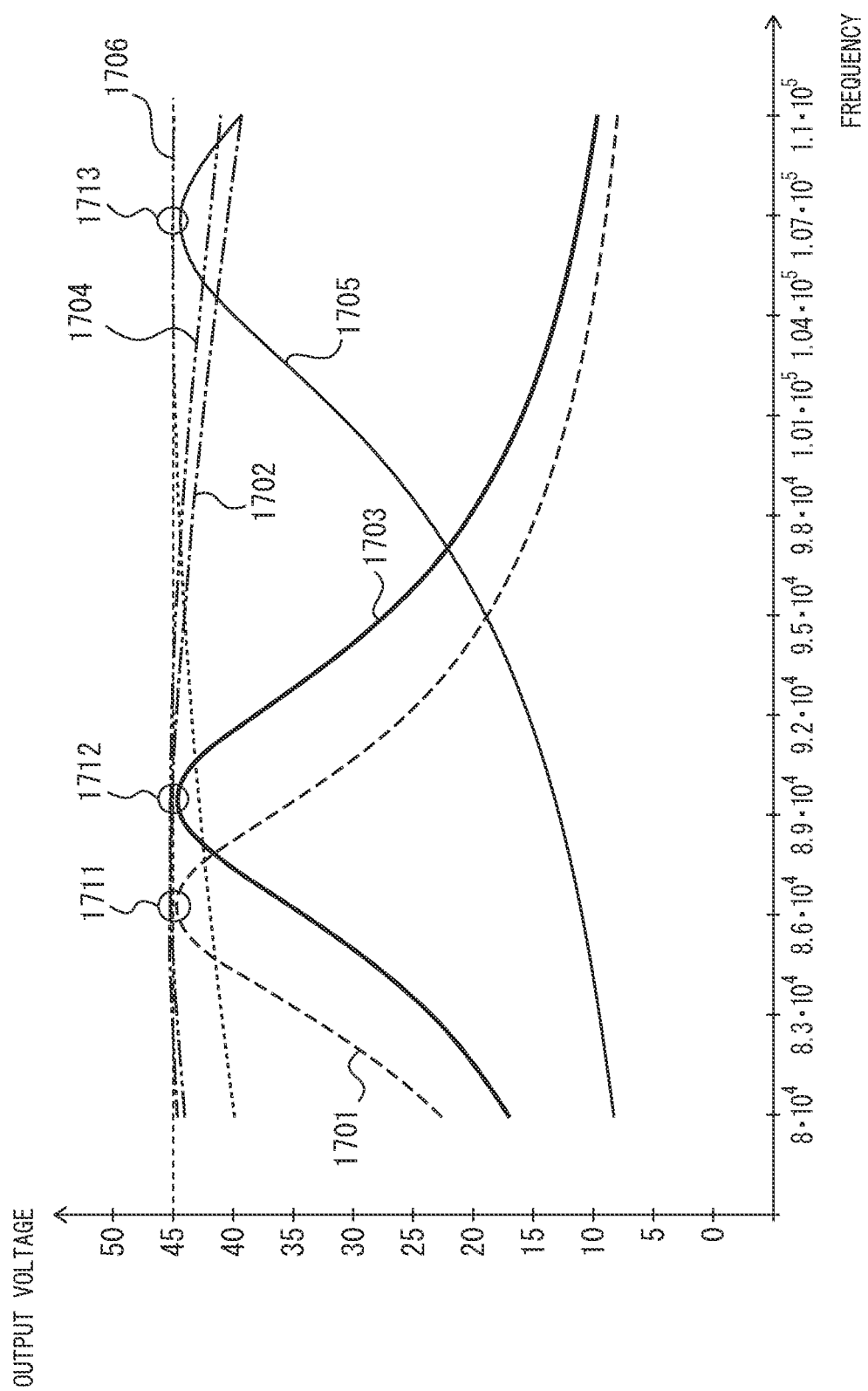
FIG. 17 is a diagram illustrating an example of simulation results of frequency responses of the output voltage when voltage applied to the transmission coil is changed in accordance with a coupling coefficient in the simulation illustrated in FIG. 16.

FIG. 17 is a diagram illustrating an example of simulation results of frequency responses of the output voltage when the voltage applied to the transmission coil 14 is changed according to the coupling coefficient in the simulation illustrated in FIG. 16. In FIG. 17, frequency is plotted along the horizontal axis and output voltage is plotted along the vertical axis. Graph 1701 represents a frequency response of the output voltage when the coupling coefficient k is set as k=0.15, the AC equivalent resistance of the load circuit 27 is set at Rac, and the voltage applied to the transmission coil 14 is set at Vin. In addition, graph 1702 represents a frequency response of the output voltage when the coupling coefficient k is set as k=0.15, the AC equivalent resistance of the load circuit 27 is set at (10*Rac), and the voltage applied to the transmission coil 14 is set at Vin. In addition, graph 1703 represents a frequency response of the output voltage when the coupling coefficient k is set as k=0.3, the AC equivalent resistance of the load circuit 27 is set at Rac, and the voltage applied to the transmission coil 14 is set at (0.5*Vin). In addition, graph 1704 represents a frequency response of the output voltage when the coupling coefficient k is set as k=0.3, the AC equivalent resistance of the load circuit 27 is set at (10*Rac), and the voltage applied to the transmission coil 14 is set at (0.5*Vin). Further, graph 1705 represents a frequency response of the output voltage when the coupling coefficient k is set as k=0.6, the AC equivalent resistance of the load circuit 27 is set at Rac, and the voltage applied to the transmission coil 14 is set at (0.25*Vin). In addition, graph 1706 represents a frequency response of the output voltage when the coupling coefficient k is set as k=0.6, the AC equivalent resistance of the load circuit 27 is set at (10*Rac), and the voltage applied to the transmission coil 14 is set at (0.25*Vin).

Combinations of a frequency and an output voltage that correspond to the points 1611 to 1613 illustrated in FIG. 16 and at which the output voltage becomes substantially constant (i.e., a constant voltage is output) even when the AC equivalent resistance Rac of the load circuit 27 changes under the condition that the coupling coefficient k does not change are three combinations indicated by points 1711 to 1713. The output voltages at the respective points 1711 to 1713 are substantially equal to one another.

The description thus far reveals that, in the variation, even when either the resistance of the load circuit 27 or the coupling coefficient varies, appropriately adjusting the switching frequency and voltage of the AC power applied to the transmission coil 14 also enables the output voltage to be kept substantially constant.

Note that, as illustrated in FIG. 17, the frequency at which the non-contact power supply device according to the variation performs the constant voltage output operation becomes higher as the coupling coefficient increases. In addition, in order to make the output voltage at the time of the coupling coefficient k=0.6 substantially equal to the output voltage at the time of the coupling coefficient k=0.15, the input voltage at the time of the coupling coefficient k=0.6 needs to be 0.25 times the input voltage at the time of the coupling coefficient k=0.15. Since the power transmission performed with input voltage reduced as described above causes current flowing through the transmission coil 14 to increase even if the power factor is good, there is a possibility that Joule loss increases.

Figure 18:
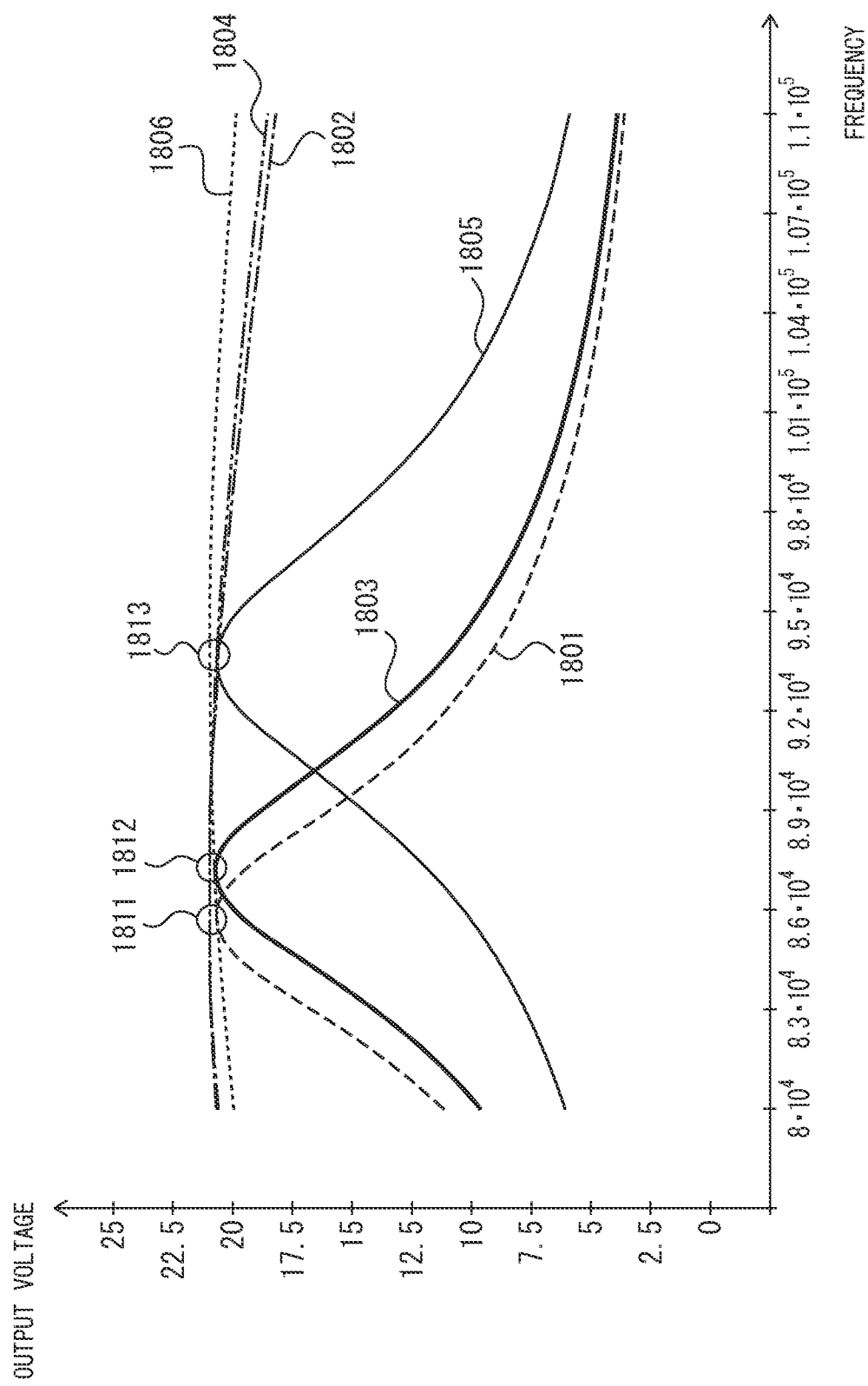
FIG. 18 is a diagram illustrating an example of simulation results of frequency responses of the output voltage from the non-contact power supply device according to the variation illustrated in FIG. 14 when both ends of the coil connected in series with the transmission coil are open-circuited and voltage applied to the transmission coil is changed in accordance with the coupling coefficient.

FIG. 18 is a diagram illustrating an example of simulation results of frequency responses of the output voltage from the non-contact power supply device 4 according to the variation when both ends of the coil 15 are open-circuited and the voltage applied to the transmission coil 14 is changed according to the coupling coefficient. Note that, in the simulation, the same values as the values of parameters of the respective circuit elements used in the simulation illustrated in FIG. 16 were used except the inductance of the coil 15. In addition, the inductance of the coil 15 is set at 200 μH. In FIG. 18, frequency is plotted along the horizontal axis and output voltage is plotted along the vertical axis. Graph 1801 represents a frequency response of the output voltage when the coupling coefficient k is set as k=0.15, the AC equivalent resistance of the load circuit 27 is set at Rac, and the voltage applied to the transmission coil 14 is set at Vin. In addition, graph 1802 represents a frequency response of the output voltage when the coupling coefficient k is set as k=0.15, the AC equivalent resistance of the load circuit 27 is set at (10*Rac), and the voltage applied to the transmission coil 14 is set at Vin. In addition, graph 1803 represents a frequency response of the output voltage when the coupling coefficient k is set as k=0.3, the AC equivalent resistance of the load circuit 27 is set at Rac, and the voltage applied to the transmission coil 14 is set at (0.5*Vin). In addition, graph 1804 represents a frequency response of the output voltage when the coupling coefficient k is set as k=0.3, the AC equivalent resistance of the load circuit 27 is set at (10*Rac), and the voltage applied to the transmission coil 14 is set at (0.5*Vin). Further, graph 1805 represents a frequency response of the output voltage when the coupling coefficient k is set as k=0.6, the AC equivalent resistance of the load circuit 27 is set at Rac, and the voltage applied to the transmission coil 14 is set at (0.25*Vin). In addition, graph 1806 represents a frequency response of the output voltage when the coupling coefficient k is set as k=0.6, the AC equivalent resistance of the load circuit 27 is set at (10*Rac), and the voltage applied to the transmission coil 14 is set at (0.25*Vin).

When both ends of the coil 15 are open-circuited, i.e., current flowing through the transmission coil 14 also flows through the coil 15 connected in series with the transmission coil 14, there also exists, for every coupling coefficient, a frequency at which the output voltage becomes substantially constant even when the AC equivalent resistance of the load circuit 27 varies, as indicated by points 1811 to 1813. In addition, it is evident that, in this case, adjusting the voltage of the AC power supplied to the transmission coil 14 also enables the output voltage to be maintained substantially constant without depending on the coupling coefficient. Further, compared with a case where both ends of the coil 15 are short-circuited, the frequency at which a constant voltage is output for the same coupling coefficient decreases and, in conjunction therewith, variation in the frequency at which the output voltage becomes substantially constant with respect to change in the coupling coefficient becomes small. Furthermore, since, on the power transmission side, inductance components that do not contribute to the power transmission increase, the gain for the same coupling coefficient becomes lower than that in a case where both ends of the coil 15 are short-circuited.

Therefore, it is revealed that, in the variation, searching for a switching frequency at which the non-contact power supply device 4 performs the constant voltage output operation with both ends of the coil 15 short-circuited when the coupling coefficient is relatively low and searching for a switching frequency at which the non-contact power supply device 4 performs the constant voltage output operation with both ends of the coil 15 open-circuited when the coupling coefficient is increased to a certain level also enable the adjustment range of switching frequency to be narrowed.

Figure 19:
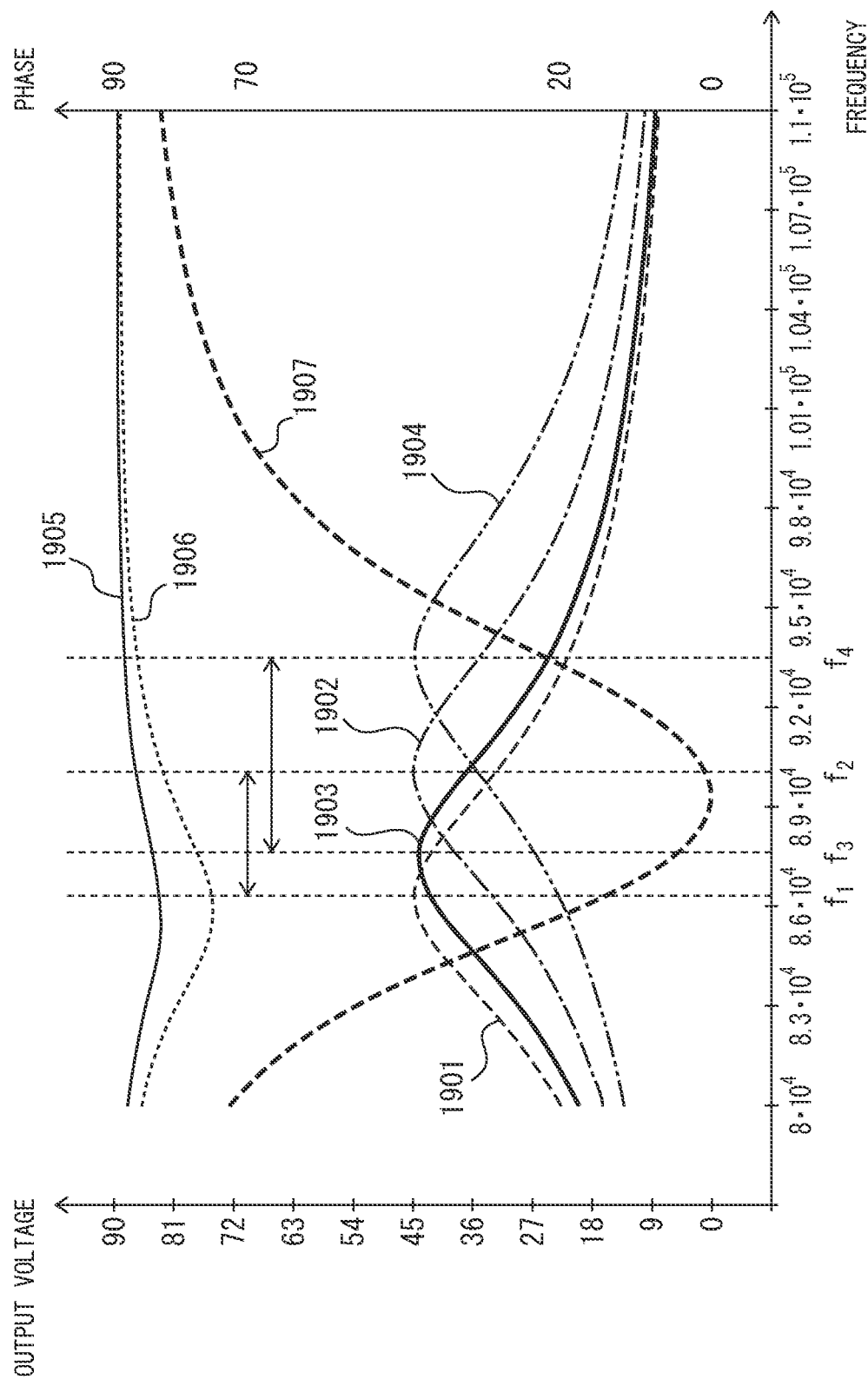
FIG. 19 is a diagram illustrating an example of simulation results of frequency responses of the output voltage from the non-contact power supply device according to the variation illustrated in FIG. 14 when, while whether or not short-circuiting both ends of the coil connected in series with the transmission coil is switched, the voltage applied to the transmission coil is changed in accordance with the coupling coefficient.

FIG. 19 is a diagram illustrating an example of simulation results of frequency responses of the output voltage from the non-contact power supply device 4 according to the variation when, while whether or not short-circuiting both ends of the coil 15 is switched, the voltage applied to the transmission coil 14 is changed in accordance with the coupling coefficient. In FIG. 19, frequency is plotted along the horizontal axis and output voltage is plotted along the vertical axis on the left side. In addition, phase is plotted along the vertical axis on the right side. Graph 1901 represents a frequency response of the output voltage when both ends of the coil 15 are short-circuited, the coupling coefficient k is set as k=0.15, and the voltage applied to the transmission coil 14 is set at Vin. In addition, graph 1902 represents a frequency response of the output voltage when both ends of the coil 15 are short-circuited, the coupling coefficient k is set as k=0.32, and the voltage applied to the transmission coil 14 is set at (0.47*Vin). In addition, graph 1903 represents a frequency response of the output voltage when both ends of the coil 15 are open-circuited, the coupling coefficient k is set as k=0.32, and the voltage applied to the transmission coil 14 is set at Vin. Further, graph 1904 represents a frequency response of the output voltage when both ends of the coil 15 are open-circuited, the coupling coefficient k is set as k=0.6, and the voltage applied to the transmission coil 14 is set at (0.54*Vin). Further, graph 1905 represents a frequency response of delay of the phase of current with respect to the voltage applied to the transmission coil 14 when both ends of the coil 15 are open-circuited and the coupling coefficient k is set as k=0.15. In addition, graph 1906 represents a frequency response of delay of the phase of current with respect to the voltage applied to the transmission coil 14 when both ends of the coil 15 are short-circuited and the coupling coefficient k is set as k=0.15. In addition, graph 1907 represents a frequency response of delay of the phase of current with respect to the voltage applied to the transmission coil 14 when both ends of the coil 15 are open-circuited and the coupling coefficient k is set as k=0.6.

Further, frequency f1 is a frequency at which, when both ends of the coil 15 are short-circuited and the coupling coefficient k is set as k=0.15, the output voltage becomes substantially constant even when the resistance of the load circuit 27 changes, i.e., the non-contact power supply device 4 performs the constant voltage output operation. Similarly, frequency f2 is a frequency at which, when both ends of the coil 15 are short-circuited and the coupling coefficient k is set as k=0.32, the non-contact power supply device 4 performs the constant voltage output operation. In addition, frequency f3 is a frequency at which, when both ends of the coil 15 are open-circuited and the coupling coefficient k is set as k=0.32, the non-contact power supply device 4 performs the constant voltage output operation. Further, frequency f4 is a frequency at which, when both ends of the coil 15 are open-circuited and the coupling coefficient k is set as k=0.6, the non-contact power supply device 4 performs the constant voltage output operation. Note that, in the simulation, the same values as the values of parameters of the respective circuit elements used in the simulation illustrated in FIG. 16 were also used except the inductance of the coil 15. In addition, the inductance of the coil 15 is set at 200 μH.

As illustrated by the graphs 1901 to 1904, it is evident that, even when the coupling coefficient varies, appropriately adjusting the switching frequency and voltage of the AC power applied to the transmission coil 14 enables the output voltage to be maintained substantially constant.

Further, it is evident that, since a frequency range from the frequency f1 to the frequency f2 and a frequency range from the frequency f3 to the frequency f4 partially overlap each other, the adjustment range of switching frequency at which the non-contact power supply device 4 performs the constant voltage output operation can be narrowed, compared with cases, illustrated in FIGS. 17 and 18, where whether or not short-circuiting both ends of the coil 15 is not switched.

Note that the lower limit of the adjustment range of switching frequency with both ends of the coil 15 open-circuited (i.e., a second frequency range) can be set at, for example, a frequency at which the voltage of the AC power supplied to the transmission coil 14 substantially coincides with a voltage of the AC power that is supplied to the transmission coil 14 when the coupling coefficient is the minimum of the expected values thereof. In addition, the upper limit of the adjustment range of switching frequency with both ends of the coil 15 short-circuited (i.e., a first frequency range) may be set at a switching frequency at which the constant voltage output operation is performed with both ends of the coil 15 short-circuited when the coupling coefficient is substantially equal to a coupling coefficient corresponding to the lower limit of the adjustment range of switching frequency with both ends of the coil 15 open-circuited.

As described above, in order to improve the energy transmission efficiency, it is preferable that the power supply circuit 10 and transmission coil 14 of the power transmission device 2 continue to operate with soft switching (inductive operation). In order for the power supply circuit 10 and the transmission coil 14 to operate with soft switching, it is preferable that the phase of current flowing through the transmission coil 14 be delayed from the phase of applied voltage. This configuration allows, for example, current to flow from the source terminal to the drain terminal of the switching element 13-1 when the switching element 13-1 and the switching element 13-4 are turned on, and the power supply circuit 10 and the transmission coil 14 thereby operate with soft switching, suppressing an occurrence of switching loss.

In the variation, as illustrated by the graphs 1905 to 1907, the delays of phases have positive values at frequencies at which the non-contact power supply device 4 performs the constant voltage output operation without depending on the coupling coefficient. Therefore, it is evident that the non-contact power supply device 4 is capable of making the power supply circuit 10 and the transmission coil 14 operate with soft switching.

Consequently, in the variation, in order to achieve the constant voltage output operation, the control circuit 19 of the power transmission device 2, as with the above-described embodiment, may, for example, control switching of the relay 16 between on and off states and the switching frequency and voltage of the AC power applied to the transmission coil 14 in accordance with the operation flowchart illustrated in FIG. 9.

Note that, in the variation, the power transmission device according to the variation illustrated in FIG. 10 may also be used in place of the power transmission device 2.

Further, the inventors have found that, in the non-contact power supply device 4 illustrated in FIG. 14, when the resistance of the load circuit connected to the resonance circuit on the power reception side is a negligibly small value, current flowing through the transmission coil also has a local maximum value and the phase of the voltage of AC power applied to the transmission coil coincides with the phase of the current flowing through the transmission coil at a frequency of the AC power at which the non-contact power supply device performs the constant voltage output operation.

FIG. 20 is a diagram illustrating an example of a relationship between frequency responses of the output voltage from the non-contact power supply device 4 illustrated in FIG. 14 and frequency responses of the input impedance of the non-contact power supply device 4. In the upper side graph in FIG. 20, frequency is plotted along the horizontal axis and output voltage is plotted along the vertical axis. In addition, in the lower side graph in FIG. 20, frequency is plotted along the horizontal axis and input impedance is plotted along the vertical axis. Note that, in the simulation, the same values as the values of parameters of the respective circuit elements used in the simulation illustrated in FIG. 16 were used. In the upper side graph, graph 2001 (the same as the graph 1601 in FIG. 16) represents a frequency response of the output voltage from the non-contact power supply device 4 when both ends of the coil 15 are short-circuited, the coupling coefficient k is set as k=0.15, and the AC equivalent resistance of the load circuit 27 is set at Rac. In addition, graph 2002 (the same as the graph 1602 in FIG. 16) represents a frequency response of the output voltage from the non-contact power supply device 4 when both ends of the coil 15 are short-circuited, the coupling coefficient k is set as k=0.15, and the AC equivalent resistance of the load circuit 27 is set at (10*Rac). In addition, in the lower side graph, graph 2011 represents a frequency response of the input impedance of the non-contact power supply device 4 when both ends of the coil 15 are short-circuited, the coupling coefficient k is set as k=0.15, and the AC equivalent resistance of the load circuit 27 is set at Rac. In addition, graph 2012 represents a frequency response of the input impedance of the non-contact power supply device 4 when both ends of the coil 15 are short-circuited, the coupling coefficient k is set as k=0.15 and the AC equivalent resistance of the load circuit 27 is set at (0.1*Rac). Further, graph 2013 represents a frequency response of the input impedance of the non-contact power supply device 4 when both ends of the coil 15 are short-circuited, the coupling coefficient k is set as k=0.15 and the AC equivalent resistance of the load circuit 27 is set at (0.01*Rac).

As illustrated in FIG. 20, as the AC equivalent resistance Rac of the load circuit 27 is smaller, the frequency at which the input impedance has a local minimum value is closer to a frequency f0 at which the non-contact power supply device 4 performs the constant voltage output operation. In particular, when the AC equivalent resistance of the load circuit 27 is set at (0.01*Rac), the input impedance has a local minimum value at the frequency f0. In other words, current flowing through the transmission coil 14 has a local maximum value at the frequency f0. In addition, since the coil 15 is not coupled with the reception coil 21, the above described matter is also applied to a case where both ends of the coil 15 are open-circuited, i.e., the current flowing through the transmission coil 14 also flows through the coil 15.

FIG. 21 is a diagram illustrating an example of a relationship between frequency responses of the output voltage from the non-contact power supply device 4 illustrated in FIG. 14 and frequency responses of delay of the phase of current with respect to the phase of voltage regarding AC power applied to the transmission coil 14. In the upper side graph in FIG. 21, frequency is plotted along the horizontal axis and output voltage is plotted along the vertical axis. In addition, in the lower side graph in FIG. 21, frequency is plotted along the horizontal axis and delay of phase is plotted along the vertical axis. Note that, in the diagram, a case where the delay of phase has a positive value indicates that the phase of current is delayed with respect to the phase of voltage. In addition, in the simulation, the same values as the values of parameters of the respective circuit elements used in the simulation illustrated in FIG. 16 were also used. In the upper side graph, graph 2101 (the same as the graph 1601 in FIG. 16) represents a frequency response of the output voltage from the non-contact power supply device 4 when both ends of the coil 15 are short-circuited, the coupling coefficient k is set as k=0.15, and the AC equivalent resistance of the load circuit 27 is set at Rac. In addition, graph 2102 (the same as the graph 1602 in FIG. 16) represents a frequency response of the output voltage from the non-contact power supply device 4 when both ends of the coil 15 are short-circuited, the coupling coefficient k is set as k=0.15, and the AC equivalent resistance of the load circuit 27 is set at (10*Rac).

In addition, in the lower side graph, graph 2111 represents a frequency response of delay of the phase of current with respect to the phase of voltage regarding the AC power applied to the transmission coil 14 when both ends of the coil 15 are short-circuited, the coupling coefficient k is set as k=0.15, and the AC equivalent resistance of the load circuit 27 is set at Rac. In addition, graph 2112 represents a frequency response of delay of the phase of current with respect to the phase of voltage regarding the AC power applied to the transmission coil 14 when both ends of the coil 15 are short-circuited, the coupling coefficient k is set as k=0.15, and the AC equivalent resistance of the load circuit 27 is set at (10*Rac). Further, graph 2113 represents a frequency response of delay of the phase of current with respect to the phase of voltage regarding the AC power applied to the transmission coil 14 when both ends of the coil 15 are short-circuited, the coupling coefficient k is set as k=0.15, and the AC equivalent resistance of the load circuit 27 is set at (0.1*Rac). In addition, graph 2114 represents a frequency response of delay of the phase of current with respect to the phase of voltage regarding the AC power applied to the transmission coil 14 when both ends of the coil 15 are short-circuited, the coupling coefficient k is set as k=0.15, and the AC equivalent resistance of the load circuit 27 is set at (0.01*Rac).

As illustrated in FIG. 21, as the AC equivalent resistance Rac of the load circuit 27 is smaller, the frequency at which the delay of the phase of current with respect to the phase of voltage regarding the AC power applied to the transmission coil 14 is 0 is closer to a frequency f0 at which the non-contact power supply device 4 performs the constant voltage output operation. In particular, when the AC equivalent resistance of the load circuit 27 is set at (0.01*Rac), the delay of the phase of current with respect to the phase of voltage regarding the AC power applied to the transmission coil 14 at the frequency f0 is substantially 0, i.e., the power factor becomes substantially 1. In other words, when the AC equivalent resistance of the load circuit 27 is set at (0.01*Rac), the delay of the phase of current with respect to the phase of voltage regarding the AC power applied to the transmission coil 14 has positive values at frequencies higher than the frequency f0, which means that so-called inductive drive is performed. Thus, in a frequency band in which the delay of phase is in a range from 0° to 90°, the non-contact power supply device 4 is able to make the power supply circuit 10 and the transmission coil 14 operate with soft switching. On the other hand, at frequencies lower than the frequency f0, the delay of the phase of current with respect to the phase of voltage regarding the AC power applied to the transmission coil 14 has negative values, which means that so-called capacitive drive is performed. Thus, in a frequency band in which the delay of phase is in a range from 0° to −90°, the power supply circuit 10 and the transmission coil 14 are made to operate with hard switching, which causes power transmission efficiency to decrease. In addition, since the coil 15 is not coupled with the reception coil 21, the above described matter is also applied to a case where both ends of the coil 15 are open-circuited, i.e., the current flowing through the transmission coil 14 also flows through the coil 15.

Thus, according to a variation, the control circuit of the power transmission device may determine whether or not the non-contact power supply device performs the constant voltage output operation, on the basis of a frequency response of current flowing through the transmission coil.

Figure 22:
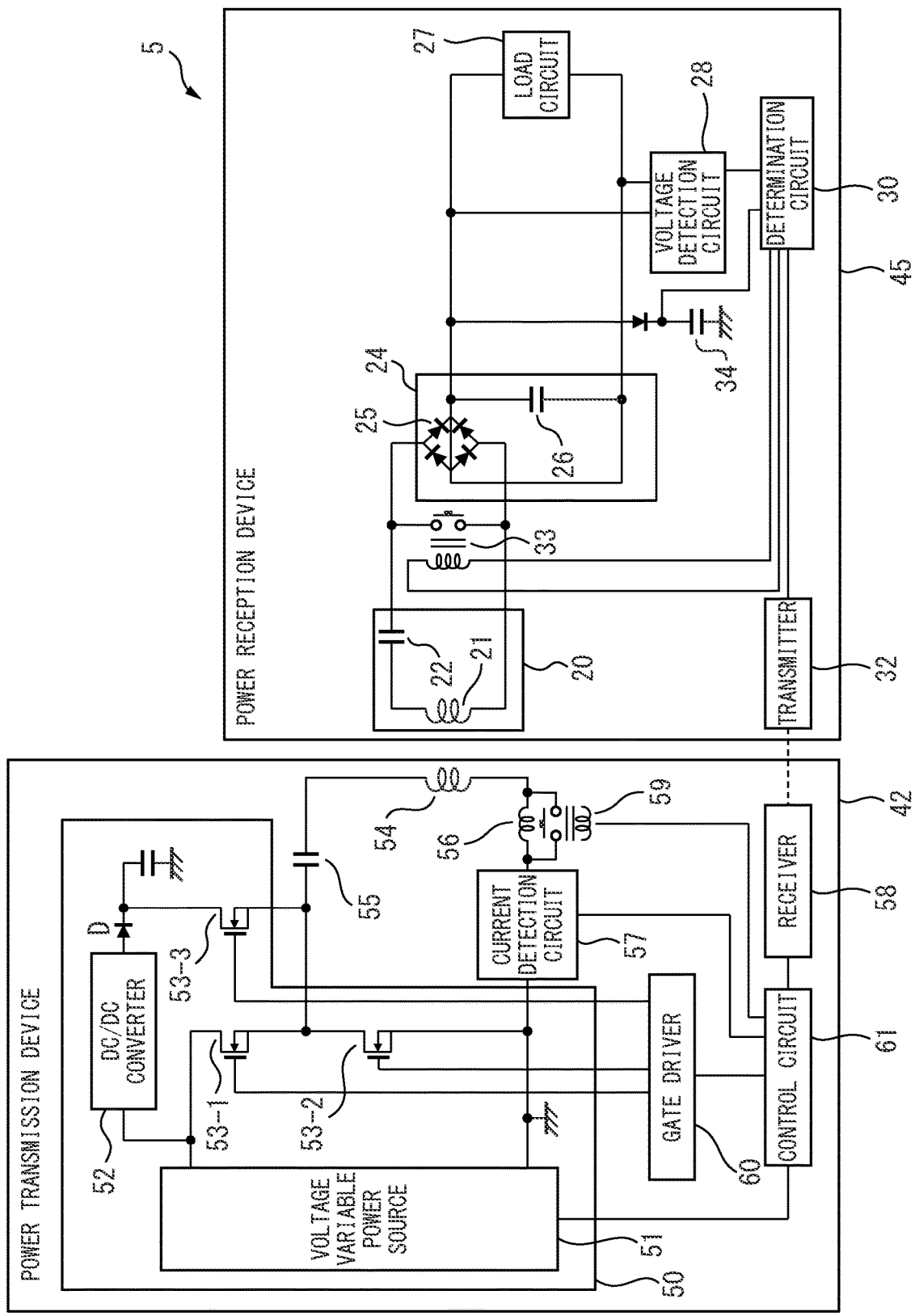
FIG. 22 is a schematic configuration view of a non-contact power supply device according to still another variation.

FIG. 22 is a schematic configuration view of a non-contact power supply device according to the variation. As illustrated in FIG. 22, a non-contact power supply device 5 includes a power transmission device 42 and a power reception device 45 to which power is transmitted from the power transmission device 42 through space without contact. The non-contact power supply device 5 illustrated in FIG. 22 differs from the non-contact power supply device 4 illustrated in FIG. 14 in including the power transmission device 42 illustrated in FIG. 12 in place of the power transmission device 2, in that the power reception device 45 includes a relay 33 and a power charge circuit 34 in place of the switching element 31, in that both a receiver 58 of the power transmission device 42 and a transmitter 32 of the power reception device 45 operate as a communication device that can be used in both transmission and reception of a wireless signal, and in a portion of processing performed by a determination circuit 30. Therefore, the above-described differences and related matters on the power reception device side will be described below. Regarding the power transmission device 42, see the description relating to the variation illustrated in FIG. 12. In addition, regarding the constituent components other than those having the above differences in the power reception device 45, see the description of corresponding constituent components in the above-described embodiment.

In the power reception device 45, the relay 33 is an example of a second short-circuiting circuit and has one end thereof connected between a resonance capacitor 22 of a resonance circuit 20 and one end on the input side of a rectification and smoothing circuit 24 and the other end thereof connected between the resonance circuit 20 and the other end on the input side of the rectification and smoothing circuit 24. In the present embodiment, the relay 33 is a normally-off relay, and the determination circuit 30 controlling the relay 33 to turn on causes the relay 33 to be turned on. When the relay 33 is turned on, the resonance circuit 20 is short-circuited. Therefore, impedance of circuits connected to the resonance circuit 20 becomes a negligible value.

The power charge circuit 34 is charged with power that is output via the rectification and smoothing circuit 24 and provides the determination circuit 30 with power to be used for the determination circuit 30 to maintain the relay 33 in the on state. To that end, the power charge circuit 34 includes, for example, a capacitor, and one end of the capacitor is connected to the positive electrode side output terminal of the rectification and smoothing circuit 24 via a diode that is disposed in such a way as to be forward-biased and the other end of the capacitor is grounded. While the power reception device 45 is supplied with power from the power transmission device 42, the capacitor of the power charge circuit 34 is charged with power that is output from the rectification and smoothing circuit 24. In addition, when the non-contact power supply device 5 is not to perform the constant voltage output operation and the relay 33 is turned on and power has thereby ceased to be output from the rectification and smoothing circuit 24, the determination circuit 30 maintains the relay 33 in the on state, using power obtained by the capacitor of the power charge circuit 34 discharging.

Note that the power charge circuit 34 may include a circuit, other than the capacitor, that is capable of charging power. For example, the power charge circuit 34 may include a secondary battery in place of the capacitor. In this case, power charged by the power charge circuit 34 may be used to drive the determination circuit 30 and the transmitter 32.

The determination circuit 30 determines, on the basis of a measured value of the output voltage received from a voltage detection circuit 28, whether or not the non-contact power supply device 5 is performing the constant voltage output operation and whether or not the measured value of the output voltage falls within an allowance range of voltage when the constant voltage output operation is performed. The determination circuit 30 notifies the transmitter 32 of a result of the determination.

Further, in the variation, while measured values of the output voltage are out of the allowance range of voltage, the determination circuit 30 maintains the relay 33 in the on state and thereby short-circuits both ends of the resonance circuit 20 and maintains the state in which both ends of the resonance circuit 20 are short-circuited until receiving from the power transmission device 42 detection information indicating that a switching frequency at which the non-contact power supply device 5 performs the constant voltage output operation is detected. This configuration causes impedance of circuits connected to the resonance circuit 20 to have a negligibly small value while the control circuit 61 of the power transmission device 42 adjusts the switching frequency and voltage of AC power applied to the transmission coil 54 at which the non-contact power supply device 5 is able to perform the constant voltage output operation.

In addition, when receiving the detection information from the power transmission device 42 via the transmitter 32, the determination circuit 30 turns off the relay 33 and thereby open-circuits both ends of the resonance circuit 20. This operation causes the impedance of the circuits connected to the resonance circuit 20 to have a value in accordance with the resistance of the load circuit 27. Further, when measured values of the output voltage fall within the allowance range of voltage, i.e., the non-contact power supply device 5 performs the constant voltage output operation, the determination circuit 30 maintains the state in which the relay 33 is in the off state, i.e., both ends of the resonance circuit 20 are open-circuited. The determination circuit 30 notifies the transmitter 32 of a determination result indicating that measured values of the output voltage fall within the allowance range of voltage.

Operation of the control circuit 61 of the power transmission device 42 according to the variation will be described below. While the non-contact power supply device 5 performs the constant voltage output operation, the control circuit 61, as with the above-described embodiment, controls a voltage variable power supply 51 of a power supply circuit 50 to supply the transmission coil 54 with DC voltage having a voltage in accordance with the switching frequency in such a way that a measured value of the output voltage from the resonance circuit 20 of the power reception device 45 falls within a predetermined allowance range. In addition, the control circuit 61 keeps a switching element 53-3 in the off state and, in conjunction therewith, switches switching elements 53-1 and 53-2 between on and off states at a switching frequency at which the constant voltage output operation is performed, via a gate driver 60.

On the other hand, when determination information included in a wireless signal received from the power reception device 45 via the transmitter 32 indicates that the non-contact power supply device 5 is not performing the constant voltage output operation, the control circuit 61 keeps the switching element 53-1 in the off state and, in conjunction therewith, alternately switches the switching elements 53-3 and 53-2 between on and off states via the gate driver 60 and thereby causes power to be supplied from a DC/DC converter 52 to the transmission coil 54. In addition, the control circuit 61 controls the voltage variable power source 51 in such a way that the voltage supplied from the DC/DC converter 52 to the transmission coil 54 has a predetermined value. Through this control, the control circuit 61 reduces the power supplied from the power transmission device 42 to the power reception device 45 to a level at which the power reception device 45 does not malfunction.

While the control circuit 61 changes the switching frequency, the control circuit 61 monitors measured values of current flowing through the transmission coil 54 measured by a current detection circuit 57 and detects a switching frequency at which the measured values of the current have a local maximum. In so doing, when, in an adjustment range of switching frequency with both ends of a coil 56 short-circuited, no local maximum value is found among measured values of the current (i.e., in the adjustment range of switching frequency, the measured values of the current monotonically increase or monotonically decrease as the switching frequency increases), the control circuit 61 controls the relay 59 to open-circuit both ends of the coil 56. Subsequently, the control circuit 61 may detect a switching frequency at which measured values of the current have a local maximum in an adjustment range of switching frequency with both ends of the coil 56 open-circuited. Conversely, when, in the adjustment range of switching frequency with both ends of the coil 56 open-circuited, no local maximum value is found among measured values of the current, the control circuit 61 controls the relay 59 to short-circuit both ends of the coil 56. Subsequently, the control circuit 61 may detect a switching frequency at which measured values of the current have a local maximum in the adjustment range of switching frequency with both ends of the coil 56 short-circuited.

Note that the control circuit 61 may detect a switching frequency at which a measured value of the current has a value equal to or greater than a predetermined threshold value as a switching frequency at which a measured value of the current has a local maximum. Note that the predetermined threshold value may be set at, for example, a value corresponding to a current that flows through the transmission coil 54 at a switching frequency that is shifted, by a predetermined acceptable error range, from the switching frequency at which the current flowing through the transmission coil 54 has a local maximum value.

The switching frequency at which measured values of the current flowing through the transmission coil 54 have a local maximum is a frequency at which the input impedance of the non-contact power supply device 5 has a local minimum value, i.e., a frequency at which the non-contact power supply device 5 performs the constant voltage output operation, such as the frequency f0 illustrated in FIG. 20. Thus, when a switching frequency at which measured values of the current flowing through the transmission coil 54 have a local maximum is detected, the control circuit 61, at the switching frequency, controls switching of the switching elements 53-1 and 53-2 between on and off states via the gate driver 60 in such a way that power from the voltage variable power source 51 is supplied to the transmission coil 54. In addition, the control circuit 61 turns off the switching element 53-3. This operation enables the control circuit 61 to make the non-contact power supply device 5 perform the constant voltage output operation. The control circuit 61 notifies the receiver 58 of detection information indicating that a switching frequency at which the non-contact power supply device 5 performs the constant voltage output operation is detected and makes the receiver 58 transmit a wireless signal including the detection information to the transmitter 32 of the power reception device 45.

Subsequently, the control circuit 61 controls the voltage variable power supply 51 of the power supply circuit 50 to supply the transmission coil 54 with DC voltage having a voltage in accordance with the switching frequency in such a way that a measured value of the output voltage from the resonance circuit 20 of the power reception device 45 falls within a predetermined allowance range. In so doing, the control circuit 61 may determine a voltage of power supplied from the voltage variable power source 51 by, for example, referring to a reference table each entry of which indicates a relationship between a switching frequency and a voltage of power supplied from the voltage variable power source 51. Such a reference table is, for example, stored in advance in a memory included in the control circuit 61.

In addition, the control circuit 61 may, in place of referring to the above-described reference table, change the voltage of the power supplied from the voltage variable power source 51 gradually until determination information included in a wireless signal received from the power reception device 45 via the receiver 58 indicates that a measured value of the output voltage falls within the allowance range of voltage.

According to the variation, the control circuit of the power transmission device is capable of, by monitoring current flowing through the transmission coil of the power transmission device, detecting a switching frequency at which the non-contact power supply device performs the constant voltage output operation.

According to a variation, while the control circuit 61 may changes switching frequency, the control circuit 61 may monitor measured values of current flowing through a transmission coil 54 measured by a current detection circuit 57 and detect a switching frequency at which delay of the phase of current with respect to the phase of voltage regarding AC power applied to the transmission coil 54 is 0. In this case, the control circuit 61 may identify the phase of voltage regarding the AC power applied to the transmission coil 54, based on, for example, timings at which switching elements 53-3 and 53-2 are switched between on and off states and a time constant defined based on inductance of the transmission coil 54 and a coil 56 and capacitance of a capacitor 55. On the other hand, the control circuit 61 may determine the phase of current flowing through the transmission coil 54, on the basis of temporal change in measured values of the current flowing through the transmission coil 54 measured by the current detection circuit 57.

As illustrated in FIG. 21, the switching frequency at which the delay of the phase of current with respect to the phase of voltage regarding the AC power applied to the transmission coil 54 is 0 is a frequency at which a non-contact power supply device 5 performs the constant voltage output operation. Thus, when a switching frequency at which the delay of the phase of current with respect to the phase of voltage regarding the AC power applied to the transmission coil 54 is 0 is detected, the control circuit 61 may, as with the above description, control switching of the switching elements 53-1 and 53-2 between on and off states at the detected switching frequency via a gate driver 60 in such a way that power from a voltage variable power source 51 is supplied to the transmission coil 54 and keep the switching element 53-3 in the off state. Note that, in the variation, the control circuit 61 may also detect a switching frequency at which the absolute value of a difference between the phase of voltage and the phase of current with respect to the AC power applied to the transmission coil 54 is equal to or less than a predetermined threshold value as a switching frequency at which the delay of the phase of current with respect to the phase of voltage regarding the AC power applied to the transmission coil 54 is 0.

In this case also, when, in an adjustment range of switching frequency with both ends of the coil 56 short-circuited, the delay of the phase of current with respect to the phase of voltage regarding the AC power applied to the transmission coil 54 does not become 0, the control circuit 61 may control the relay 59 to open-circuit both ends of the coil 56. Subsequently, the control circuit 61 may detect a switching frequency at which the delay of the phase of current with respect to the phase of voltage regarding the AC power applied to the transmission coil 54 is 0 in an adjustment range of switching frequency with both ends of the coil 56 open-circuited. Conversely, when, in the adjustment range of switching frequency with both ends of the coil 56 open-circuited, the delay of the phase of current with respect to the phase of voltage regarding the AC power applied to the transmission coil 54 does not become 0, the control circuit 61 may control the relay 59 to short-circuit both ends of the coil 56. Subsequently, the control circuit 61 may detect a switching frequency at which the delay of the phase of current with respect to the phase of voltage regarding the AC power applied to the transmission coil 54 is 0 in the adjustment range of switching frequency with both ends of the coil 56 short-circuited.

According to another variation, in the power transmission device, the power supply circuit that supplies AC power to the transmission coil may have a circuit configuration different from the one in the above-described embodiment and its variations as long as the power supply circuit is a circuit that can variably adjust the switching frequency and voltage applied to the transmission coil.

In addition, in the power transmission device in the variation illustrated in FIG. 14 and the power transmission device in the variation illustrated in FIG. 22, the power supply circuit 110 illustrated in FIG. 13A or the power supply circuit 120 illustrated in FIG. 13B may be used.

As described above, a person skilled in the art can apply various alterations suitable to embodiments without departing from the scope of the present invention.

REFERENCE SIGNS LIST 1, 4, 5, 41 Non-contact power supply device
2, 42 Power transmission device
10, 110, 120 Power supply circuit 11 Power source
12 Power factor improvement circuit
51 Voltage variable power source
52 DC/DC converter
13-1 to 13-4, 53-1 to 53-3 Switching element
14, 54 Transmission coil
55 Capacitor
15, 56 Coil
16, 59 Relay
57 Current detection circuit
17, 58 Receiver
18-1, 18-2, 60 Gate driver
19, 61 Control circuit
3, 43, 44, 45 Power reception device
20, 70 Resonance circuit
21, 71 Reception coil
22, 72 Resonance capacitor
23, 73 Coil
24, 74 Rectification and smoothing circuit
25, 75 Full-wave rectification circuit
26, 76 Smoothing capacitor
27, 77 Load circuit
28, 78 Voltage detection circuit
29, 79 Constant voltage determination circuit
30, 80 Determination circuit
31, 81 Switching element
82 Fixed load circuit
32, 83 Transmitter
111 AC power source
131 Capacitor
161, 162 Switching element

The invention claimed is:

1. A non-contact power supply device comprising a power transmission device and a power reception device to which power is transmitted from the power transmission device without contact,
wherein the power reception device comprises:
a resonance circuit that includes a reception coil that receives power from the power transmission device and a resonance capacitor that, in conjunction with the reception coil, resonates with power from the power transmission device; and
a rectification circuit that rectifies power output from the resonance circuit;
a voltage detection circuit that measures output voltage of power output from the resonance circuit and obtains a measured value of the output voltage;
a determination circuit that determines, on the basis of the measured value of the output voltage, whether or not the non-contact power supply device is performing a constant voltage output operation and whether or not the measured value of the output voltage falls within a predetermined allowance range of voltage; and
a first communication device that transmits a signal including determination information indicating whether or not the non-contact power supply device is performing the constant voltage output operation and whether or not the measured value of the output voltage falls within the predetermined allowance range of voltage to the power transmission device;
wherein the power transmission device comprises:
a transmission coil that supplies power to the power reception device;
a first coil that is connected in series with the transmission coil and is not coupled with the reception coil even while power is transmitted from the power transmission device to the power reception device;
a first short-circuiting circuit that switches between short-circuiting and open-circuiting both ends of the first coil;
a power supply circuit that supplies AC power having an adjustable switching frequency and having an adjustable voltage to the transmission coil;
a control circuit that controls the adjustable switching frequency and the voltage of the AC power supplied from the power supply circuit to the transmission coil and controls whether short-circuiting or open-circuiting both ends of the first coil via the first short-circuiting circuit; and
a second communication device that receives the signal including the determination information; and
wherein the control circuit controls, depending on the determination information, switching frequency and voltage of the AC power supplied from the power supply circuit to the transmission coil and controls whether short-circuiting or open-circuiting both ends of the first coil via the first short-circuiting circuit.

2. The non-contact power supply device according to claim 1,
wherein, when, with both ends of the first coil short-circuited, the determination information indicates that the non-contact power supply device is not performing the constant voltage output operation, the control circuit controls the adjustable switching frequency of the AC power supplied from the power supply circuit to the transmission coil to be changed within a first frequency range in such a way that measured values of the output voltage do not change even when resistance of a load circuit connected to the rectification circuit of the power reception device changes.

3. The non-contact power supply device according to claim 2,
wherein, when, with both ends of the first coil short-circuited, the determination information indicates that the non-contact power supply device is not performing the constant voltage output operation even when the control circuit changes the adjustable switching frequency of the AC power supplied from the power supply circuit to the transmission coil over the whole first frequency range, the control circuit controls the first short-circuiting circuit to open-circuit both ends of the first coil.

4. The non-contact power supply device according to claim 2,
wherein, the control circuit controls, when the determination information indicates that the non-contact power supply device is performing the constant voltage output operation and a measured value of the output voltage does not fall within the predetermined allowance range of voltage, voltage of the AC power supplied from the power supply circuit to the transmission coil in such a way that measured values of the output voltage fall within the predetermined allowance range of voltage.

5. The non-contact power supply device according to claim 1,
wherein, when, with both ends of the first coil open-circuited, the determination information indicates that the non-contact power supply device is not performing the constant voltage output operation, the control circuit controls the adjustable switching frequency of the AC power supplied from the power supply circuit to the transmission coil to be changed within a second frequency range that is different from the first frequency range in such a way that measured values of the output voltage do not change even when resistance of a load circuit connected to the rectification circuit of the power reception device changes.

6. The non-contact power supply device according to claim 5,
wherein, when, with both ends of the first coil open-circuited, the determination information indicates that the non-contact power supply device is not performing the constant voltage output operation even when the control circuit changes the adjustable switching frequency of the AC power supplied from the power supply circuit to the transmission coil over the whole second frequency range, the control circuit controls the first short-circuiting circuit to short-circuit both ends of the first coil.

7. The non-contact power supply device according to claim 5,
the first frequency range and the second frequency range are set in such a manner as to partially overlap each other.

8. A non-contact power supply device comprising a power transmission device and a power reception device to which power is transmitted from the power transmission device without contact,
wherein the power reception device comprises:
a resonance circuit that includes a reception coil that receives power from the power transmission device and a resonance capacitor that, in conjunction with the reception coil, resonates with power from the power transmission device; and
a rectification circuit that rectifies power output from the resonance circuit;
a second coil that is connected in series with the reception coil between the resonance circuit and the rectification circuit; and
wherein the reception coil and the resonance capacitor of the resonance circuit are connected in parallel with each other; and
wherein the power transmission device comprises:
a transmission coil that supplies power to the power reception device;
a first coil that is connected in series with the transmission coil and is not coupled with the reception coil even while power is transmitted from the power transmission device to the power reception device;
a first short-circuiting circuit that switches between short-circuiting and open-circuiting both ends of the first coil;
a power supply circuit that supplies AC power having an adjustable switching frequency and having an adjustable voltage to the transmission coil;
a control circuit that controls the adjustable switching frequency and voltage of the AC power supplied from the power supply circuit to the transmission coil and controls whether short-circuiting or open-circuiting both ends of the first coil via the first short-circuiting circuit;
a current detection circuit that measures current flowing through the transmission coil and obtains a measured value of the current, and
wherein the control circuit controls, depending on the measured value of the current, the adjustable switching frequency of the AC power supplied from the power supply circuit to the transmission coil and controls whether short-circuiting or open-circuiting both ends of the first coil via the first short-circuiting circuit.

9. The non-contact power supply device according to claim 8,
wherein the control circuit monitors, with both ends of the first coil short-circuited, measured values of the current while changing the adjustable switching frequency of the AC power within a first frequency range and thereby detects a first switching frequency at which measured values of the current have a local maximum and controls the power supply circuit in such a way that AC power having the detected first switching frequency is supplied to the transmission coil.

10. The non-contact power supply device according to claim 9,
wherein, when no first switching frequency at which measured values of the current have a local maximum is found within the first frequency range, the control circuit controls the first short-circuiting circuit to open-circuit both ends of the first coil and monitors, with both ends of the first coil open-circuited, measured values of the current while changing the adjustable switching frequency of the AC power within a second frequency range that is different from the first frequency range and thereby detects a second switching frequency at which measured values of the current have a local maximum and controls the power supply circuit in such a way that AC power having the detected second switching frequency is supplied to the transmission coil.

11. A non-contact power supply device comprising a power transmission device and a power reception device to which power is transmitted from the power transmission device without contact,
wherein the power reception device comprises:
a resonance circuit that includes a reception coil that receives power from the power transmission device and a resonance capacitor that, in conjunction with the reception coil, resonates with power from the power transmission device; and
a rectification circuit that rectifies power output from the resonance circuit;
a determination circuit that determines, on the basis of the measured value of the output voltage, whether or not the non-contact power supply device is performing a constant voltage output operation and whether or not the measured value of the output voltage falls within a predetermined allowance range of voltage;
a voltage detection circuit that measures output voltage of power output from the resonance circuit and obtains a measured value of the output voltage; and
a second short-circuiting circuit that is capable of switching whether or not short-circuiting the resonance circuit;
wherein the power transmission device comprises:
a transmission coil that supplies power to the power reception device;
a first coil that is connected in series with the transmission coil and is not coupled with the reception coil even while power is transmitted from the power transmission device to the power reception device;
a first short-circuiting circuit that switches between short-circuiting and open-circuiting both ends of the first coil;

a power supply circuit that supplies AC power having an adjustable switching frequency and having an adjustable voltage to the transmission coil; and a control circuit that controls the adjustable switching frequency and voltage of the AC power supplied from the power supply circuit to the transmission coil and controls whether short-circuiting or open-circuiting both ends of the first coil via the first short-circuiting circuit;

a current detection circuit that measures current flowing through the transmission coil and obtains a measured value of the current;

wherein the reception coil and the resonance capacitor of the resonance circuit of the power reception device are connected in series with each other, wherein when the measured value of the output voltage is out of the predetermined allowance range of voltage, the determination circuit makes the second short-circuiting circuit short-circuit the resonance circuit; and wherein the control circuit controls, depending on the measured value of the current, the adjustable switching frequency of the AC power supplied from the power supply circuit to the transmission coil and controls whether short-circuiting or open-circuiting both ends of the first coil via the first short-circuiting circuit.

12. The non-contact power supply device according to claim 11, wherein the control circuit monitors, with both ends of the first coil short-circuited, measured values of the current while changing the adjustable switching frequency of the AC power within a first frequency range and thereby detects a first switching frequency at which measured values of the current have a local maximum or phase of measured values of the current and phase of voltage of the AC power supplied to the transmission coil coincide with each other and controls the power supply circuit in such a way that AC power having the detected first switching frequency is supplied to the transmission coil.

* * * * *